United States Patent
Gong et al.

(10) Patent No.: US 10,935,756 B2
(45) Date of Patent: Mar. 2, 2021

(54) OPTICAL LENS ASSEMBLY GENERATING LIGHT BEAMS WITH DIFFERENT ANGLES, EACH BEAM HAVING PARALLEL CHIEF RAY AND MARGINAL RAY

(71) Applicant: Genius Electronic Optical Co., Ltd., Taichung (TW)

(72) Inventors: Jinhui Gong, Fujian (CN); Qingzhi Zhu, Fujian (CN); Jiali Lian, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 352 days.

(21) Appl. No.: 15/856,085

(22) Filed: Dec. 28, 2017

(65) Prior Publication Data

US 2019/0137733 A1    May 9, 2019

(30) Foreign Application Priority Data

Nov. 3, 2017    (CN) .......................... 201711071175.1

(51) Int. Cl.
*G02B 9/14* (2006.01)
*G02B 13/00* (2006.01)
(Continued)

(52) U.S. Cl.
CPC ................ *G02B 9/14* (2013.01); *G01B 11/25* (2013.01); *G02B 13/14* (2013.01); *G02B 13/16* (2013.01); *G02B 27/20* (2013.01); *G01S 7/4814* (2013.01); *G02B 13/004* (2013.01); *G02B 13/0035* (2013.01)

(58) Field of Classification Search
CPC ......... G01B 11/25; G01S 7/4814; G02B 9/14; G02B 9/36; G02B 13/0035; G02B 13/004; G02B 13/005; G02B 13/14; G02B 13/16; G02B 27/20
USPC ....... 359/355, 356, 357, 771, 772, 784, 785, 359/791, 792
See application file for complete search history.

(56) References Cited

U.S. PATENT DOCUMENTS

| 2011/0228157 A1 | 9/2011 | Tang et al. |
| 2017/0068098 A1 | 3/2017 | Chern et al. |
| 2019/0101724 A1* | 4/2019 | Chen ..................... H04N 13/225 |

FOREIGN PATENT DOCUMENTS

| CN | 205880337 | 1/2017 |
| CN | 106646823 | 5/2017 |

(Continued)

OTHER PUBLICATIONS

"Office Action of China Counterpart Application," dated Nov. 5, 2019, p.1-p.10.

(Continued)

*Primary Examiner* — Ryan S Dunning
(74) *Attorney, Agent, or Firm* — JCIPRNET

(57) ABSTRACT

An optical lens assembly is provided. A plurality of infrared light beams emitted from a structured light generating unit having a plurality of light sources pass through the optical lens assembly to generate a plurality of light beams. A direction facing the structured light generating unit is a light input side, and an opposite side is a light output side. The optical lens assembly includes a first lens element, a second lens element and a third lens element arranged along an optical axis in a sequence from the light output side to the light input side.

20 Claims, 47 Drawing Sheets

(51) Int. Cl.
  *G02B 13/14* (2006.01)
  *G02B 27/20* (2006.01)
  *G01B 11/25* (2006.01)
  *G02B 13/16* (2006.01)
  *G01S 7/481* (2006.01)

(56) References Cited

FOREIGN PATENT DOCUMENTS

| CN | 106990512 | 7/2017 |
| CN | 106997603 | 8/2017 |
| CN | 207380322 | 5/2018 |
| WO | 2017069705 | 4/2017 |

OTHER PUBLICATIONS

"Office Action of China Counterpart Application", dated May 20, 2020, p. 1-p. 10.

\* cited by examiner

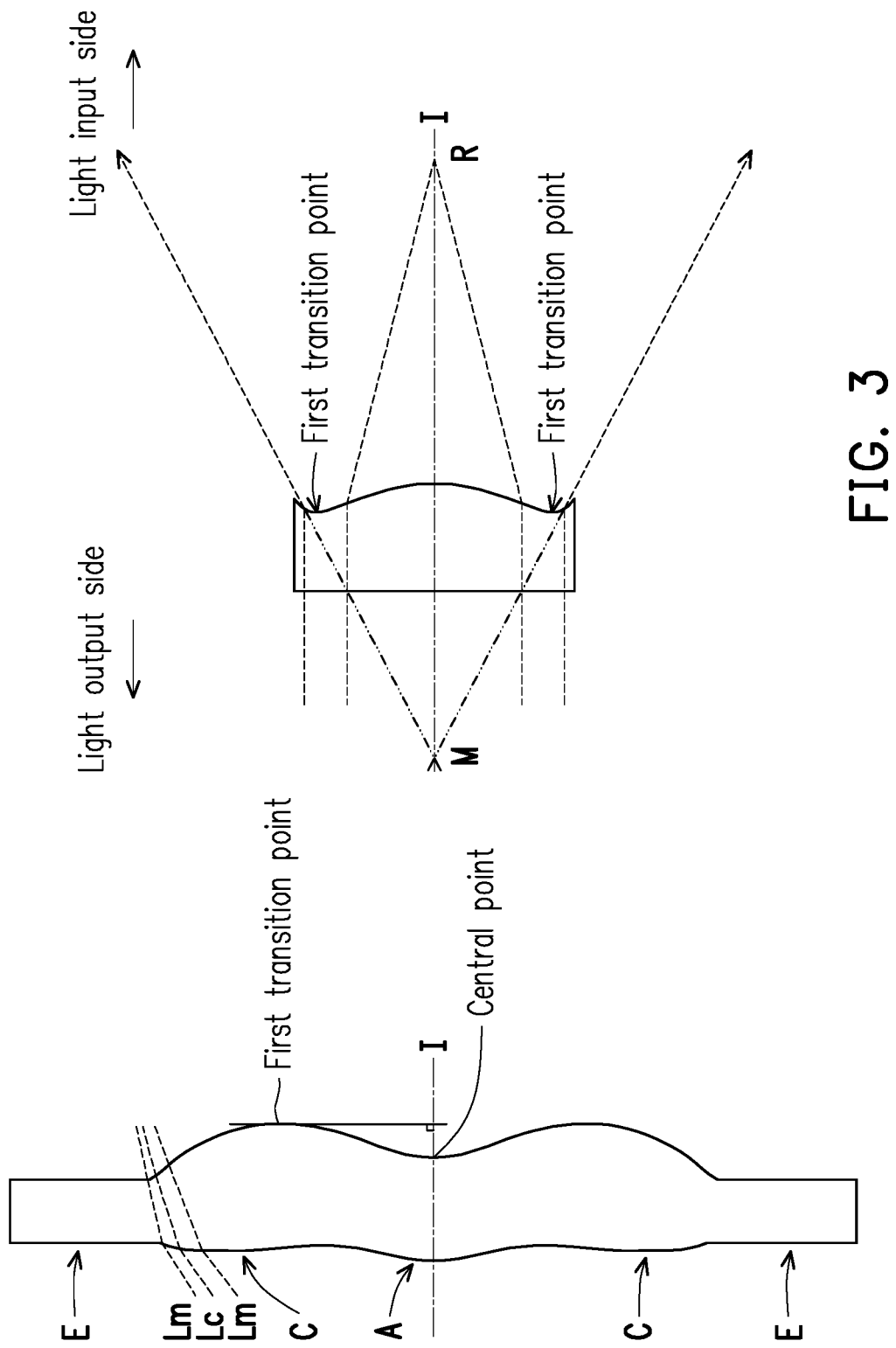

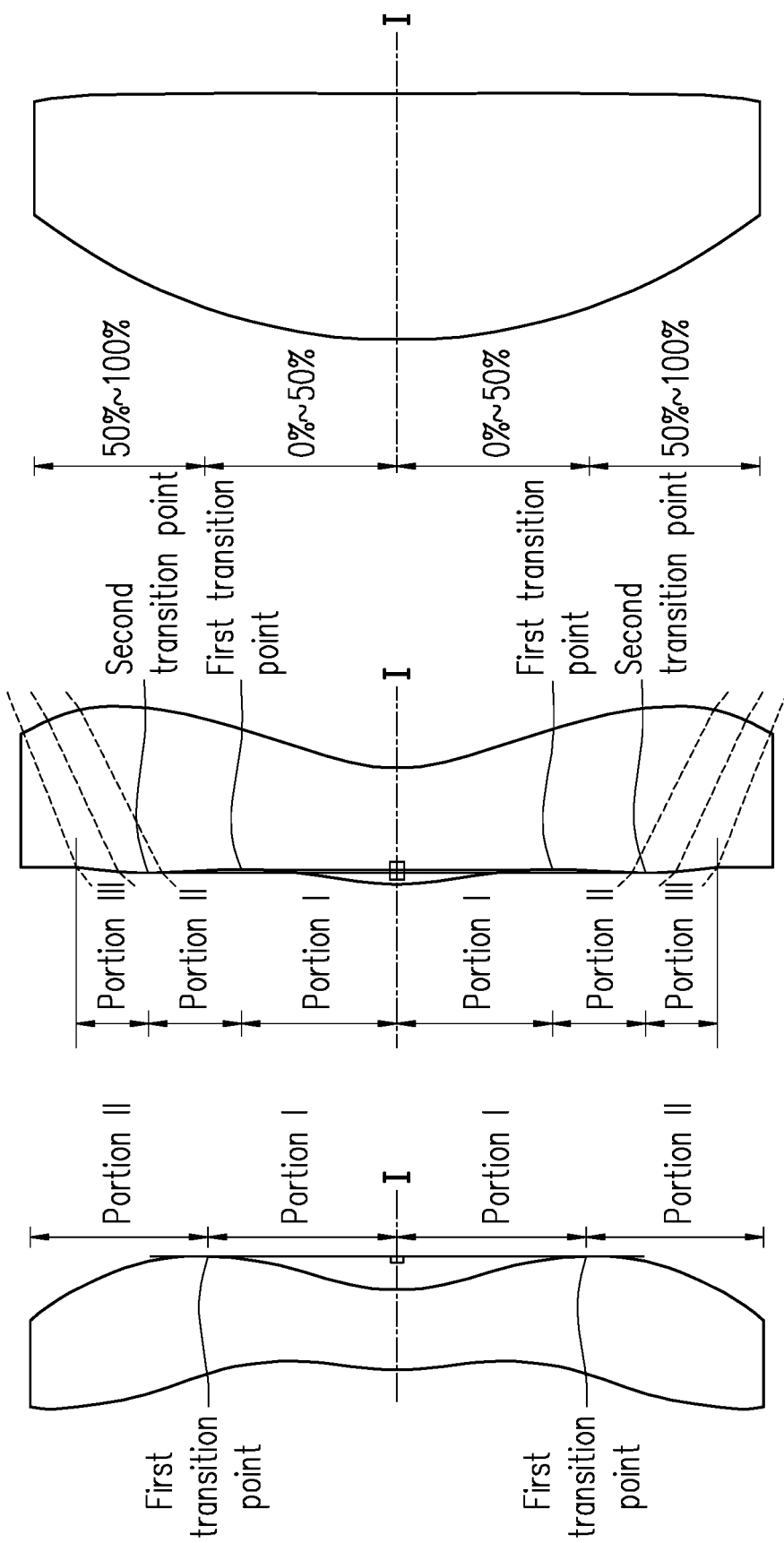

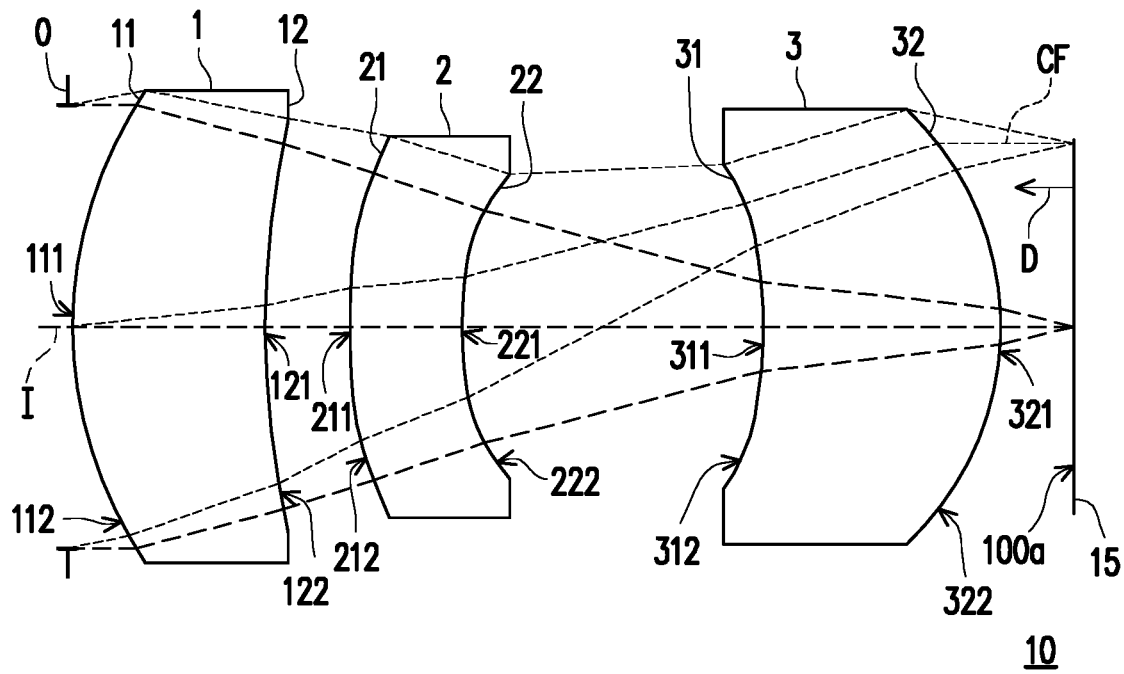
FIG. 7
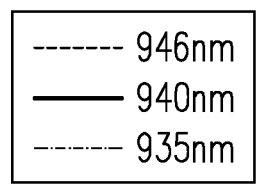
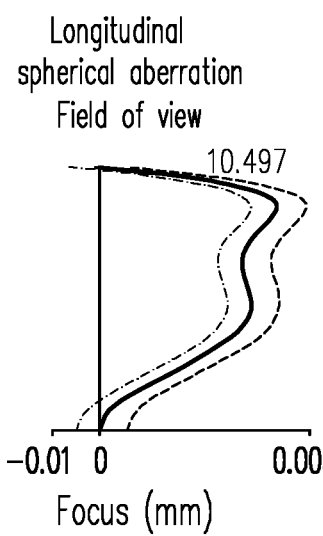
Longitudinal spherical aberration
Field of view
FIG. 8A
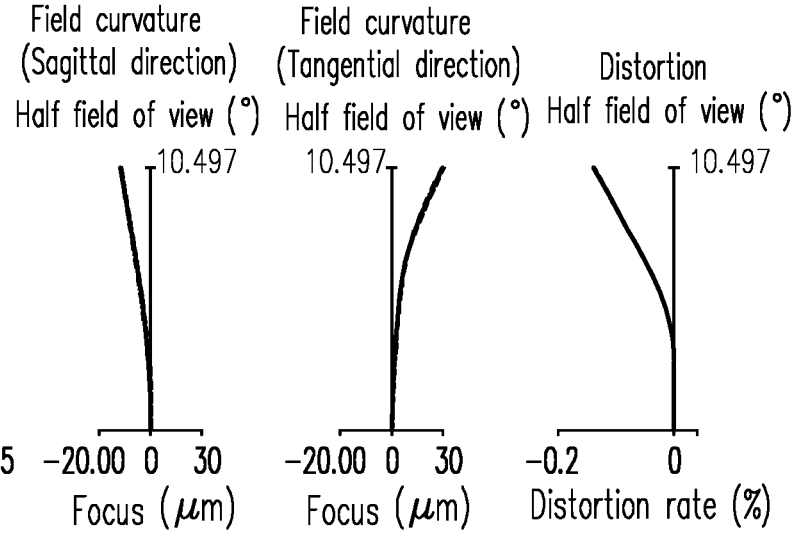
Field curvature (Sagittal direction)
Half field of view (°)
FIG. 8B
Field curvature (Tangential direction)
Half field of view (°)
FIG. 8C
Distortion
Half field of view (°)
FIG. 8D

| First embodiment | | | | | | |
|---|---|---|---|---|---|---|
| TTL=2.700 mm , EFL=2.700 mm , HFOV=10.497° , Fno=2.273 | | | | | | |
| Element | Surface | Radius of curvature(mm) | Thickness (mm) | Refractive index | Abbe number | Focal length(mm) |
| Object | | Infinite | Infinite | | | |
| Aperture stop 0 | | Infinite | 0.015 | | | |
| First lens element 1 | Light output surface 11 | 1.081 | 0.518 | 1.851 | 40.104 | 1.940 |
| | Light input surface 12 | 2.562 | 0.228 | | | |
| Second lens element 2 | Light output surface 21 | 1.965 | 0.300 | 1.642 | 22.409 | -4.138 |
| | Light input surface 22 | 1.047 | 0.816 | | | |
| Third lens element 3 | Light output surface 31 | -1.287 | 0.638 | 1.642 | 22.409 | 2.386 |
| | Light input surface 32 | -0.818 | 0.200 | | | |
| Structured light generating unit 15 | Light emitting surface 100a | Infinite | | | | |

FIG. 9

| Sur-face | K | $a_2$ | $a_4$ | $a_6$ | $a_8$ |
|---|---|---|---|---|---|
| 11 | -3.758675E-01 | 0.000000E+00 | 4.849856E-03 | 1.356769E-02 | -1.309576E-01 |
| 12 | 0.000000E+00 | 0.000000E+00 | 4.518037E-02 | 3.511642E-02 | -7.582907E-01 |
| 21 | 0.000000E+00 | 0.000000E+00 | 6.815759E-01 | -1.387847E-02 | -1.156292E+00 |
| 22 | 0.000000E+00 | 0.000000E+00 | 1.389533E+00 | 5.929145E-01 | 9.673296E+00 |
| 31 | 0.000000E+00 | 0.000000E+00 | -4.854859E-01 | -4.035578E-01 | -8.043598E+00 |
| 32 | 0.000000E+00 | 0.000000E+00 | -5.567582E-02 | -1.868390E-02 | -4.512015E-01 |
| Sur-face | $a_{10}$ | $a_{12}$ | $a_{14}$ | $a_{16}$ | |
| 11 | 4.535757E-02 | 3.068385E-01 | -4.754317E-01 | 0.000000E+00 | |
| 12 | 6.500451E-01 | 0.000000E+00 | 0.000000E+00 | 0.000000E+00 | |
| 21 | 0.000000E+00 | 0.000000E+00 | 0.000000E+00 | 0.000000E+00 | |
| 22 | 0.000000E+00 | 0.000000E+00 | 0.000000E+00 | 0.000000E+00 | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |

FIG. 10

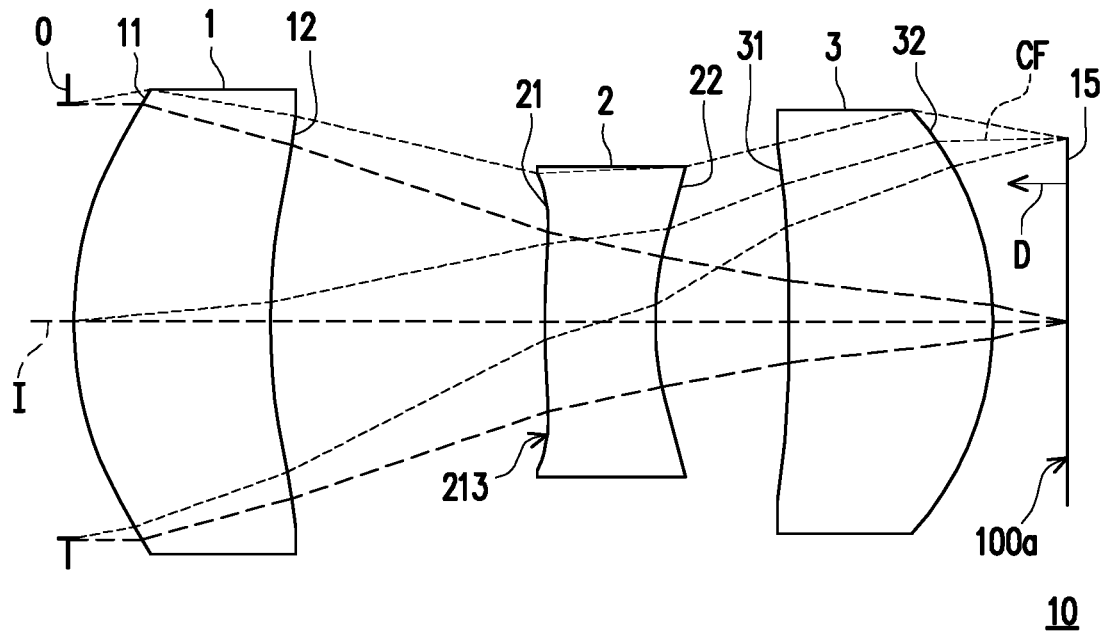
FIG. 11
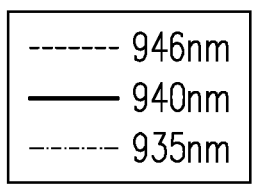
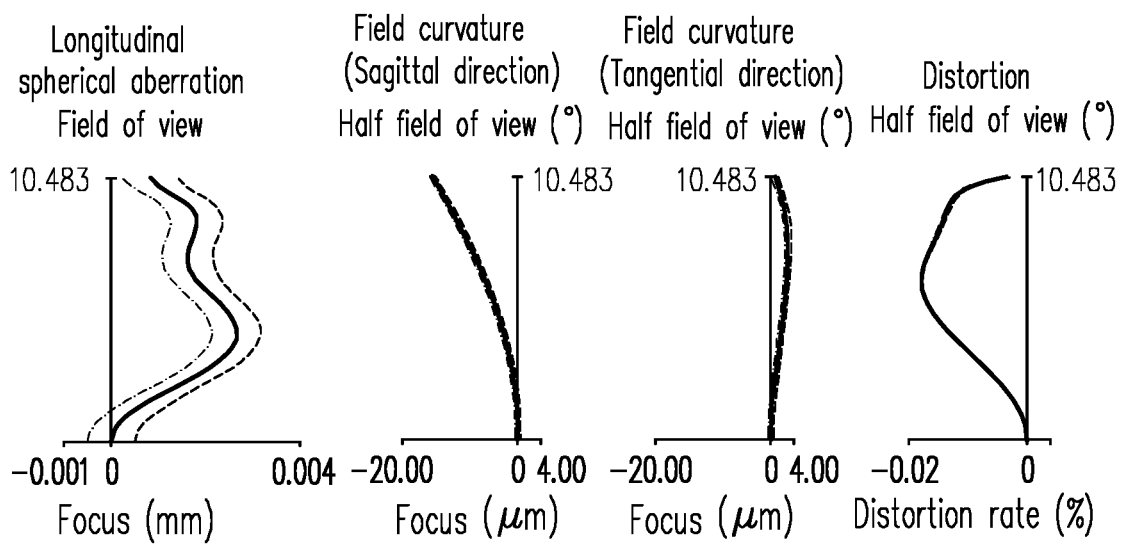
FIG. 12A   FIG. 12B   FIG. 12C   FIG. 12D

| Second embodiment ||||||
|---|---|---|---|---|---|
| TTL=2.700 mm , EFL=2.700 mm , HFOV=10.483° , Fno=2.274 ||||||
| Element | Surface | Radius of curvature(mm) | Thickness (mm) | Refractive index | Abbe number | Focal length(mm) |
| Object | | Infinite | Infinite | | | |
| Aperture stop 0 | | Infinite | 0.015 | | | |
| First lens element 1 | Light output surface 11 | 1.011 | 0.534 | 1.851 | 40.104 | 2.151 |
| | Light input surface 12 | 1.766 | 0.747 | | | |
| Second lens element 2 | Light output surface 21 | 2.089 | 0.300 | 1.642 | 22.409 | -2.143 |
| | Light input surface 22 | 0.767 | 0.363 | | | |
| Third lens element 3 | Light output surface 31 | -5.514 | 0.556 | 1.642 | 22.409 | 1.622 |
| | Light input surface 32 | -0.882 | 0.200 | | | |
| Structured light generating unit 15 | Light emitting surface 100a | Infinite | | | | |

FIG. 13

| Surface | K | $a_2$ | $a_4$ | $a_6$ | $a_8$ |
|---|---|---|---|---|---|
| 11 | 2.166088E-01 | 0.000000E+00 | -7.806517E-02 | -4.960446E-02 | -2.703302E-01 |
| 12 | 0.000000E+00 | 0.000000E+00 | -1.197341E-01 | -1.684720E-01 | -2.537651E-01 |
| 21 | 0.000000E+00 | 0.000000E+00 | -1.602388E+00 | -3.184443E+00 | -4.777942E+00 |
| 22 | 0.000000E+00 | 0.000000E+00 | -1.123665E+00 | -2.827772E+00 | 8.680835E+00 |
| 31 | 0.000000E+00 | 0.000000E+00 | 6.626129E-03 | -2.570785E-01 | -1.948050E+00 |
| 32 | 0.000000E+00 | 0.000000E+00 | -3.091230E-02 | 9.688448E-02 | -6.415301E-01 |
| Surface | $a_{10}$ | $a_{12}$ | $a_{14}$ | $a_{16}$ | |
| 11 | 6.955373E-02 | -9.924816E-02 | -2.863955E-01 | -7.675525E-01 | |
| 12 | -6.331025E-01 | 3.096425E-01 | 8.448592E-01 | 0.000000E+00 | |
| 21 | 0.000000E+00 | 0.000000E+00 | 0.000000E+00 | 0.000000E+00 | |
| 22 | 0.000000E+00 | 0.000000E+00 | 0.000000E+00 | 0.000000E+00 | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |

FIG. 14

| Third embodiment | | | | | | |
|---|---|---|---|---|---|---|
| TTL=2.841 mm , EFL=2.975 mm , HFOV=9.342° , Fno=2.284 | | | | | | |
| Element | Surface | Radius of curvature(mm) | Thickness (mm) | Refractive index | Abbe number | Focal length(mm) |
| Object | | Infinite | Infinite | | | |
| Aperture stop 0 | | Infinite | 0.015 | | | |
| First lens element 1 | Light output surface 11 | 1.070 | 0.437 | 1.851 | 40.104 | 2.219 |
| | Light input surface 12 | 2.076 | 0.773 | | | |
| Second lens element 2 | Light output surface 21 | 1.908 | 0.544 | 1.642 | 22.409 | -1.561 |
| | Light input surface 22 | 0.572 | 0.317 | | | |
| Third lens element 3 | Light output surface 31 | -10.874 | 0.604 | 1.642 | 22.409 | 1.818 |
| | Light input surface 32 | -1.042 | 0.166 | | | |
| Structured light generating unit 15 | Light emitting surface 100a | Infinite | | | | |

FIG. 17

| Surface | K | $a_2$ | $a_4$ | $a_6$ | $a_8$ |
|---|---|---|---|---|---|
| 11 | 4.170371E-01 | 0.000000E+00 | -1.160010E-01 | -1.147874E-01 | -2.703302E-01 |
| 12 | -7.920495E-01 | 0.000000E+00 | -1.478895E-01 | -1.972815E-01 | -2.537651E-01 |
| 21 | 1.553344E+01 | 0.000000E+00 | -1.236345E+00 | -1.593116E+00 | -4.777942E+00 |
| 22 | 2.904919E-01 | 0.000000E+00 | -7.118295E-01 | -4.138492E+00 | 8.680835E+00 |
| 31 | -4.380859E+02 | 0.000000E+00 | 1.514922E-01 | 1.591792E+00 | -1.948050E+00 |
| 32 | 0.000000E+00 | 0.000000E+00 | -3.091230E-02 | 9.688448E-02 | -6.415301E-01 |
| Surface | $a_{10}$ | $a_{12}$ | $a_{14}$ | $a_{16}$ | |
| 11 | -2.766638E-01 | 4.829844E-01 | -1.016028E+00 | -7.675525E-01 | |
| 12 | -1.606123E-01 | 8.129425E-02 | 2.349286E-01 | 0.000000E+00 | |
| 21 | -1.139678E+02 | 1.013892E+03 | -3.032122E+03 | 0.000000E+00 | |
| 22 | -3.150900E+01 | 4.772098E+02 | -3.294900E+03 | 0.000000E+00 | |
| 31 | -8.213026E+01 | 6.624136E+02 | -1.500767E+03 | 0.000000E+00 | |
| 32 | 0.000000E+00 | 0.000000E+00 | 0.000000E+00 | 0.000000E+00 | |

FIG. 18

| Fourth embodiment | | | | | | |
|---|---|---|---|---|---|---|
| TTL= 2.642 mm , EFL= 2.828 mm , HFOV=9.938° , Fno= 2.279 | | | | | | |
| Element | Surface | Radius of curvature(mm) | Thickness (mm) | Refractive index | Abbe number | Focal length(mm) |
| Object | | Infinite | Infinite | | | |
| Aperture stop 0 | | Infinite | 0.015 | | | |
| First lens element 1 | Light output surface 11 | 1.050 | 0.565 | 1.851 | 40.104 | 1.916 |
| | Light input surface 12 | 2.330 | 0.278 | | | |
| Second lens element 2 | Light output surface 21 | 1.790 | 0.262 | 1.642 | 22.409 | -3.279 |
| | Light input surface 22 | 0.898 | 0.848 | | | |
| Third lens element 3 | Light output surface 31 | -1.082 | 0.489 | 1.642 | 22.409 | 3.173 |
| | Light input surface 32 | -0.818 | 0.200 | | | |
| Structured light generating unit 15 | Light emitting surface 100a | Infinite | | | | |

FIG. 21

| Surface | K | $a_2$ | $a_4$ | $a_6$ | $a_8$ |
|---|---|---|---|---|---|
| 11 | -2.680682E-01 | 0.000000E+00 | 2.201681E-02 | 1.665946E-02 | -2.376431E-02 |
| 12 | 8.138429E+00 | 0.000000E+00 | 7.225994E-02 | -1.837288E-01 | -9.981480E-01 |
| 21 | -1.986817E-01 | 0.000000E+00 | 9.552712E-01 | -1.469889E+00 | 1.045074E-01 |
| 22 | 9.933364E-01 | 0.000000E+00 | 1.509608E+00 | 4.626886E-01 | 2.909555E+00 |
| 31 | -2.055571E-01 | 0.000000E+00 | -4.769391E-01 | 7.815692E-01 | -6.105561E+00 |
| 32 | 0.000000E+00 | 0.000000E+00 | -5.567582E-02 | -1.868390E-02 | -4.512015E-01 |
| Surface | $a_{10}$ | $a_{12}$ | $a_{14}$ | $a_{16}$ | |
| 11 | -1.720467E-01 | 3.068385E-01 | -4.754317E-01 | 0.000000E+00 | |
| 12 | 1.652078E-01 | 0.000000E+00 | 0.000000E+00 | 0.000000E+00 | |
| 21 | -6.920043E+00 | 0.000000E+00 | 0.000000E+00 | 0.000000E+00 | |
| 22 | -7.054837E+00 | 0.000000E+00 | 0.000000E+00 | 0.000000E+00 | |
| 31 | 1.867600E+00 | 0.000000E+00 | 0.000000E+00 | 0.000000E+00 | |
| 32 | 0.000000E+00 | 0.000000E+00 | 0.000000E+00 | 0.000000E+00 | |

FIG. 22

| Fifth embodiment ||||||
|---|---|---|---|---|---|
| TTL= 2.730 mm , EFL= 2.451 mm , HFOV=9.554° , Fno= 2.274 ||||||
| Element | Surface | Radius of curvature(mm) | Thickness (mm) | Refractive index | Abbe number | Focal length(mm) |
| Object | | Infinite | Infinite | | | |
| Aperture stop 0 | | Infinite | 0.015 | | | |
| First lens element 1 | Light output surface 11 | 1.506 | 0.426 | 1.851 | 40.104 | 2.149 |
| | Light input surface 12 | 8.379 | 0.351 | | | |
| Second lens element 2 | Light output surface 21 | 0.795 | 0.297 | 1.642 | 22.409 | -3.188 |
| | Light input surface 22 | 0.486 | 0.944 | | | |
| Third lens element 3 | Light output surface 31 | -29.282 | 0.512 | 1.642 | 22.409 | 1.351 |
| | Light input surface 32 | -0.818 | 0.200 | | | |
| Structured light generating unit 15 | Light emitting surface 100a | Infinite | | | | |

FIG. 25

| Surface | K | $a_2$ | $a_4$ | $a_6$ | $a_8$ |
|---|---|---|---|---|---|
| 11 | 2.590922E+00 | 0.000000E+00 | 1.913962E-01 | -7.375391E-02 | 4.829439E-01 |
| 12 | 2.563227E+02 | 0.000000E+00 | 6.126617E-01 | -1.584045E-01 | 8.928084E-01 |
| 21 | 9.324799E-01 | 0.000000E+00 | -4.843166E-02 | -4.012026E+00 | 1.868844E+01 |
| 22 | 8.489531E-02 | 0.000000E+00 | -1.300764E+00 | -1.158520E+01 | 7.124991E+01 |
| 31 | 8.201664E+02 | 0.000000E+00 | -1.781085E+00 | -4.059197E+00 | 1.853926E+01 |
| 32 | 0.000000E+00 | 0.000000E+00 | -5.567582E-02 | -1.868390E-02 | -4.512015E-01 |

| Surface | $a_{10}$ | $a_{12}$ | $a_{14}$ | $a_{16}$ |
|---|---|---|---|---|
| 11 | 3.688086E-01 | 3.068385E-01 | -4.754317E-01 | 0.000000E+00 |
| 12 | 9.355032E+00 | 0.000000E+00 | 0.000000E+00 | 0.000000E+00 |
| 21 | -3.558731E+01 | 0.000000E+00 | 0.000000E+00 | 0.000000E+00 |
| 22 | -2.526665E+02 | 0.000000E+00 | 0.000000E+00 | 0.000000E+00 |
| 31 | -1.557145E+02 | 0.000000E+00 | 0.000000E+00 | 0.000000E+00 |
| 32 | 0.000000E+00 | 0.000000E+00 | 0.000000E+00 | 0.000000E+00 |

FIG. 26

| Sixth embodiment ||||||
|---|---|---|---|---|---|
| TTL= 2.730 mm , EFL= 2.451 mm , HFOV=9.554° , Fno= 2.274 ||||||
| Element | Surface | Radius of curvature(mm) | Thickness (mm) | Refractive index | Abbe number | Focal length(mm) |
| Object | | Infinite | Infinite | | | |
| Aperture stop 0 | | Infinite | 0.015 | | | |
| First lens element 1 | Light output surface 11 | 0.958 | 0.585 | 1.851 | 40.104 | 1.669 |
| | Light input surface 12 | 2.239 | 0.320 | | | |
| Second lens element 2 | Light output surface 21 | -126987.105 | 0.245 | 1.642 | 22.409 | -2.484 |
| | Light input surface 22 | 1.537 | 0.570 | | | |
| Third lens element 3 | Light output surface 31 | -0.932 | 0.771 | 1.642 | 22.409 | 3.015 |
| | Light input surface 32 | -0.818 | 0.200 | | | |
| Structured light generating unit 15 | Light emitting surface 100a | Infinite | | | | |

FIG. 29

| Surface | K | $a_2$ | $a_4$ | $a_6$ | $a_8$ |
|---|---|---|---|---|---|
| 11 | -2.603720E-02 | 0.000000E+00 | 7.878514E-03 | 2.591150E-02 | -2.796563E-03 |
| 12 | 2.784978E+00 | 0.000000E+00 | 9.391678E-02 | -1.138324E-01 | 8.504548E-01 |
| 21 | 2.866409E+10 | 0.000000E+00 | 3.973423E-01 | -1.621607E+00 | 4.425258E-02 |
| 22 | -2.579025E+00 | 0.000000E+00 | 1.084024E+00 | -1.228843E+00 | 3.161663E+00 |
| 31 | 3.821474E+00 | 0.000000E+00 | -2.430028E-01 | -5.084384E-02 | -1.106998E+00 |
| 32 | 0.000000E+00 | 0.000000E+00 | -5.567582E-02 | -1.868390E-02 | -4.512015E-01 |
| Surface | $a_{10}$ | $a_{12}$ | $a_{14}$ | $a_{16}$ | |
| 11 | 4.281188E-03 | 3.068385E-01 | -4.754317E-01 | 0.000000E+00 | |
| 12 | -2.580846E+00 | 0.000000E+00 | 0.000000E+00 | 0.000000E+00 | |
| 21 | -1.102403E+01 | 0.000000E+00 | 0.000000E+00 | 0.000000E+00 | |
| 22 | -3.962994E+01 | 0.000000E+00 | 0.000000E+00 | 0.000000E+00 | |
| 31 | -2.140100E+01 | 0.000000E+00 | 0.000000E+00 | 0.000000E+00 | |
| 32 | 0.000000E+00 | 0.000000E+00 | 0.000000E+00 | 0.000000E+00 | |

FIG. 30

| Seventh embodiment ||||||
|---|---|---|---|---|---|
| TTL= 4.995 mm , EFL= 2.881 mm , HFOV= 8.544° , Fno= 2.592 ||||||
| Element | Surface | Radius of curvature(mm) | Thickness (mm) | Refractive index | Abbe number | Focal length(mm) |
| Object |  | Infinite | Infinite |  |  |  |
| Aperture stop 0 |  | Infinite | -0.124 |  |  |  |
| First lens element 1 | Light output surface 11 | 1.400 | 0.424 | 1.851 | 40.104 | 3.901 |
|  | Light input surface 12 | 2.124 | 0.148 |  |  |  |
| Second lens element 2 | Light output surface 21 | 1.344 | 0.502 | 1.642 | 22.409 | -4.699 |
|  | Light input surface 22 | 0.788 | 0.789 |  |  |  |
| Third lens element 3 | Light output surface 31 | -0.516 | 0.262 | 1.642 | 22.409 | 15.287 |
|  | Light input surface 32 | -0.584 | 0.081 |  |  |  |
| Fourth lens element 4 | Light output surface 41 | -1.210 | 0.737 | 1.642 | 22.409 | 2.339 |
|  | Light input surface 42 | -0.813 | 2.054 |  |  |  |
| Structured light generating unit 15 | Light emitting surface 100a | Infinite |  |  |  |  |

FIG. 33

| Surface | K | $a_2$ | $a_4$ | $a_6$ | $a_8$ |
|---|---|---|---|---|---|
| 11 | 7.887910E-01 | 0.000000E+00 | -2.941764E-02 | 6.819682E-02 | 3.147005E-01 |
| 12 | 9.476996E-01 | 0.000000E+00 | 1.490747E-02 | 2.519815E-01 | 8.756602E-01 |
| 21 | -5.629772E-01 | 0.000000E+00 | 2.491351E-01 | -9.995993E-02 | -2.446253E+00 |
| 22 | -3.425726E-01 | 0.000000E+00 | 9.064513E-01 | 2.594705E+00 | -4.582657E+01 |
| 31 | -1.532017E+00 | 0.000000E+00 | 2.712594E-01 | 5.824690E+00 | -4.360633E+01 |
| 32 | -2.606621E+00 | 0.000000E+00 | 5.684647E-01 | 1.298904E-01 | 1.236160E+01 |
| 41 | -1.726884E+00 | 0.000000E+00 | 3.524534E-01 | 2.788638E+00 | -1.135153E+01 |
| 42 | -1.975454E-01 | 0.000000E+00 | 1.821380E-01 | 4.266597E-02 | 1.329353E-01 |

| Surface | $a_{10}$ | $a_{12}$ | $a_{14}$ | $a_{16}$ |
|---|---|---|---|---|
| 11 | 4.583429E-01 | -7.473883E-01 | 0.000000E+00 | 0.000000E+00 |
| 12 | -3.353654E-02 | 5.034025E+00 | 0.000000E+00 | 0.000000E+00 |
| 21 | 6.186230E+00 | -5.894753E+00 | 0.000000E+00 | 0.000000E+00 |
| 22 | 2.288660E+02 | -5.049831E+02 | 0.000000E+00 | 0.000000E+00 |
| 31 | 1.110554E+02 | -6.270431E+01 | 0.000000E+00 | 0.000000E+00 |
| 32 | -1.167407E+02 | 2.141290E+02 | 0.000000E+00 | 0.000000E+00 |
| 41 | -1.126791E+01 | 3.964545E+01 | 0.000000E+00 | 0.000000E+00 |
| 42 | -6.162434E-01 | 4.462097E-01 | 0.000000E+00 | 0.000000E+00 |

FIG. 34

| Eighth embodiment | | | | | | |
|---|---|---|---|---|---|---|
| TTL= 4.510 mm , EFL= 2.853 mm , HFOV= 9.077° , Fno= 2.462 | | | | | | |
| Element | Surface | Radius of curvature(mm) | Thickness (mm) | Refractive index | Abbe number | Focal length(mm) |
| Object | | Infinite | Infinite | | | |
| Aperture stop 0 | | Infinite | -0.124 | | | |
| First lens element 1 | Light output surface 11 | 1.376 | 0.420 | 1.851 | 40.104 | 3.779 |
| | Light input surface 12 | 2.109 | 0.067 | | | |
| Second lens element 2 | Light output surface 21 | 1.289 | 0.541 | 1.642 | 22.409 | -5.575 |
| | Light input surface 22 | 0.788 | 0.713 | | | |
| Third lens element 3 | Light output surface 31 | -0.518 | 0.250 | 1.642 | 22.409 | 17.931 |
| | Light input surface 32 | -0.586 | 0.064 | | | |
| Fourth lens element 4 | Light output surface 41 | -1.198 | 0.719 | 1.642 | 22.409 | 2.330 |
| | Light input surface 42 | -0.805 | 1.736 | | | |
| Structured light generating unit 15 | Light emitting surface 100a | Infinite | | | | |

FIG. 37

| Surface | K | $a_2$ | $a_4$ | $a_6$ | $a_8$ |
|---|---|---|---|---|---|
| 11 | 7.433222E-01 | 0.000000E+00 | -3.162483E-02 | 5.637215E-02 | 2.688935E-01 |
| 12 | 8.861208E-01 | 0.000000E+00 | 1.410570E-02 | 2.413195E-01 | 7.512462E-01 |
| 21 | -4.851720E-01 | 0.000000E+00 | 2.543218E-01 | -7.659151E-02 | -2.423245E+00 |
| 22 | -3.316051E-01 | 0.000000E+00 | 8.972987E-01 | 2.945970E+00 | -4.341696E+01 |
| 31 | -1.605882E+00 | 0.000000E+00 | 2.694563E-01 | 5.725028E+00 | -4.344405E+01 |
| 32 | -2.241319E+00 | 0.000000E+00 | 5.580520E-01 | 1.737044E-01 | 1.205954E+01 |
| 41 | -1.300682E+00 | 0.000000E+00 | 3.256262E-01 | 2.261945E+00 | -1.124106E+01 |
| 42 | -1.713441E-01 | 0.000000E+00 | 1.470466E-01 | 6.282792E-02 | 9.650028E-02 |
| Surface | $a_{10}$ | $a_{12}$ | $a_{14}$ | $a_{16}$ | |
| 11 | 3.713732E-01 | -8.701645E-01 | 0.000000E+00 | 0.000000E+00 | |
| 12 | -1.065719E+00 | 1.840409E-01 | 0.000000E+00 | 0.000000E+00 | |
| 21 | 5.702546E+00 | -9.827749E+00 | 0.000000E+00 | 0.000000E+00 | |
| 22 | 2.348227E+02 | -5.224306E+02 | 0.000000E+00 | 0.000000E+00 | |
| 31 | 1.116642E+02 | -6.078009E+01 | 0.000000E+00 | 0.000000E+00 | |
| 32 | -1.172283E+02 | 2.151026E+02 | 0.000000E+00 | 0.000000E+00 | |
| 41 | -1.071329E+01 | 3.907917E+01 | 0.000000E+00 | 0.000000E+00 | |
| 42 | -6.099624E-01 | 5.572854E-01 | 0.000000E+00 | 0.000000E+00 | |

FIG. 38

| Ninth embodiment | | | | | | |
|---|---|---|---|---|---|---|
| TTL= 2.930 mm , EFL= 2.625 mm , HFOV= 9.963° , Fno= 2.211 | | | | | | |
| Element | Surface | Radius of curvature(mm) | Thickness (mm) | Refractive index | Abbe number | Focal length(mm) |
| Object | | Infinite | Infinite | | | |
| Aperture stop 0 | | Infinite | -0.167 | | | |
| First lens element 1 | Light output surface 11 | 1.045 | 0.386 | 1.851 | 40.104 | 2.491 |
| | Light input surface 12 | 1.756 | 0.290 | | | |
| Second lens element 2 | Light output surface 21 | 0.833 | 0.242 | 1.642 | 22.409 | -11.482 |
| | Light input surface 22 | 0.663 | 0.670 | | | |
| Third lens element 3 | Light output surface 31 | -0.812 | 0.358 | 1.642 | 22.409 | 26.506 |
| | Light input surface 32 | -0.904 | 0.127 | | | |
| Fourth lens element 4 | Light output surface 41 | -1.536 | 0.397 | 1.642 | 22.409 | 2.391 |
| | Light input surface 42 | -0.828 | 0.461 | | | |
| Structured light generating unit 15 | Light emitting surface 100a | Infinite | | | | |

FIG. 41

| Sur-face | K | $a_2$ | $a_4$ | $a_6$ | $a_8$ |
|---|---|---|---|---|---|
| 11 | 3.177049E-01 | 0.000000E+00 | -4.048907E-02 | 2.945955E-03 | -1.482305E-02 |
| 12 | 8.679210E-02 | 0.000000E+00 | 1.525479E-03 | 4.436822E-02 | 2.430348E-01 |
| 21 | -1.663382E-01 | 0.000000E+00 | 2.374722E-01 | 6.369732E-02 | -2.600777E-01 |
| 22 | -7.730651E-02 | 0.000000E+00 | 6.966821E-01 | 4.854294E+00 | -3.912145E+01 |
| 31 | -1.461684E+00 | 0.000000E+00 | 4.340878E-02 | 3.417371E+00 | -2.143735E+01 |
| 32 | -9.181467E-01 | 0.000000E+00 | 7.123416E-01 | -3.093599E-01 | 8.705475E+00 |
| 41 | 5.961473E-02 | 0.000000E+00 | 2.964325E-01 | 4.378311E-01 | -2.471729E+00 |
| 42 | -3.032216E-01 | 0.000000E+00 | 2.910390E-01 | 1.329915E-01 | 2.513411E-01 |
| Sur-face | $a_{10}$ | $a_{12}$ | $a_{14}$ | $a_{16}$ | |
| 11 | -1.377690E-02 | 1.170293E-01 | 0.000000E+00 | 0.000000E+00 | |
| 12 | 5.492675E-01 | -1.375742E+00 | 0.000000E+00 | 0.000000E+00 | |
| 21 | 1.126395E+01 | -4.679381E+01 | 0.000000E+00 | 0.000000E+00 | |
| 22 | 3.290829E+02 | -9.507826E+02 | 0.000000E+00 | 0.000000E+00 | |
| 31 | 3.403427E+01 | -2.784291E+02 | 0.000000E+00 | 0.000000E+00 | |
| 32 | -1.175540E+02 | 1.993475E+02 | 0.000000E+00 | 0.000000E+00 | |
| 41 | -9.964723E+00 | -1.726240E+01 | 0.000000E+00 | 0.000000E+00 | |
| 42 | -7.198285E-02 | -3.946101E-01 | 0.000000E+00 | 0.000000E+00 | |

FIG. 42

| Tenth embodiment ||||||
|---|---|---|---|---|---|
| TTL= 2.982 mm , EFL= 3.135 mm , HFOV= 9.171° , Fno= 2.640 ||||||
| Element | Surface | Radius of curvature(mm) | Thickness (mm) | Refractive index | Abbe number | Focal length(mm) |
|---|---|---|---|---|---|---|
| Object | | Infinite | Infinite | | | |
| Aperture stop 0 | | Infinite | -0.162 | | | |
| First lens element 1 | Light output surface 11 | 1.060 | 0.468 | 1.851 | 40.104 | 2.609 |
| | Light input surface 12 | 1.660 | 0.025 | | | |
| Second lens element 2 | Light output surface 21 | 0.973 | 0.548 | 1.642 | 22.409 | -11.372 |
| | Light input surface 22 | 0.671 | 0.393 | | | |
| Third lens element 3 | Light output surface 31 | -0.693 | 0.452 | 1.642 | 22.409 | -255.000 |
| | Light input surface 32 | -0.870 | 0.399 | | | |
| Fourth lens element 4 | Light output surface 41 | -1.372 | 0.527 | 1.642 | 22.409 | 2.508 |
| | Light input surface 42 | -0.835 | 0.172 | | | |
| Structured light generating unit 15 | Light emitting surface 100a | Infinite | | | | |

FIG. 45

| Surface | K | $a_2$ | $a_4$ | $a_6$ | $a_8$ |
|---|---|---|---|---|---|
| 11 | 3.626803E-01 | 0.000000E+00 | -4.396566E-02 | -2.395740E-02 | -6.809830E-02 |
| 12 | 8.124696E-01 | 0.000000E+00 | 2.214224E-02 | 5.077046E-02 | 3.746060E-01 |
| 21 | -3.665954E-01 | 0.000000E+00 | 1.787528E-01 | 3.099287E-01 | -1.856376E-01 |
| 22 | 1.422542E-01 | 0.000000E+00 | 8.453160E-01 | 4.346870E+00 | 6.711242E+00 |
| 31 | -1.738260E+00 | 0.000000E+00 | 2.039899E-01 | 3.392383E+00 | -8.289033E-01 |
| 32 | -1.185763E+00 | 0.000000E+00 | 7.348208E-01 | -3.362957E-01 | 1.154203E+01 |
| 41 | -8.864048E-01 | 0.000000E+00 | 2.500218E-01 | -2.161895E+00 | -1.461693E-01 |
| 42 | 2.477290E-01 | 0.000000E+00 | -1.320014E-01 | 2.102639E-01 | -2.126289E-01 |
| Surface | $a_{10}$ | $a_{12}$ | $a_{14}$ | $a_{16}$ | |
| 11 | 1.448056E-01 | -1.502083E-01 | 0.000000E+00 | 0.000000E+00 | |
| 12 | 5.270290E-01 | -2.435573E+00 | 0.000000E+00 | 0.000000E+00 | |
| 21 | 5.452874E+00 | -1.290708E+01 | 0.000000E+00 | 0.000000E+00 | |
| 22 | 1.537464E+02 | 6.660532E+02 | 0.000000E+00 | 0.000000E+00 | |
| 31 | 9.315128E+01 | -3.216072E+02 | 0.000000E+00 | 0.000000E+00 | |
| 32 | -5.230468E+01 | 9.270183E+01 | 0.000000E+00 | 0.000000E+00 | |
| 41 | 2.126979E+00 | -5.340823E+01 | 0.000000E+00 | 0.000000E+00 | |
| 42 | -1.853582E+00 | 2.073269E+00 | 0.000000E+00 | 0.000000E+00 | |

FIG. 46

| Eleventh embodiment ||||||||
| TTL= 2.982 mm , EFL= 3.135 mm , HFOV= 9.171° , Fno= 2.640 ||||||||
| Element | Surface | Radius of curvature(mm) | Thickness (mm) | Refractive index | Abbe number | Focal length(mm) |
|---|---|---|---|---|---|---|
| Object | | Infinite | Infinite | | | |
| Aperture stop 0 | | Infinite | -0.136 | | | |
| First lens element 1 | Light output surface 11 | 1.179 | 0.445 | 1.851 | 40.104 | 3.090 |
| | Light input surface 12 | 1.806 | 0.074 | | | |
| Second lens element 2 | Light output surface 21 | 1.050 | 0.463 | 1.642 | 22.409 | -6.371 |
| | Light input surface 22 | 0.689 | 0.438 | | | |
| Third lens element 3 | Light output surface 31 | -0.584 | 0.281 | 1.642 | 22.409 | -41.779 |
| | Light input surface 32 | -0.708 | 0.272 | | | |
| Fourth lens element 4 | Light output surface 41 | -1.105 | 0.563 | 1.642 | 22.409 | 2.571 |
| | Light input surface 42 | -0.779 | 1.364 | | | |
| Structured light generating unit 15 | Light emitting surface 100a | Infinite | | | | |

FIG. 49

| Surface | K | $a_2$ | $a_4$ | $a_6$ | $a_8$ |
|---|---|---|---|---|---|
| 11 | 3.106144E-01 | 0.000000E+00 | -6.157747E-02 | -1.344305E-02 | 2.705304E-02 |
| 12 | 1.954658E-01 | 0.000000E+00 | 3.224115E-03 | -8.994805E-03 | 3.661806E-02 |
| 21 | -5.151035E-02 | 0.000000E+00 | 2.871586E-01 | 4.118408E-01 | -1.141989E+00 |
| 22 | -3.169028E-03 | 0.000000E+00 | 9.470680E-01 | 4.707847E+00 | -2.944746E+01 |
| 31 | -1.492895E+00 | 0.000000E+00 | 2.474713E-01 | 5.725960E+00 | -4.131578E+01 |
| 32 | -1.755832E+00 | 0.000000E+00 | 7.581337E-01 | 3.235115E-01 | 1.050981E+01 |
| 41 | -7.456474E-01 | 0.000000E+00 | 2.809387E-01 | -4.811445E-01 | -2.433966E+00 |
| 42 | -3.397039E-03 | 0.000000E+00 | 9.315003E-02 | 8.182844E-02 | -9.428697E-02 |
| Surface | $a_{10}$ | $a_{12}$ | $a_{14}$ | $a_{16}$ | |
| 11 | -1.215594E-01 | -9.157074E-04 | 0.000000E+00 | 0.000000E+00 | |
| 12 | -2.313143E-01 | -8.686450E-01 | 0.000000E+00 | 0.000000E+00 | |
| 21 | 3.836364E+00 | -6.992601E+00 | 0.000000E+00 | 0.000000E+00 | |
| 22 | 3.163064E+02 | -4.673628E+02 | 0.000000E+00 | 0.000000E+00 | |
| 31 | 1.136289E+02 | -7.239357E+01 | 0.000000E+00 | 0.000000E+00 | |
| 32 | -1.139233E+02 | 2.566724E+02 | 0.000000E+00 | 0.000000E+00 | |
| 41 | -5.668242E+00 | -1.628181E+00 | 0.000000E+00 | 0.000000E+00 | |
| 42 | -5.025642E-01 | 4.263277E-01 | 0.000000E+00 | 0.000000E+00 | |

FIG. 50

| Twelfth embodiment ||||||
|---|---|---|---|---|---|
| TTL= 2.772 mm , EFL= 1.955 mm , HFOV= 9.999° , Fno= 1.768 ||||||
| Element | Surface | Radius of curvature(mm) | Thickness (mm) | Refractive index | Abbe number | Focal length(mm) |
| Object | | Infinite | Infinite | | | |
| Aperture stop 0 | | Infinite | -0.105 | | | |
| First lens element 1 | Light output surface 11 | 1.501 | 0.288 | 1.851 | 40.104 | 2.858 |
| | Light input surface 12 | 3.723 | 0.175 | | | |
| Second lens element 2 | Light output surface 21 | 0.919 | 0.347 | 1.642 | 22.409 | -24.182 |
| | Light input surface 22 | 0.741 | 1.014 | | | |
| Third lens element 3 | Light output surface 31 | -0.425 | 0.397 | 1.642 | 22.409 | 1.285 |
| | Light input surface 32 | -0.376 | 0.050 | | | |
| Fourth lens element 4 | Light output surface 41 | -13.075 | 0.265 | 1.642 | 22.409 | 2.312 |
| | Light input surface 42 | -1.300 | 0.236 | | | |
| Structured light generating unit 15 | Light emitting surface 100a | Infinite | | | | |

FIG. 53

| Surface | K | $a_2$ | $a_4$ | $a_6$ | $a_8$ |
|---|---|---|---|---|---|
| 11 | 9.233013E-01 | 0.000000E+00 | -1.815561E-02 | -1.214516E-01 | 5.139982E-02 |
| 12 | -1.759309E+01 | 0.000000E+00 | -2.339729E-02 | 2.598001E-01 | 2.058523E-02 |
| 21 | 6.245697E-02 | 0.000000E+00 | 3.854062E-01 | -6.652430E-01 | -2.256620E+00 |
| 22 | -9.215336E-01 | 0.000000E+00 | 6.577363E-01 | 4.455887E+00 | -6.175497E+01 |
| 31 | -4.860871E-01 | 0.000000E+00 | 5.496512E-02 | 4.966955E+00 | 1.189206E+01 |
| 32 | -1.159535E+00 | 0.000000E+00 | 7.749871E-01 | 1.105093E+00 | 1.057780E+01 |
| 41 | 4.677799E+02 | 0.000000E+00 | 1.876434E-01 | -9.431222E-02 | -2.003150E+00 |
| 42 | -1.366355E+00 | 0.000000E+00 | 1.648003E-01 | 3.366198E-01 | 8.289955E-01 |
| Surface | $a_{10}$ | $a_{12}$ | $a_{14}$ | $a_{16}$ | |
| 11 | 1.302505E+00 | -1.526965E+00 | 0.000000E+00 | 0.000000E+00 | |
| 12 | -1.672478E+00 | 4.076350E+00 | 0.000000E+00 | 0.000000E+00 | |
| 21 | 7.060145E+00 | -5.283858E+00 | 0.000000E+00 | 0.000000E+00 | |
| 22 | 2.775006E+02 | -4.864985E+02 | 0.000000E+00 | 0.000000E+00 | |
| 31 | 2.675957E+02 | -3.381575E+03 | 0.000000E+00 | 0.000000E+00 | |
| 32 | -1.232341E+02 | 1.748236E+02 | 0.000000E+00 | 0.000000E+00 | |
| 41 | -4.258896E+00 | 1.529905E+01 | 0.000000E+00 | 0.000000E+00 | |
| 42 | 1.592459E+00 | -1.081537E+00 | 0.000000E+00 | 0.000000E+00 | |

FIG. 54

| Thirteenth embodiment ||||||
| --- | --- | --- | --- | --- | --- |
| TTL= 2.971 mm , EFL= 2.995 mm , HFOV= 9.912° , Fno= 2.541 ||||||
| Element | Surface | Radius of curvature(mm) | Thickness (mm) | Refractive index | Abbe number | Focal length(mm) |
| Object | | Infinite | Infinite | | | |
| Aperture stop 0 | | Infinite | -0.146 | | | |
| First lens element 1 | Light output surface 11 | 1.113 | 0.587 | 1.851 | 40.104 | 2.532 |
| | Light input surface 12 | 1.797 | 0.021 | | | |
| Second lens element 2 | Light output surface 21 | 0.932 | 0.442 | 1.642 | 22.409 | -13.300 |
| | Light input surface 22 | 0.686 | 0.438 | | | |
| Third lens element 3 | Light output surface 31 | -0.805 | 0.422 | 1.642 | 22.409 | 46.715 |
| | Light input surface 32 | -0.940 | 0.348 | | | |
| Fourth lens element 4 | Light output surface 41 | -1.393 | 0.539 | 1.642 | 22.409 | 2.444 |
| | Light input surface 42 | -0.833 | 0.175 | | | |
| Structured light generating unit 15 | Light emitting surface 100a | Infinite | | | | |

FIG. 57

| Surface | K | $a_2$ | $a_4$ | $a_6$ | $a_8$ |
|---|---|---|---|---|---|
| 11 | 2.256313E-01 | 0.000000E+00 | -6.845781E-02 | -3.075509E-02 | 7.905299E-03 |
| 12 | -6.770953E-02 | 0.000000E+00 | -2.498186E-03 | 1.709458E-02 | 8.476890E-02 |
| 21 | 7.088698E-03 | 0.000000E+00 | 2.868210E-01 | 2.656469E-01 | -9.175895E-01 |
| 22 | -4.286551E-02 | 0.000000E+00 | 8.970921E-01 | 4.892477E+00 | -3.854796E+01 |
| 31 | -6.483604E-01 | 0.000000E+00 | -1.340200E-01 | 2.573602E-01 | -1.548867E+01 |
| 32 | -1.083832E+00 | 0.000000E+00 | 7.170438E-01 | 8.378414E-01 | 3.338660E+00 |
| 41 | -1.272978E+00 | 0.000000E+00 | 3.387719E-01 | 2.911711E-01 | -2.095702E+00 |
| 42 | 3.794310E-02 | 0.000000E+00 | -1.114644E-01 | 1.792854E-01 | 1.724800E-01 |
| Surface | $a_{10}$ | $a_{12}$ | $a_{14}$ | $a_{16}$ | |
| 11 | -3.394652E-03 | 2.546568E-02 | 0.000000E+00 | 0.000000E+00 | |
| 12 | 1.863984E-01 | -1.645705E+00 | 0.000000E+00 | 0.000000E+00 | |
| 21 | 4.116696E+00 | -5.877474E+00 | 0.000000E+00 | 0.000000E+00 | |
| 22 | 3.596164E+02 | -1.241280E+03 | 0.000000E+00 | 0.000000E+00 | |
| 31 | 4.217122E+02 | -2.566354E+03 | 0.000000E+00 | 0.000000E+00 | |
| 32 | -1.011746E+02 | 4.997895E+02 | 0.000000E+00 | 0.000000E+00 | |
| 41 | -4.578125E+00 | 1.162324E+01 | 0.000000E+00 | 0.000000E+00 | |
| 42 | -5.198124E-01 | -7.078300E-01 | 0.000000E+00 | 0.000000E+00 | |

FIG. 58

| Fourteenth embodiment | | | | | | |
|---|---|---|---|---|---|---|
| TTL= 3.146 mm , EFL= 3.344 mm , HFOV= 8.949° , Fno= 2.697 | | | | | | |
| Element | Surface | Radius of curvature(mm) | Thickness (mm) | Refractive index | Abbe number | Focal length(mm) |
| Object | | Infinite | Infinite | | | |
| Aperture stop 0 | | Infinite | -0.131 | | | |
| First lens element 1 | Light output surface 11 | 1.225 | 1.092 | 1.851 | 40.104 | 2.411 |
| | Light input surface 12 | 1.877 | 0.182 | | | |
| Second lens element 2 | Light output surface 21 | 1.235 | 0.284 | 1.642 | 22.409 | -4.044 |
| | Light input surface 22 | 0.754 | 0.444 | | | |
| Third lens element 3 | Light output surface 31 | -0.775 | 0.272 | 1.642 | 22.409 | -32.934 |
| | Light input surface 32 | -0.914 | 0.303 | | | |
| Fourth lens element 4 | Light output surface 41 | -1.375 | 0.336 | 1.642 | 22.409 | 2.965 |
| | Light input surface 42 | -0.860 | 0.233 | | | |
| Structured light generating unit 15 | Light emitting surface 100a | Infinite | | | | |

FIG. 61

| Surface | K | $a_2$ | $a_4$ | $a_6$ | $a_8$ |
|---|---|---|---|---|---|
| 11 | 3.425167E-01 | 0.000000E+00 | -4.198218E-02 | -2.334927E-02 | -6.485481E-02 |
| 12 | 8.290931E-01 | 0.000000E+00 | 1.679989E-02 | 4.967586E-02 | -3.406941E-01 |
| 21 | 3.091223E-01 | 0.000000E+00 | 2.596941E-01 | 2.065130E-01 | 1.337712E+00 |
| 22 | -1.457067E+00 | 0.000000E+00 | 2.564139E-01 | 5.079197E+00 | 6.616514E+01 |
| 31 | -2.290907E+00 | 0.000000E+00 | 2.403225E-01 | 3.101333E+00 | -2.088432E+01 |
| 32 | -8.628696E-01 | 0.000000E+00 | 6.909856E-01 | 8.549261E-02 | 7.568095E+00 |
| 41 | -1.049769E+00 | 0.000000E+00 | 3.156934E-01 | 7.862816E-02 | -2.016828E+00 |
| 42 | 1.203311E-02 | 0.000000E+00 | 5.608795E-02 | 4.621886E-02 | -2.354781E-01 |
| Surface | $a_{10}$ | $a_{12}$ | $a_{14}$ | $a_{16}$ | |
| 11 | 8.868166E-02 | -1.187861E-01 | 0.000000E+00 | 0.000000E+00 | |
| 12 | -3.746846E+00 | -1.012973E+01 | 0.000000E+00 | 0.000000E+00 | |
| 21 | 2.738997E+01 | -1.131863E+02 | 0.000000E+00 | 0.000000E+00 | |
| 22 | 5.802458E+02 | -4.395423E+03 | 0.000000E+00 | 0.000000E+00 | |
| 31 | 3.423304E+01 | -6.940660E+02 | 0.000000E+00 | 0.000000E+00 | |
| 32 | -9.600562E+01 | 1.312580E+02 | 0.000000E+00 | 0.000000E+00 | |
| 41 | -4.318872E+00 | -4.682337E+00 | 0.000000E+00 | 0.000000E+00 | |
| 42 | -2.016061E+00 | -2.607232E+00 | 0.000000E+00 | 0.000000E+00 | |

FIG. 62

| Optical parameters | First embodiment | Second embodiment | Third embodiment | Fourth embodiment | Fifth embodiment | Sixth embodiment |
|---|---|---|---|---|---|---|
| T1 | 0.518 | 0.534 | 0.437 | 0.565 | 0.426 | 0.585 |
| G12 | 0.228 | 0.747 | 0.773 | 0.278 | 0.351 | 0.320 |
| T2 | 0.300 | 0.300 | 0.544 | 0.262 | 0.297 | 0.245 |
| G23 | 0.816 | 0.363 | 0.317 | 0.848 | 0.944 | 0.570 |
| T3 | 0.638 | 0.556 | 0.604 | 0.489 | 0.512 | 0.771 |
| G3F | 0.200 | 0.200 | 0.166 | 0.200 | 0.200 | 0.200 |
| EFL | 2.700 | 2.700 | 2.975 | 2.828 | 2.451 | 2.451 |
| TL | 2.500 | 2.700 | 2.841 | 2.642 | 2.730 | 2.692 |
| BFL | 0.200 | 0.200 | 0.166 | 0.200 | 0.200 | 0.200 |
| ALT | 1.456 | 1.390 | 1.585 | 1.316 | 1.235 | 1.602 |
| AAG | 1.044 | 1.310 | 1.256 | 1.326 | 1.495 | 1.090 |
| TTL | 2.700 | 2.700 | 2.841 | 2.642 | 2.730 | 2.692 |
| (T1+G23) / T2 | 4.447 | 2.991 | 1.386 | 5.400 | 4.609 | 4.709 |
| (T1+T2+G23) / T3 | 2.562 | 2.154 | 2.151 | 3.425 | 3.254 | 1.816 |
| (T1+T2) / G23 | 1.003 | 2.299 | 3.100 | 0.976 | 0.766 | 1.456 |
| (T3+G12+G23) / (T1+T2) | 2.055 | 1.996 | 1.725 | 1.953 | 2.500 | 2.000 |
| (T1+T2+G23) / (T1+T3) | 1.413 | 1.098 | 1.247 | 1.588 | 1.777 | 1.033 |
| (G12+G23) / (T2+T3) | 1.113 | 1.296 | 0.949 | 1.500 | 1.600 | 0.875 |
| (T1+T3) / (G12+G23) | 1.107 | 0.983 | 0.956 | 0.936 | 0.724 | 1.524 |
| ALT / (T2+G12) | 2.756 | 1.328 | 1.204 | 2.437 | 1.905 | 2.835 |
| AAG / T2 | 3.480 | 4.365 | 2.307 | 5.067 | 5.031 | 4.441 |
| (T1+T2+T3) / AAG | 1.395 | 1.062 | 1.262 | 0.993 | 0.826 | 1.470 |
| (T1+T2) / BFL | 4.092 | 4.172 | 5.900 | 4.136 | 3.614 | 4.153 |
| EFL / T1 | 5.208 | 5.052 | 6.800 | 5.001 | 5.758 | 4.188 |
| TTL / (T2+T3+G23) | 1.540 | 2.215 | 1.940 | 1.653 | 1.557 | 1.696 |
| EFL / (G12+G23) | 2.586 | 2.433 | 2.731 | 2.512 | 1.893 | 2.754 |
| TL / (T1+G12) | 3.348 | 2.108 | 2.348 | 3.131 | 3.515 | 2.975 |

FIG. 63

| Optical parameters | Seventh embodiment | Eighth embodiment | Ninth embodiment | Tenth embodiment | Eleventh embodiment | Twelfth embodiment | Thirteenth embodiment | Fourteenth embodiment |
|---|---|---|---|---|---|---|---|---|
| T1 | 0.424 | 0.420 | 0.386 | 0.468 | 0.445 | 0.288 | 0.587 | 1.092 |
| G12 | 0.148 | 0.067 | 0.290 | 0.025 | 0.074 | 0.175 | 0.021 | 0.182 |
| T2 | 0.502 | 0.541 | 0.242 | 0.548 | 0.463 | 0.347 | 0.442 | 0.284 |
| G23 | 0.789 | 0.713 | 0.670 | 0.393 | 0.438 | 1.014 | 0.438 | 0.444 |
| T3 | 0.262 | 0.250 | 0.358 | 0.452 | 0.281 | 0.397 | 0.422 | 0.272 |
| G34 | 0.081 | 0.064 | 0.127 | 0.399 | 0.272 | 0.050 | 0.348 | 0.303 |
| T4 | 0.737 | 0.719 | 0.397 | 0.527 | 0.563 | 0.265 | 0.539 | 0.336 |
| G4F | 2.054 | 1.736 | 0.461 | 0.172 | 1.364 | 0.236 | 0.175 | 0.233 |
| EFL | 2.881 | 2.853 | 2.930 | 3.135 | 3.135 | 1.955 | 2.995 | 3.344 |
| TL | 2.941 | 2.774 | 2.469 | 2.810 | 2.536 | 2.536 | 2.796 | 2.913 |
| BFL | 2.054 | 1.736 | 0.461 | 0.172 | 1.364 | 0.236 | 0.175 | 0.233 |
| ALT | 1.924 | 1.930 | 1.382 | 1.993 | 1.753 | 1.296 | 1.990 | 1.984 |
| AAG | 1.017 | 0.844 | 1.087 | 0.817 | 0.783 | 1.240 | 0.806 | 0.929 |
| TTL | 4.995 | 4.510 | 2.930 | 2.982 | 3.900 | 2.772 | 2.971 | 3.146 |
| (T1+G23) / T2 | 2.416 | 2.093 | 4.372 | 1.571 | 1.908 | 3.752 | 2.318 | 5.400 |
| (T1+T2+G23) / T3 | 6.538 | 6.699 | 3.621 | 3.117 | 4.781 | 4.154 | 3.478 | 6.700 |
| (T1+T2) / G23 | 1.174 | 1.348 | 0.937 | 2.586 | 2.074 | 0.626 | 2.351 | 3.100 |
| (T3+G12+G23) / (T1+T2) | 1.295 | 1.072 | 2.100 | 0.857 | 0.873 | 2.500 | 0.855 | 0.652 |
| (T1+T2+G23) / (T1+T3) | 2.499 | 2.500 | 1.743 | 1.532 | 1.852 | 2.408 | 1.454 | 1.335 |
| (G12+G23) / (T2+T3) | 1.225 | 0.986 | 1.600 | 0.418 | 0.687 | 1.599 | 0.531 | 1.125 |
| (T1+T3) / (G12+G23) | 0.733 | 0.858 | 0.776 | 2.199 | 1.421 | 0.576 | 2.200 | 2.179 |
| ALT / (T2+G12) | 2.962 | 3.173 | 2.602 | 3.478 | 3.267 | 2.481 | 4.300 | 4.255 |
| AAG / T2 | 2.026 | 1.559 | 4.500 | 1.491 | 1.693 | 3.572 | 1.824 | 3.264 |
| (T1+T2+T3) / AAG | 1.168 | 1.435 | 0.907 | 1.796 | 1.519 | 0.832 | 1.800 | 1.775 |
| (T1+T2) / BFL | 0.451 | 0.553 | 1.362 | 5.900 | 0.666 | 2.695 | 5.890 | 5.900 |
| EFL / T1 | 6.799 | 6.798 | 7.590 | 6.705 | 7.041 | 6.795 | 5.103 | 3.062 |
| TTL / (T2+T3+G23) | 3.217 | 2.999 | 2.308 | 2.143 | 3.300 | 1.576 | 2.283 | 3.145 |
| EFL / (G12+G23) | 3.077 | 3.658 | 3.053 | 7.500 | 6.129 | 1.643 | 6.532 | 5.343 |
| TL / (T1+G12) | 5.147 | 5.699 | 3.654 | 5.700 | 4.885 | 5.476 | 4.602 | 2.287 |

FIG. 64

OPTICAL LENS ASSEMBLY GENERATING LIGHT BEAMS WITH DIFFERENT ANGLES, EACH BEAM HAVING PARALLEL CHIEF RAY AND MARGINAL RAY

CROSS-REFERENCE TO RELATED APPLICATION

This application claims the priority benefit of Chinese application serial no. 201711071175.1, filed on Nov. 3, 2017. The entirety of the above-mentioned patent application is hereby incorporated by reference herein and made a part of this specification.

BACKGROUND OF THE INVENTION

Field of the Invention

The invention is related to an optical lens assembly.

Description of Related Art

The specification of portable electronic products is ever-changing. The key component, i.e. optical lens assembly, is also developed diversely, which is not only applied to image-taking and recording, but is also applied to three-dimensional (3D) sensing technique with advancement of technology.

Current 3D sensing technology uses a plurality of near infrared light emitting units which generates a plurality of light beams via a plurality sets of collimating lens to be projected to the environment in the front, and a camera is used to capture the image projected by the near infrared light and presented at the environment in the front and to establish a 3D space of surroundings. More specifically, a near infrared light emitted by a set of near infrared light emitting unit generates a light beam via a set of corresponding collimating lens. Current 3D sensing technology uses a plurality sets of one-to-one design to detect a large-ranged environment. However, such plurality sets of collimating lens in cooperation with a plurality of sets of near infrared light emitting units is expensive in terms of manufacturing cost and has low yield rate. For example, since each near infrared light emitting unit is small, the corresponding collimating lens is fabricated via a wafer level optical lens manufacturing process, which has low yield rate and high manufacturing cost.

Accordingly, it requires persons skilled in the art to work on how to design a lens system which can work with a plurality sets of near infrared light emitting unit to generate a plurality of light beams with different angles while satisfying the specification of small size, high yield rate and thermal stability.

SUMMARY OF THE INVENTION

The invention provides an optical lens assembly, which allows a plurality of near infrared light emitted by a structured light generating unit having a plurality of light sources to pass through to generate a plurality of light beams with different angles, which makes it possible to significantly reduce the cost for the lens system of a transmitter using 3D sensing technology as well as reduce manufacturing difficulties.

An embodiment of the invention provides an optical lens assembly. A plurality of near infrared light emitted by a structured light generating unit having a plurality of light sources pass through the optical lens assembly to generate a plurality of light beams. A direction that faces the structured light generating unit having the plurality of light sources is a light input side, and an opposite side thereof is a light output side. The optical lens assembly includes a first lens element, a second lens element and a third lens element arranged along an optical axis in a sequence from the light output side to the light input side. Each of the first lens element, the second lens element and the third lens element includes a light output surface facing the light output side and a light input surface facing the light input side. The first lens element is arranged to be a lens element having refracting power in a first order from the light output side to the light input side. The second lens element is arranged to be a lens element having refracting power in a second order from the light output side to the light input side. The third lens element is arranged to be a lens element having refracting power in a third order from the light output side to the light input side.

Based on the above, in the embodiments of the invention, the optical lens assembly can bring the following advantageous effect. With the arrangement of at least three lens elements having refracting power between the light input side and the light output side to correspond to the structured light generating unit having a plurality of light sources, the cost for the lens system of transmitter using 3D sensing technology can be significantly reduced, and manufacturing difficulties can be decreased as well.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic view illustrating a surface structure of a lens element.

FIG. 3 is a schematic view illustrating a concave and convex surface structure of a lens element and a ray focal point.

FIG. 4 is a schematic view illustrating a surface structure of a lens element according to an Example 1.

FIG. 5 is a schematic view illustrating a surface structure of a lens element according to an Example 2.

FIG. 6 is a schematic view illustrating a surface structure of a lens element according to an Example 3.

FIG. 7 is a schematic view illustrating an optical lens assembly according to a first embodiment of the invention.

FIG. 8A to FIG. 8D are diagrams illustrating longitudinal spherical aberration and other aberrations of the optical lens assembly according to the first embodiment of the invention.

FIG. 9 shows detailed optical data pertaining to the optical lens assembly according to the first embodiment of the invention.

FIG. 10 shows aspheric parameters pertaining to the optical lens assembly according to the first embodiment of the invention.

FIG. 11 is a schematic view illustrating an optical lens assembly according to a second embodiment of the invention.

FIG. 12A to FIG. 12D are diagrams illustrating longitudinal spherical aberration and other aberrations of the optical lens assembly according to the second embodiment of the invention.

FIG. 13 shows detailed optical data pertaining to the optical lens assembly according to the second embodiment of the invention.

FIG. 14 shows aspheric parameters pertaining to the optical lens assembly according to the second embodiment of the invention.

FIG. 17 shows detailed optical data pertaining to the optical lens assembly according to the third embodiment of the invention.

FIG. 18 shows aspheric parameters pertaining to the optical lens assembly according to the third embodiment of the invention.

FIG. 21 shows detailed optical data pertaining to the optical lens assembly according to the fourth embodiment of the invention.

FIG. 22 shows aspheric parameters pertaining to the optical lens assembly according to the fourth embodiment of the invention.

FIG. 25 shows detailed optical data pertaining to the optical lens assembly according to the fifth embodiment of the invention.

FIG. 26 shows aspheric parameters pertaining to the optical lens assembly according to the fifth embodiment of the invention.

FIG. 29 shows detailed optical data pertaining to the optical lens assembly according to the sixth embodiment of the invention.

FIG. 30 shows aspheric parameters pertaining to the optical lens assembly according to the sixth embodiment of the invention.

FIG. 33 shows detailed optical data pertaining to the optical lens assembly according to the seventh embodiment of the invention.

FIG. 34 shows aspheric parameters pertaining to the optical lens assembly according to the seventh embodiment of the invention.

FIG. 37 shows detailed optical data pertaining to the optical lens assembly according to the eighth embodiment of the invention.

FIG. 38 shows aspheric parameters pertaining to the optical lens assembly according to the eighth embodiment of the invention.

FIG. 41 shows detailed optical data pertaining to the optical lens assembly according to the ninth embodiment of the invention.

FIG. 42 shows aspheric parameters pertaining to the optical lens assembly according to the ninth embodiment of the invention.

FIG. 45 shows detailed optical data pertaining to the optical lens assembly according to the tenth embodiment of the invention.

FIG. 46 shows aspheric parameters pertaining to the optical lens assembly according to the tenth embodiment of the invention.

FIG. 49 shows detailed optical data pertaining to the optical lens assembly according to the eleventh embodiment of the invention.

FIG. 50 shows aspheric parameters pertaining to the optical lens assembly according to the eleventh embodiment of the invention.

FIG. 53 shows detailed optical data pertaining to the optical lens assembly according to the twelfth embodiment of the invention.

FIG. 54 shows aspheric parameters pertaining to the optical lens assembly according to the twelfth embodiment of the invention.

FIG. 57 shows detailed optical data pertaining to the optical lens assembly according to the thirteenth embodiment of the invention.

FIG. 58 shows aspheric parameters pertaining to the optical lens assembly according to the thirteenth embodiment of the invention.

FIG. 61 shows detailed optical data pertaining to the optical lens assembly according to the fourteenth embodiment of the invention.

FIG. 62 shows aspheric parameters pertaining to the optical lens assembly according to the fourteenth embodiment of the invention.

FIG. 63 shows important parameters and relation values thereof pertaining to the optical lens assemblies according to the first through the sixth embodiments of the invention.

FIG. 64 shows important parameters and relation values thereof pertaining to the optical lens assemblies according to the seventh through the fourteenth embodiments of the invention.

DESCRIPTION OF THE EMBODIMENTS

Figure 1A:
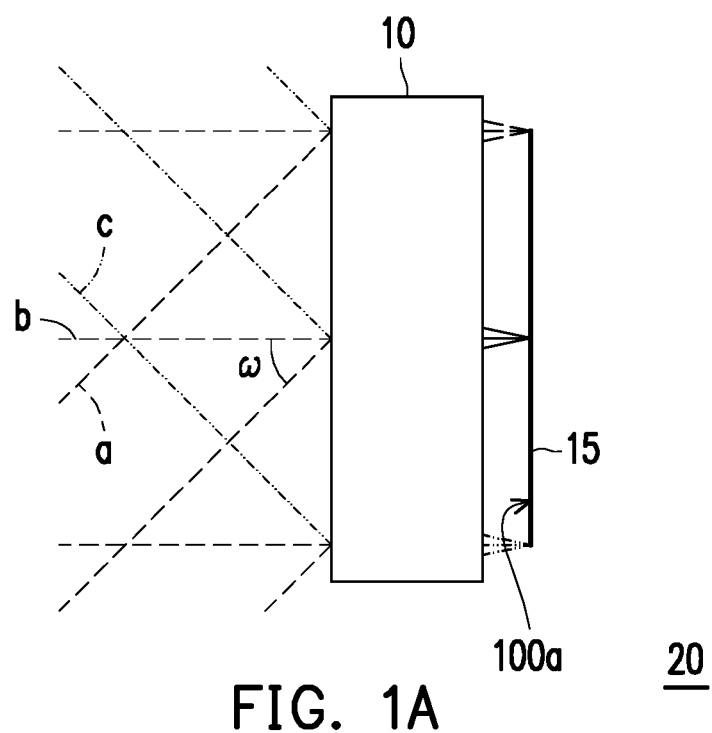
FIG. 1A is a schematic view illustrating an optical lens assembly of the invention applied in a lens system of a 3D sensing transmitter.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
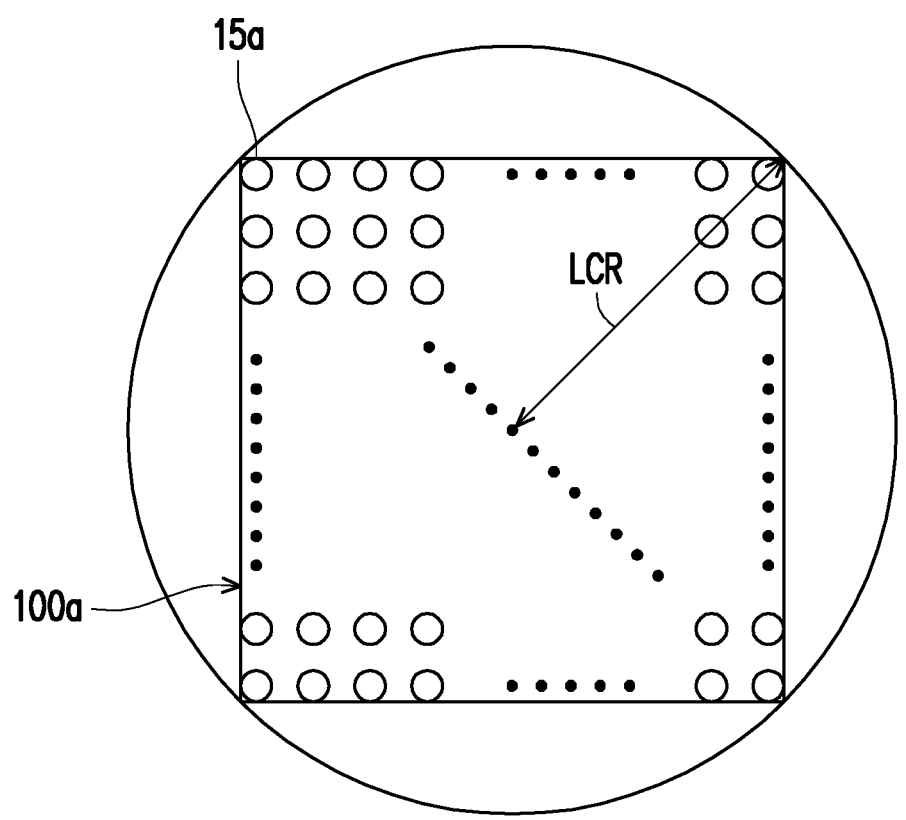
FIG. 1B is a front view of an embodiment of a structured light generating unit having a plurality of light sources in FIG. 1A.

Referring to FIG. 1A in which ray directions of a three-dimensional (3D) sensing transmitter lens 20 are illustrated, a plurality of near infrared light beams are emitted by a structured light generating unit 15 having a plurality of light sources, and then pass through an optical lens assembly 10 according to embodiments of the invention to generate a plurality of light beams a, b and c, which are used to detect an environment in front of the lens. Here, types of the light beam a, b and c are not particularly limited. Travelling directions of the light beams are illustrated by dotted lines. Also, the number of the light beams a, b and c are not limited to be exactly three but may be other numbers not equal to three and one. In FIG. 1A, the light beams a, b and c are illustrated as an example. Referring to FIG. 1B, in an embodiment, the structured light generating unit 15 having the light sources includes a plurality of near infrared light beam light sources 15a arranged in an array. In other embodiments, the near infrared light beam light sources 15a may also be arranged in a ring arrangement or other arrangements, which are not particularly limited in the invention. The near infrared light beam light sources 15a may be infrared laser light sources. Light emitting surfaces of the near infrared light beam light sources 15a form a light emitting surface 100a of the structured light generating unit 15 having the light sources.

The following criteria for determining optical specifications in the embodiments of the invention is based on an assumption that a reverse tracking of the ray direction is a parallel imaging ray passing through the optical lens assembly 10 from a light output side and focus on the light emitting surface 100a of the structured light generating unit 15 having the light sources for imaging.

In the present specification, the description "a lens element having positive refracting power (or negative refracting power)" means that the paraxial refracting power of the lens element in Gaussian optics is positive (or negative). The description "A light output side (or light input side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 2 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted. The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions:

1. FIG. 2 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 3, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the light input side or light output side. For instance, if the ray itself intersects the optical axis at the image side of the lens element after passing through a portion, i.e. the focal point of this ray is at the image side (see point R in FIG. 3), the portion will be determined as having a convex shape. On the contrary, if the ray diverges after passing through a portion, the extension line of the ray intersects the optical axis at the object side of the lens element, i.e. the focal point of the ray is at the light output side (see point M in FIG. 3), that portion will be determined as having a concave shape. Therefore, referring to FIG. 3, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For a light output surface, positive R means that the light output surface is convex, and negative R means that the light output surface is concave. Conversely, for a light input surface, positive R means that the light input surface is concave, and negative R means that the light input surface is convex. The result found by using this method should be consistent as by using the other way mentioned above, which determines surface shapes by referring to whether the focal point of a collimated ray is at the light output side or the light input side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 4, only one transition point, namely a first transition point, appears within the clear aperture of the light input surface of the lens element. Portion I is a portion in a vicinity of the optical axis, and portion II is a portion in a vicinity of a periphery of the lens element. The portion in a vicinity of the optical axis is determined as having a concave surface due to the R value at the light input surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 5, a first transition point and a second transition point exist on the light output surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the light output surface of the lens element is positive. The portion in a vicinity of a periphery of the lens element (portion III) has a convex shape. What is more, there is another portion having a concave shape existing between the first and second transition point (portion II), and there is another portion having a convex shape existing in the portion in a vicinity of a periphery of the lens element (portion III).

Referring to a third example depicted in FIG. 6, no transition point exists on the light output surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well because there is no transition point between the portion in a vicinity of a periphery and the portion in a vicinity of the optical axis.

FIG. 7 is a schematic view illustrating an optical lens assembly according to a first embodiment of the invention. FIG. 8A to FIG. 8D are diagrams illustrating longitudinal spherical aberration and other aberrations of the optical lens assembly according to the first embodiment of the invention. Referring to FIG. 7, the optical lens assembly 10 according to the first embodiment of the invention includes an aperture stop 0, a first lens element 1, a second lens element 2 and a third lens element 3 arranged along an optical axis I of the optical lens assembly 10 in the order from the light output side to the light input side. When the plurality of near infrared light is emitted by the light emitting surface 100a of the structured light generating unit 15 having a plurality of light sources and enters the optical lens assembly 10, after the plurality of near infrared light passes through the third lens element 3, the second lens element 2, the first lens element 1 and the aperture stop 0, a plurality of light beams are generated from the light output side and emitted out of the optical lens assembly 10. It should be pointed out that the light input side is a side facing the structured light generating unit 15 having a plurality of light sources, and the light output side is an opposite side thereof.

Each of the first lens element 1, the second lens element 2 and the third lens element 3 has a light output surface 11, 21 or 31 which faces the light output side and allows the near infrared light to pass through and a light input surface 12, 22 od 32 which faces the light input side and allows the near infrared light to pass through.

In the embodiment, the material of the first lens element 1, the second lens element 2 and the third lens element 3 are respectively glass, plastic and plastic, which should not be construed as a limitation to the invention.

The first lens element 1 is arranged to a lens element having refracting power in a first order from the light output side to the light input side. The first lens element 1 has positive refracting power. The light output surface 11 of the first lens element 1 has a convex portion 111 in a vicinity of the optical axis I and a convex portion 112 in a vicinity of a periphery of the lens element. The light input surface 12 of the first lens element 1 has a concave portion 121 in a vicinity of the optical axis I and a concave portion 122 in a vicinity of a periphery of the lens element. In the embodiment, the light output surface 11 and the light input surface 12 of the first lens 1 are aspheric surfaces.

The second lens element 2 is arranged to be a lens element having refracting power in a second order from the light output side to the light input side. The second lens element 2 has negative refracting power. The light output surface 21 of the second lens element 2 has a convex portion 211 in a vicinity of the optical axis I and a convex portion 212 in a vicinity of a periphery of the lens element. The light input surface 22 of the second lens element 2 has a concave portion 221 in a vicinity of the optical axis I and a concave portion 222 in a vicinity of a periphery of the lens element. In the embodiment, the light output surface 21 and the light input surface 22 of the second lens element 2 are aspheric surfaces.

The third lens element 3 is arranged to be a lens element having refracting power in a third order from the light output side to the light input side. The third lens element 3 has positive refracting power. The light output surface 31 of the third lens element 3 has a concave portion 311 in a vicinity of the optical axis I and a concave portion 312 in a vicinity of a periphery of the lens element. The light input surface 32 of the third lens element 3 has a convex portion 321 in a vicinity of the optical axis I and a convex portion 322 in a vicinity of a periphery of the lens element. In the embodiment, the light output surface 31 and the light input surface 32 of the third lens element 3 are aspheric surfaces.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the first embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.007 mm; in the environment of 70° C., the focal shift of the optical lens assembly 10 is −0.0175 mm.

The first lens element 1 in the first embodiment is a glass lens. The temperature coefficient of refractive index of the first lens element 1 is $$\frac{dn}{dt}, \frac{dn}{dt} = 3.36 \times 10^{-6} /° C., \left|\frac{dn}{dt}\right| = 3.36 \times 10^{-6} /° C..$$

In the specification, the "temperature coefficient of refractive index" is measured under the condition where light wavelength is 940 nm (or referred to as d-line) under a temperature ranging from 20° C. to 40° C., and the temperature coefficient of refractive index refers to change of refractive index caused by a unit of temperature, that is, the value change of refractive index when temperature is increased by 1° C.

Other detailed optical data in the first embodiment is as shown in FIG. 9, and a system length (i.e., TTL) in the first embodiment is 2.700 mm, effective focal length (EFL) is 2.700 mm, half field of view (HFOV) is 10.497°, f-number (Fno) is 2.273, LCR is 0.5 mm. Specifically, the system length (i.e., TTL) refers to a distance from the light output surface 11 of the first lens element 1 to the structured light generating unit 15 having a plurality of light sources on the optical axis I. Meanwhile, the "Fno" referred to in the present specification is calculated based on the principle of light reversibility, and the aperture stop 0 is considered as a pupil of incident light.

Moreover, in the embodiment, a total of six surfaces including the light output surfaces 11, 21 and 31 as well as the light input surfaces 12, 22 and 32 of the first lens element 1, the second lens element 2 and the third lens element 3 are aspheric surfaces, and the aspheric surfaces are defined by on the following equation (2):

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \quad (1)$$

wherein,

Y: a distance from a point on an aspheric curve to the optical axis I;

Z: a depth of the aspheric surface (i.e. a perpendicular distance between the point on the aspheric surface that is spaced by the distance Y from the optical axis I and a tangent plane tangent to a vertex of the aspheric surface on the optical axis I);

R: radius of curvature of the surface of the lens element near the optical axis I;

K: conic constant $a_i$: $i^{th}$ aspheric coefficient

Each aspheric coefficient from the light output surface 11 of the first lens element 1 to the light input surface 32 of the third lens element 3 in the equation (2) is indicated in FIG. 10. In FIG. 10, the referential number 11 is one column that represents the aspheric coefficient of the light output surface 11 of the first lens element 1, and the reference numbers in other columns can be deduced from the above.

Additionally, the relationship among the important parameters pertaining to the optical lens assembly 10 of the first embodiment is indicated in FIG. 63.

wherein, $\upsilon 1$ is an Abbe number of the first lens element 1, the Abbe number may also be referred as dispersion coefficient;

$\upsilon 2$ is an Abbe number of the second lens element 2;

$\upsilon 3$ is an Abbe number of the third lens element 3;

T1 represents the thickness of the first lens element 1 along the optical axis I;

T2 represents the thickness of the second lens element 2 along the optical axis I;

T3 represents the thickness of the third lens element 3 along the optical axis I;

G12 represents an air gap between the light input surface 12 of the first lens element 1 and the light output surface 21 of the second lens element 2 along the optical axis I;

G23 represents an air gap between the light input surface 22 of the second lens element 2 and the light output surface 31 of the third lens element 3 along the optical axis I;

G3F represents an air gap between the third lens element 3 and the structured light generating unit 15 having a plurality of light sources along the optical axis I;

AAG represents a sum of air gaps between a first lens element having refracting power counted from the light output side and a first lens element having refracting power counted from the light input side along the optical axis I;

ALT represents a sum of thickness of all lenses among a first lens element having refracting power counted from the light output side through a first lens element having refracting power counted from the light input side along the optical axis I;

TL represents a distance between a light output surface of a first lens element having refracting power counted from the light output side and a light input surface of a first lens element having refracting power counted from the light input side along the optical axis I;

TTL represents a distance between a light output surface of a first lens element having refracting power counted from the light output side and the structured light generating unit 15 having a plurality of light sources along the optical axis I;

BFL represents a distance between a light input surface of a first lens element having refracting power counted from the light input side and the structured light generating unit 15 having a plurality of light sources along the optical axis I; and EFL represents an effective focal length of the optical lens assembly 10;

HFOV represents half field of view (marked as co as shown in FIG. 1A), which is the maximum half light emitting angle of the optical lens assembly 10;

Fno represents a F-number, which is calculated based on the principle of light reversibility and clear aperture of the light beam emitted by the optical lens assembly 10, and in the embodiment of the invention the aperture stop 0 is considered as a pupil of incident light;

LCR represents a light circle radius (marked as LCR as shown in FIG. 1B), which is the radius of the minimum circumscribed circle of the light emitting surface 100a of the structured light generating unit 15 having a plurality of light sources;

in addition, it is further defined that:

f1 is a focal length of the first lens element 1;
f2 is a focal length of the second lens element 2;
f3 is a focal length of the third lens element 3;
n1 is a refractive index of the first lens element 1;
n2 is a refractive index of the second lens element 2; and
n3 is a refractive index of the third lens element 3.

In FIG. 63 and FIG. 64, the unit of value from row T1 to row TTL is millimeter (mm).

With reference to FIG. 8A to FIG. 8D, FIG. 8A is a diagram describing the longitudinal spherical aberration on the light emitting surface 100a of the first embodiment in the condition that the wavelength is 935 nm, 940 nm and 946 nm, FIG. 8B and FIG. 8C are diagrams respectively describing the astigmatism aberration regarding sagittal direction and astigmatism aberration regarding tangential direction of the structured light generating unit 15 having a plurality of light sources on the light emitting surface 100a of the first embodiment in the condition that the wavelength is 935 nm, 940 nm and 946 nm. FIG. 8D is a diagram describing distortion aberration of the structured light generating unit 15 having a plurality of light sources on the light emitting surface 100a of the first embodiment in the condition that the wavelength is 935 nm, 940 nm and 946 nm. In FIG. 8A, the longitudinal spherical aberration of the first embodiment is measured in the condition that the pupil radius is 0.5940 mm. The curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within a range of −0.001 mm to 0.005 mm. Accordingly, it is evident that the embodiment can significantly improve the spherical aberration of the same wavelength. In addition, the distances between the three representative wavelengths are close to one another, which represents that the imaging positions of the rays with different wavelengths are concentrated, therefore, the chromatic aberration can be significantly improved.

In FIGS. 8B and 8C which illustrate two diagrams of astigmatism aberration, the focal length variation of the three representative wavelengths in the entire field of view falls within a range of −20 μm to 30 μm, which represents that the optical system in the first embodiment can effectively eliminate aberration. In FIG. 8D, the diagram of distortion aberration shows that the distortion aberration in the first embodiment can be maintained within a range of −2.0% to 0%, which shows that the distortion aberration in the first embodiment can meet the image quality requirement of the optical system. Based on the above, it is shown that the first embodiment can provide better image quality compared with existing optical lens assembly under the condition where the system length of the optical lens is shortened to about 2.7000 mm.

FIG. 11 is a schematic view illustrating an optical lens assembly according to a second embodiment of the invention, FIGS. 12A to 12D are diagrams illustrating longitudinal spherical aberration and other aberrations of the optical lens assembly according to the second embodiment of the invention. Referring to FIG. 11, the second embodiment of the optical lens assembly 10 of the invention is similar to the first embodiment, and the difference lies in optical data, aspheric coefficients and the parameters of the lens elements 1, 2 and 3, and the light output surface 21 of the second lens element 2 has a concave portion 213 in a vicinity of a periphery of the lens element. It should be noted that, in order to show the view clearly, some numerals which are the same as those used for the concave portion and convex portion in the first embodiment are omitted in FIG. 11.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the second embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.0045 mm; in the environment of 70° C., the focal shift of the optical lens assembly 10 is −0.013 mm. The thermal stability effect in the second embodiment is better than the first embodiment.

In the second embodiment, the first lens element 1 is a glass lens. The temperature coefficient of refractive index of the first lens element 1 is $$\frac{dn}{dt}, \frac{dn}{dt} = 3.36 \times 10^{-6}/^\circ C., \left|\frac{dn}{dt}\right| = 3.36 \times 10^{-6}/^\circ C..$$

The detailed optical data of the optical lens assembly 10 is as shown in FIG. 13, the system length (i.e., TTL) in the second embodiment is 2.700 mm, the effective focal length (EFL) is 2.700 mm, the half field of view (HFOV) is 10.483°, the f-number (Fno) is 2.274, and LCR is 0.5 mm.

FIG. 14 shows each aspheric coefficient pertaining to the light output surface 11 of the first lens element 1 through the light input surface 32 of the third lens element 3 in the equation (2) in the second embodiment.

Additionally, the relationship among the important parameters pertaining to the optical lens assembly 10 of the second embodiment is indicated in FIG. 63.

With reference to FIG. 12A to FIG. 12D, FIG. 12A is a diagram describing the longitudinal spherical aberration on the light emitting surface 100a of the second embodiment in the condition that the wavelength is 935 nm, 940 nm and 946 nm, FIG. 12B and FIG. 12C are diagrams respectively describing the astigmatism aberration regarding sagittal direction and astigmatism aberration regarding tangential direction of the structured light generating unit 15 having a plurality of light sources on the light emitting surface 100a of the second embodiment in the condition that the wavelength is 935 nm, 940 nm and 946 nm. FIG. 12D is a diagram describing distortion aberration of the structured light generating unit 15 having a plurality of light sources on the light emitting surface 100a of the second embodiment in the condition that the wavelength is 935 nm, 940 rim and 946 nm. In FIG. 12A, the longitudinal spherical aberration of the second embodiment is measured in the condition that the pupil radius is 0.5940 mm. The imaging point deviation of the off-axis ray at different heights is controlled within a range of −0.0001 mm to 0.004 mm. In FIGS. 12B and 12C which illustrate two diagrams of astigmatism aberration, the focal length variation of the three representative wavelengths in the entire field of view falls within a range of −20.00 µm to 4.00 µm. In FIG. 12D, the diagram of distortion aberration shows that the distortion aberration in the second embodiment can be maintained within a range of −0.02% to 0%. Based on the above, it is shown that the second embodiment can provide better image quality compared with existing optical lens assembly under the condition where the system length of the optical lens is shortened to about 2.700 mm.

The above descriptions show that the advantage of the second embodiment relative to the first embodiment is that the longitudinal spherical aberration in the second embodiment is smaller than the longitudinal spherical aberration in the first embodiment, the astigmatism aberration regarding the sagittal and the tangential directions in the second embodiment is smaller than the astigmatism aberration regarding the sagittal and the tangential directions in the first embodiment. The HFOV in the second embodiment is larger than the HFOV in the first embodiment. The lens optical axis and the thickness difference of the periphery portion in the second embodiment is smaller than the first embodiment. In view of the above, the second embodiment is easier to be manufactured and has higher yield rate.

Figure 15:
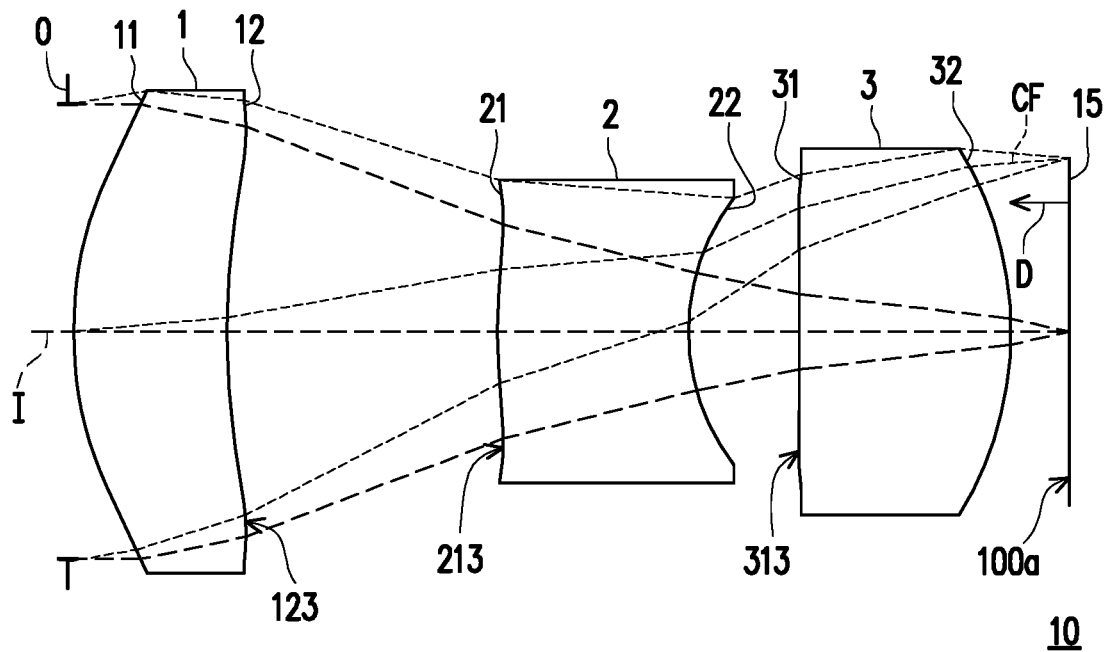
FIG. 15 is a schematic view illustrating an optical lens assembly according to a third embodiment of the invention.

FIG. 15 is a schematic view illustrating an optical lens assembly according to a third embodiment of the invention, FIGS. 14A to 14D are diagrams illustrating longitudinal spherical aberration and other aberrations of the optical lens assembly according to the third embodiment of the invention. Referring to FIG. 13, the third embodiment of the optical lens assembly 10 of the invention is similar to the first embodiment, and the difference lies in optical data, aspheric coefficients and the parameters of the lens elements 1, 2 and 3, and the light input surface 12 of the first lens element 1 has a convex portion 123 in a vicinity of a periphery of the lens element; the light output surface 21 of the second lens element 2 has a concave portion 213 in a vicinity of a periphery of the lens element; and the light output surface 31 of the third lens element 3 has a convex portion 313 in a vicinity of a periphery of the lens element. It should be noted that, in order to show the view clearly, some numerals which are the same as those used for the concave portion and convex portion in the first embodiment are omitted in FIG. 15.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the third embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.009 mm; in the environment of 70° C., the focal shift of the optical lens assembly 10 is −0.0237 mm.

In the third embodiment, the first lens element 1 is a glass lens. The temperature coefficient of refractive index of the first lens element 1 is $$\frac{dn}{dt}, \frac{dn}{dt} = 3.36 \times 10^{-6}/^\circ C., \left|\frac{dn}{dt}\right| = 3.36 \times 10^{-6}/^\circ C..$$

The detailed optical data of the optical lens assembly 10 is as shown in FIG. 17, the system length (i.e., TTL) in the third embodiment is 2.841 mm, the effective focal length (EFL) is 2.975 mm, the half field of view (HFOV) is 9.342°, the f-number (Fno) is 2.284, and LCR is 0.5 mm.

FIG. 18 shows each aspheric coefficient pertaining to the light output surface 11 of the first lens element 1 through the light input surface 32 of the third lens element 3 in the equation (2) in the third embodiment.

Additionally, the relationship among the important parameters pertaining to the optical lens assembly 10 of the third embodiment is indicated in FIG. 63.

Figures 16A, 16B, 16C, 16D:
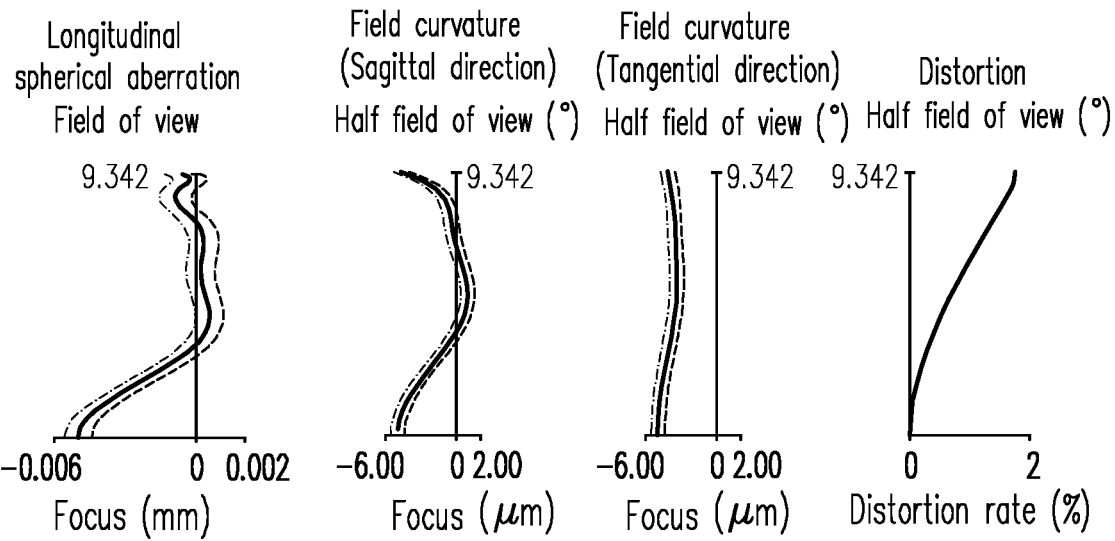
FIG. 16A to FIG. 16D are diagrams illustrating longitudinal spherical aberration and other aberrations of the optical lens assembly according to the third embodiment of the invention.

With reference to FIG. 16A to FIG. 16D, FIG. 16A is a diagram describing the longitudinal spherical aberration on the light emitting surface 100a of the third embodiment in the condition that the wavelength is 935 nm, 940 nm and 946 nm, FIG. 16B and FIG. 16C are diagrams respectively describing the astigmatism aberration regarding sagittal direction and astigmatism aberration regarding tangential direction of the structured light generating unit 15 having a plurality of light sources on the light emitting surface 100a of the third embodiment in the condition that the wavelength is 935 nm, 940 nm and 946 nm. FIG. 16D is a diagram describing distortion aberration of the structured light generating unit 15 having a plurality of light sources on the light emitting surface 100a of the third embodiment in the condition that the wavelength is 935 nm, 940 nm and 946 nm. In FIG. 16A, the longitudinal spherical aberration of the third embodiment is measured in the condition that the pupil radius is 0.6545 mm. The imaging point deviation of the off-axis ray at different heights is controlled within a range of −0.006 mm to 0.002 mm. In FIGS. 16B and 16C which illustrate two diagrams of astigmatism aberration, the focal length variation of the three representative wavelengths in the entire field of view falls within a range of −6.00 μm to 2.00 μm. In FIG. 16D, the diagram of distortion aberration shows that the distortion aberration in the third embodiment can be maintained within a range of 0% to 2%. Based on the above, it is shown that the third embodiment can provide better image quality compared with existing optical lens assembly under the condition where the system length of the optical lens is shortened to about 2.841 mm.

The above descriptions show that the advantage of the third embodiment relative to the first embodiment is that the astigmatism aberration regarding the sagittal and the tangential directions in the third embodiment is smaller than the astigmatism aberration regarding the sagittal and the tangential directions in the first embodiment. The f-number in the third embodiment is smaller than the f-number in the first embodiment. The lens optical axis and the thickness difference of the periphery portion in the third embodiment is smaller than the first embodiment. In view of the above, the third embodiment is easier to be manufactured and has higher yield rate.

Figure 19:
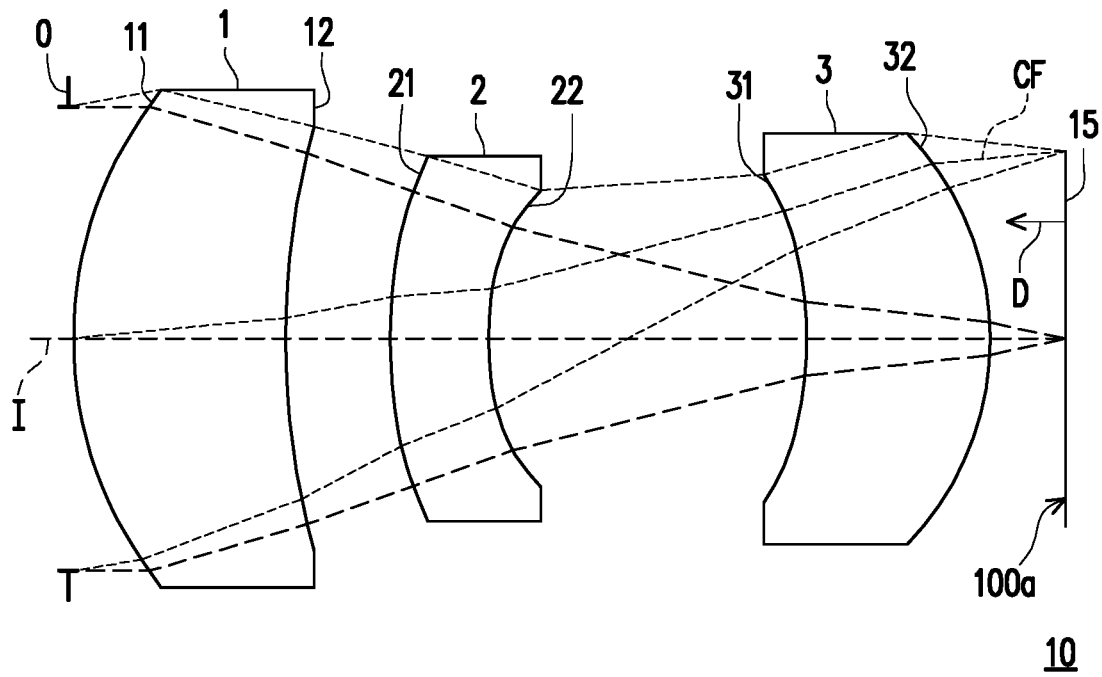
FIG. 19 is a schematic view illustrating an optical lens assembly according to a fourth embodiment of the invention.

FIG. 19 is a schematic view illustrating an optical lens assembly according to a fourth embodiment of the invention, FIGS. 20A to 20D are diagrams illustrating longitudinal spherical aberration and other aberrations of the optical lens assembly according to the fourth embodiment of the invention. Referring to FIG. 19, the fourth embodiment of the optical lens assembly 10 of the invention is similar to the first embodiment, and the difference lies in optical data, aspheric coefficients and the parameters of the lens elements 1, 2 and 3. It should be noted that, in order to show the view clearly, some numerals which are the same as those used for the concave portion and convex portion in the first embodiment are omitted in FIG. 19.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the fourth embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.0075 mm; in the environment of 70° C., the focal shift of the optical lens assembly 10 is −0.0198 mm.

In the fourth embodiment, the first lens element 1 is a glass lens. The temperature coefficient of refractive index of the first lens element 1 is $$\frac{dn}{dt}, \frac{dn}{dt} = 3.36 \times 10^{-6} / °\text{C}., \quad \left|\frac{dn}{dt}\right| = 3.36 \times 10^{-6} / °\text{C}..$$

The detailed optical data of the optical lens assembly 10 is as shown in FIG. 21, the system length (i.e., TTL) in the fourth embodiment is 2.642 mm, the effective focal length (EFL) is 2.828 mm, the half field of view (HFOV) is 9.938°, the f-number (Fno) is 2.279, and LCR is 0.5 mm.

FIG. 22 shows each aspheric coefficient pertaining to the light output surface 11 of the first lens element 1 through the light input surface 32 of the third lens element 3 in the equation (2) in the fourth embodiment.

Additionally, the relationship among the important parameters pertaining to the optical lens assembly 10 of the fourth embodiment is indicated in FIG. 63.

Figures 20A, 20B, 20C, 20D:
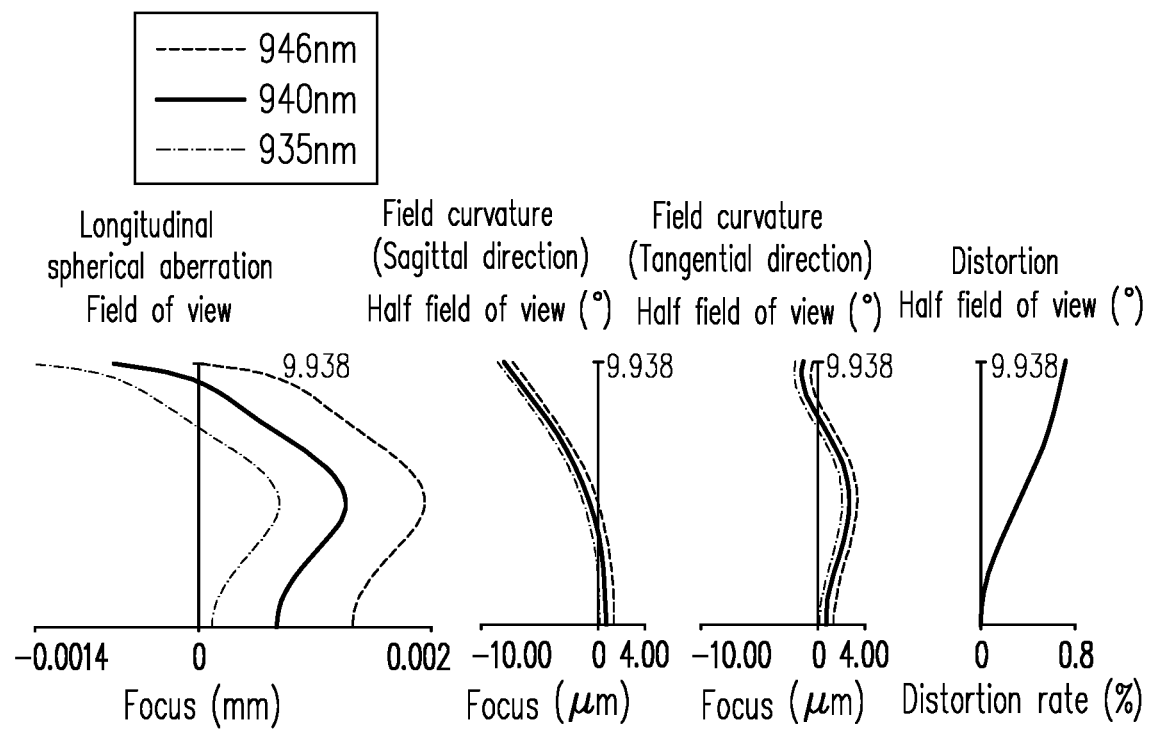
FIG. 20A to FIG. 20D are diagrams illustrating longitudinal spherical aberration and other aberrations of the optical lens assembly according to the fourth embodiment of the invention.

With reference to FIG. 20A to FIG. 20D, FIG. 20A is a diagram describing the longitudinal spherical aberration on the light emitting surface 100a of the fourth embodiment in the condition that the wavelength is 935 nm, 940 nm and 946 nm, FIG. 20B and FIG. 20C are diagrams respectively describing the astigmatism aberration regarding sagittal direction and astigmatism aberration regarding tangential direction of the structured light generating unit 15 having a plurality of light sources on the light emitting surface 100a of the fourth embodiment in the condition that the wavelength is 935 nm, 940 nm and 946 nm. FIG. 20D is a diagram describing distortion aberration of the structured light generating unit 15 having a plurality of light sources on the light emitting surface 100a of the fourth embodiment in the condition that the wavelength is 935 nm, 940 nm and 946 nm. In FIG. 20A, the longitudinal spherical aberration of the fourth embodiment is measured in the condition that the pupil radius is 0.6221 mm. The imaging point deviation of the off-axis ray at different heights is controlled within a range of −0.0014 mm to 0.002 mm. In FIGS. 20B and 20C which illustrate two diagrams of astigmatism aberration, the focal length variation of the three representative wavelengths in the entire field of view falls within a range of −10.00 μm to 4.00 μm. In FIG. 20D, the diagram of distortion aberration shows that the distortion aberration in the fourth embodiment can be maintained within a range of 0% to 0.8%. Based on the above, it is shown that the fourth embodiment can provide better image quality compared with existing optical lens assembly under the condition where the system length of the optical lens is shortened to about 2.642 mm.

The above descriptions show that the advantage of the fourth embodiment relative to the first embodiment is that the longitudinal spherical aberration of the fourth embodiment is smaller than the longitudinal spherical aberration of the first embodiment, the astigmatism aberration regarding the sagittal and the tangential directions in the fourth embodiment is smaller than the astigmatism aberration regarding the sagittal and the tangential directions in the first embodiment. The system length in the fourth embodiment is smaller than the system length in the first embodiment. The lens optical axis and the thickness difference of the periphery portion n the fourth embodiment is smaller than the first embodiment. In view of the above, the fourth embodiment is easier to be manufactured and has higher yield rate.

Figure 23:
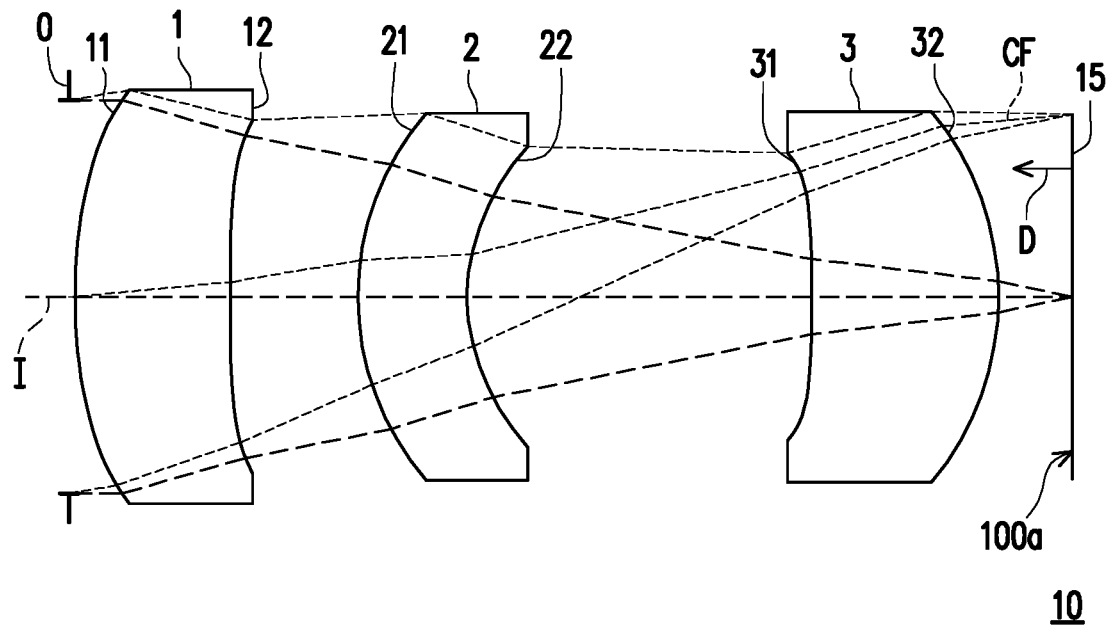
FIG. 23 is a schematic view illustrating an optical lens assembly according to a fifth embodiment of the invention.

FIG. 23 is a schematic view illustrating an optical lens assembly according to a fifth embodiment of the invention, FIGS. 24A to 24D are diagrams illustrating longitudinal spherical aberration and other aberrations of the optical lens assembly according to the fifth embodiment of the invention. Referring to FIG. 23, the fifth embodiment of the optical lens assembly 10 of the invention is similar to the first embodiment, and the difference lies in optical data, aspheric coefficients and the parameters of the lens elements 1, 2 and 3. It should be noted that, in order to show the view clearly, some numerals which are the same as those used for the concave portion and convex portion in the first embodiment are omitted in FIG. 23.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the fifth embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.003 mm; in the environment of 70° C., the focal shift of the optical lens assembly 10 is −0.0075 mm. The thermal stability effect of the fifth embodiment is better than the first embodiment.

In the fifth embodiment, the first lens element 1 is a glass lens. The temperature coefficient of refractive index of the first lens element 1 is $$\frac{dn}{dt}, \frac{dn}{dt} = 3.36 \times 10^{-6} /° \text{ C.}, \quad \left|\frac{dn}{dt}\right| = 3.36 \times 10^{-6} /° \text{ C.}.$$

The detailed optical data of the optical lens assembly 10 is as shown in FIG. 25, the system length (i.e., TTL) in the fifth embodiment is 2.730 mm, the effective focal length (EFL) is 2.451 mm, the half field of view (HFOV) is 9.554°, the f-number (Fno) is 2.274, and LCR is 0.5 mm.

FIG. 26 shows each aspheric coefficient pertaining to the light output surface 11 of the first lens element I through the light input surface 32 of the third lens element 3 in the equation (2) in the fifth embodiment.

Additionally, the relationship among the important parameters pertaining to the optical lens assembly 10 of the fifth embodiment is indicated in FIG. 63.

Figures 24A, 24B, 24C, 24D:
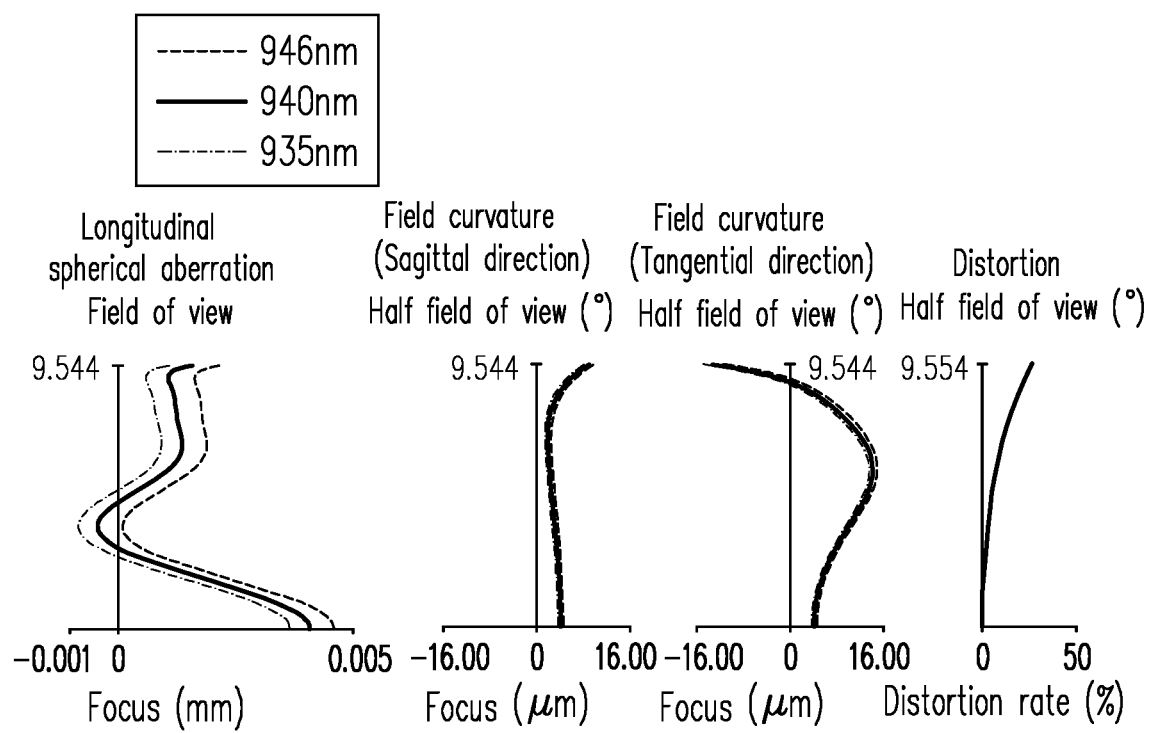
FIG. 24A to FIG. 24D are diagrams illustrating longitudinal spherical aberration and other aberrations of the optical lens assembly according to the fifth embodiment of the invention.

With reference to FIG. 24A to FIG. 24D, FIG. 24A is a diagram describing the longitudinal spherical aberration on the light emitting surface 100a of the fifth embodiment in the condition that the wavelength is 935 nm, 940 nm and 946 nm, FIG. 24B and FIG. 24C are diagrams respectively describing the astigmatism aberration regarding sagittal direction and astigmatism aberration regarding tangential direction of the structured light generating unit 15 having a plurality of light sources on the light emitting surface 100a of the fifth embodiment in the condition that the wavelength is 935 nm, 940 nm and 946 nm. FIG. 24D is a diagram describing distortion aberration of the structured light generating unit 15 having a plurality of light sources on the light emitting surface 100a of the fifth embodiment in the condition that the wavelength is 935 nm, 940 nm and 946 nm. In FIG. 24A, the longitudinal spherical aberration of the fifth embodiment is measured in the condition that the pupil radius is 0.5391 mm. The imaging point deviation of the off-axis ray at different heights is controlled within a range of −0.001 mm to 0.005 mm. In FIGS. 24B and 24C which illustrate two diagrams of astigmatism aberration, the focal length variation of the three representative wavelengths in the entire field of view falls within a range of −16.00 μm to 16.00 μm. In FIG. 24D, the diagram of distortion aberration shows that the distortion aberration in the fifth embodiment can be maintained within a range of 0% to 50%. Based on the above, it is shown that the fifth embodiment can provide better image quality compared with existing optical lens assembly under the condition where the system length of the optical lens is shortened to about 2.730 mm.

The above descriptions show that the advantage of the fifth embodiment relative to the first embodiment is the astigmatism aberration regarding the sagittal direction in the fifth embodiment is smaller than the astigmatism aberration regarding the sagittal direction in the first embodiment. The lens optical axis and the thickness difference of the periphery portion in the fifth embodiment is smaller than the first embodiment. In view of the above, the fifth embodiment is easier to be manufactured and has higher yield rate.

Figure 27:
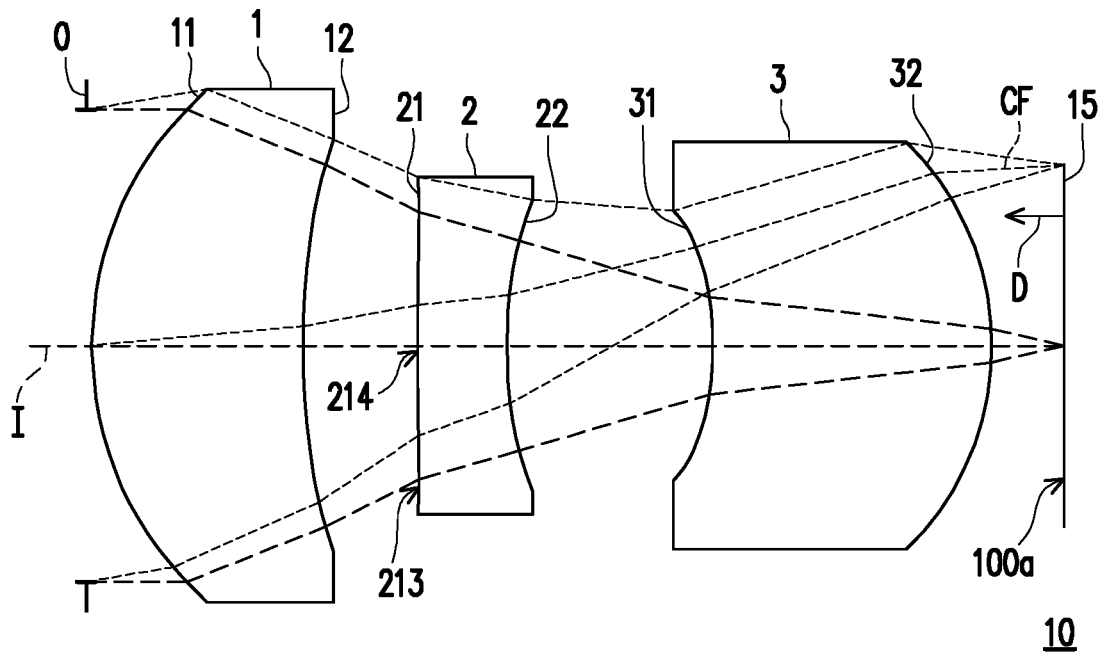
FIG. 27 is a schematic view illustrating an optical lens assembly according to a sixth embodiment of the invention.

FIG. 27 is a schematic view illustrating an optical lens assembly according to a sixth embodiment of the invention, FIGS. 28A to 28D are diagrams illustrating longitudinal spherical aberration and other aberrations of the optical lens assembly according to the sixth embodiment of the invention. Referring to FIG. 27, the sixth embodiment of the optical lens assembly 10 of the invention is similar to the first embodiment, and the difference lies in optical data, aspheric coefficients and the parameters of the lens elements 1, 2 and 3, and the light output surface 21 of the second lens element 2 has a concave portion 214 in a vicinity of the optical axis I and a concave portion 213 in a vicinity of a peripheral of the lens element. It should be noted that, in order to show the view clearly, some numerals which are the same as those used for the concave portion and convex portion in the first embodiment are omitted in FIG. 27.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the sixth embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.0117 mm; in the environment of 70° C., the focal shift of the optical lens assembly 10 is 0.0312 mm. The thermal stability effect of the sixth embodiment is better than the first embodiment.

In the sixth embodiment, the first lens element 1 is a glass lens. The temperature coefficient of refractive index of the first lens element 1 is $$\frac{dn}{dt}, \frac{dn}{dt} = 3.36 \times 10^{-6} /° \text{ C.}, \quad \left|\frac{dn}{dt}\right| = 3.36 \times 10^{-6} /° \text{ C.}.$$

The detailed optical data of the optical lens assembly 10 is as shown in FIG. 29, the system length (i.e., TTL) in the sixth embodiment is 2.730 mm, the effective focal length (EFL) is 2.451 mm, the half field of view (HFOV) is 9.554°, the f-number (Fno) is 2.274, and LCR is 0.5 mm.

FIG. 30 shows each aspheric coefficient pertaining to the light output surface 11 of the first lens element 1 through the light input surface 32 of the third lens element 3 in the equation (2) in the sixth embodiment.

Additionally, the relationship among the important parameters pertaining to the optical lens assembly 10 of the sixth embodiment is indicated in FIG. 63.

Figures 28A, 28B, 28C, 28D:
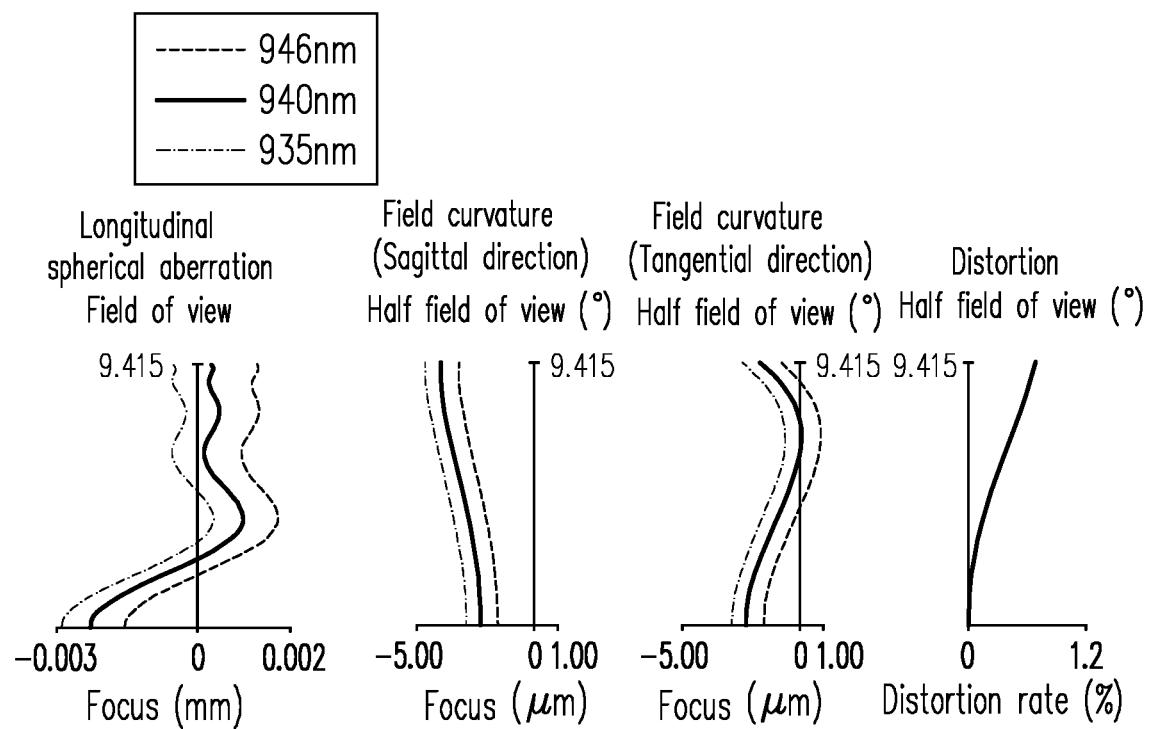
FIG. 28A to FIG. 28D are diagrams illustrating longitudinal spherical aberration and other aberrations of the optical lens assembly according to the sixth embodiment of the invention.

With reference to FIG. 28A to FIG. 28D, FIG. 28A is a diagram describing the longitudinal spherical aberration on the light emitting surface 100a of the sixth embodiment in the condition that the wavelength is 935 nm, 940 nm and 946 nm, FIG. 28B and FIG. 28C are diagrams respectively describing the astigmatism aberration regarding sagittal direction and astigmatism aberration regarding tangential direction of the structured light generating unit 15 having a plurality of light sources on the light emitting surface 100a of the sixth embodiment in the condition that the wavelength is 935 nm, 940 nm and 946 nm. FIG. 28D is a diagram describing distortion aberration of the structured light generating unit 15 having a plurality of light sources on the light emitting surface 100a of the sixth embodiment in the condition that the wavelength is 935 nm, 940 nm and 946 nm. In FIG. 28A, the longitudinal spherical aberration of the sixth embodiment is measured in the condition that the pupil radius is 0.6545 mm. The imaging point deviation of the off-axis ray at different heights is controlled within a range of −0.003 mm to 0.002 mm. In FIGS. 28B and 28C which illustrate two diagrams of astigmatism aberration, the focal length variation of the three representative wavelengths in the entire field of view falls within a range of −5.00 μm to 1.00 μm. In FIG. 28D, the diagram of distortion aberration shows that the distortion aberration in the sixth embodiment can be maintained within a range of 0% to 1.2%. Based on the above, it is shown that the sixth embodiment can provide better image quality compared with existing optical lens assembly under the condition where the system length of the optical lens is shortened to about 2.730 mm.

The above descriptions show that the advantage of the sixth embodiment relative to the first embodiment is that the longitudinal spherical aberration of the sixth embodiment is smaller than the longitudinal spherical aberration of the first embodiment, the astigmatism aberration regarding the sagittal and tangential directions of the sixth embodiment is smaller than the astigmatism aberration regarding the sagittal and tangential directions in the first embodiment. The lens optical axis and the thickness difference of the periphery portion in the sixth embodiment is smaller than the first embodiment. In view of the above, the sixth embodiment is easier to be manufactured and has higher yield rate.

Figure 31:
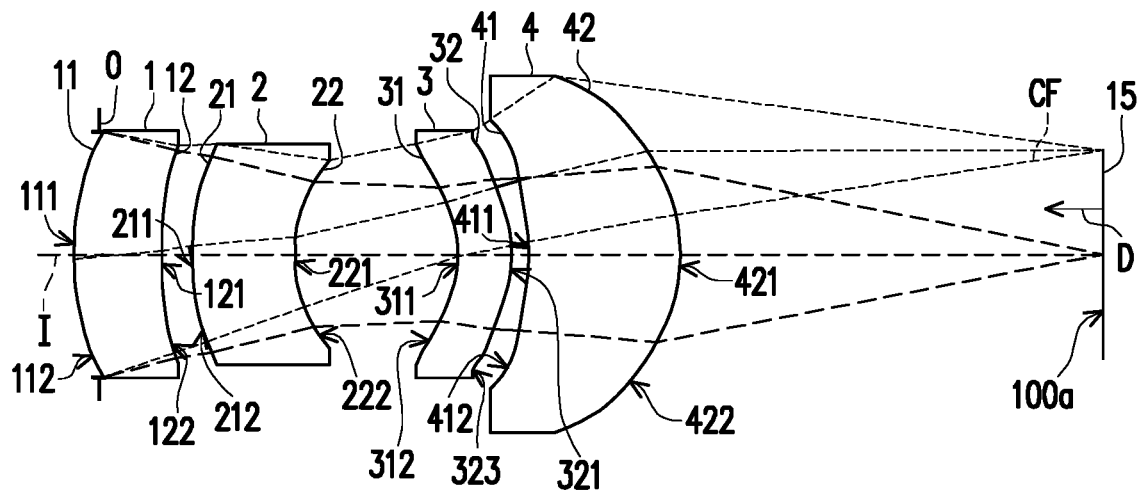
FIG. 31 is a schematic view illustrating an optical lens assembly according to a seventh embodiment of the invention.

FIG. 31 is a schematic view illustrating an optical lens assembly according to a seventh embodiment of the invention, FIGS. 32A to 32D are diagrams illustrating longitudinal spherical aberration and other aberrations of the optical lens assembly according to the seventh embodiment of the invention. Referring to FIG. 31, the seventh embodiment of the optical lens assembly 10 of the invention is similar to the first embodiment, and the differences between the two are described below. The optical lens assembly 10 in the first embodiment of the invention includes an aperture stop 0, a first lens element 1, a second lens element 2, a third lens element 3 and a fourth lens element 4 arranged along an optical axis I of the optical lens assembly 10 in the order from the light output side to the light input side. When the plurality of near infrared light is emitted by the light emitting surface 100a of the structured light generating unit 15 having a plurality of light sources and enters the optical lens assembly 10, after the plurality of near infrared light passes through the fourth lens element 4, the third lens element 3, the second lens element 2, the first lens element 1 and the aperture stop 0, a plurality of light beams are generated from the light output side and emitted out of the optical lens assembly 10. It should be pointed out that the light input side is a side facing the structured light generating unit 15 having a plurality of light sources, and the light output side is an opposite side thereof.

Each of the first lens element 1, the second lens element 2, the third lens element 3 and the fourth lens element 4 has a light output surface 11, 21, 31 or 41 which faces the light output side and allows the near infrared light to pass through and a light input surface 12, 22, 32 or 42 which faces the light input side and allows the near infrared light to pass through.

In the embodiment, the material of the first lens element 1, the second lens element 2, the third lens element 3 and the fourth lens element 4 are respectively glass, plastic, plastic and plastic, which should not be construed as a limitation to the invention.

The first lens element 1 is arranged to a lens element having refracting power in a first order from the light output side to the light input side. The first lens element 1 has positive refracting power. The light output surface 11 of the first lens element 1 has a convex portion 111 in a vicinity of the optical axis I and a convex portion 112 in a vicinity of a periphery of the lens element. The light input surface 12 of the first lens element 1 has a concave portion 121 in a vicinity of the optical axis I and a concave portion 122 in a vicinity of a periphery of the lens element. In the embodiment, the light output surface 11 and the light input surface 12 of the first lens element 1 are aspheric surfaces.

The second lens element 2 is arranged to a lens element having refracting power in a second order from the light output side to the light input side. The second lens element 2 has negative refracting power. The light output surface 21 of the second lens element 2 has a convex portion 211 in a vicinity of the optical axis I and a convex portion 212 in a vicinity of a periphery of the lens element. The light input surface 22 of the second lens element 2 has a concave portion 221 in a vicinity of the optical axis I and a concave portion 222 in a vicinity of a periphery of the lens element. In the embodiment, the light output surface 21 and the light input surface 22 of the second lens element 2 are aspheric surfaces.

The third lens element 3 is arranged to a lens element having refracting power in a third order from the light output side to the light input side. The third lens element 3 has positive refracting power. The light output surface 31 of the third lens element 3 has a concave portion 311 in a vicinity of the optical axis I and a concave portion 312 in a vicinity of a periphery of the lens element. The light input surface 32 of the third lens element 3 has a convex portion 321 in a vicinity of the optical axis I. Different from the first embodiment, the light input surface 32 of the third lens element 3 has a concave portion 323 in a vicinity of a periphery of the lens element. In the embodiment, the light output surface 31 and the light input surface 32 of the third lens element 3 are aspheric surfaces.

In the embodiment, the fourth lens element 4 has positive refracting power. The light output surface 41 of the fourth lens element 4 has a concave portion 411 in a vicinity of the optical axis I and a concave portion 412 in a vicinity of a periphery of the lens element. The light input surface 42 of the fourth lens element 4 has a convex portion 421 in a vicinity of the optical axis I and a convex portion 422 in a vicinity of a periphery of the lens element. In the embodiment, the light output surface 41 and the light input surface 42 of the fourth lens element 4 are aspheric surfaces.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the seventh embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is −0.0018 mm; in the environment of 70° C., the focal shift of the optical lens assembly 10 is 0.0039 mm. The thermal stability effect of the sixth embodiment is better than the first embodiment.

In the seventh embodiment, the first lens element 1 is a glass lens. The temperature coefficient of refractive index of the first lens element 1 is $$\frac{dn}{dt}, \frac{dn}{dt} = 3.36 \times 10^{-6} /° \text{C}., \left|\frac{dn}{dt}\right| = 3.36 \times 10^{-6} /° \text{C}..$$

Other detailed optical data of the seventh embodiment is as shown in FIG. 33, and the system length (i.e., TTL) in the seventh embodiment is 4.995 mm, the effective focal length (EFL) is 2.881 mm, the half field of view (HFOV) is 8.554°, the f-number (Fno) is 2.592, and LCR is 0.5 mm. Specifically, the system length (i.e., TTL) refers to a distance between the light output surface 11 of the first lens element 1 to the structured light generating unit 15 having a plurality of light sources along the optical axis I.

Each aspheric coefficient from the light output surface 11 of the first lens element 1 to the light input surface 42 of the fourth lens element 4 in the equation (2) is indicated in FIG. 34. In FIG. 34, the referential number 11 is one column that represents the aspheric coefficient of the light output surface 11 of the first lens element 1, and the reference numbers in other columns can be deduced from the above.

Additionally, the relationship among the important parameters pertaining to the optical lens assembly 10 of the seventh embodiment is indicated in FIG. 64.

The parameters pertaining to the first lens element 1, the second lens element 2, the third lens element 3 and the fourth lens element 4 of the seventh embodiment are defined in a similar way as the parameters defined in paragraph 0031 of the specification of the invention, and the differences are described below:

υ4 is an Abbe number of the fourth lens element 4;
T4 represents the thickness of the fourth lens element 4 along the optical axis I;
G34 represents an air gap between the light input surface 32 of the third lens element 3 and the light output surface 41 of the fourth lens element 4 along the optical axis I;
G4F represents an air gap between the fourth lens element 4 and the structured light generating unit 15 having a plurality of light sources along the optical axis I;
f4 is a focal length of the fourth lens element 4; and
n4 is a refractive index of the fourth lens element 4.

Figures 32A, 32B, 32C, 32D:
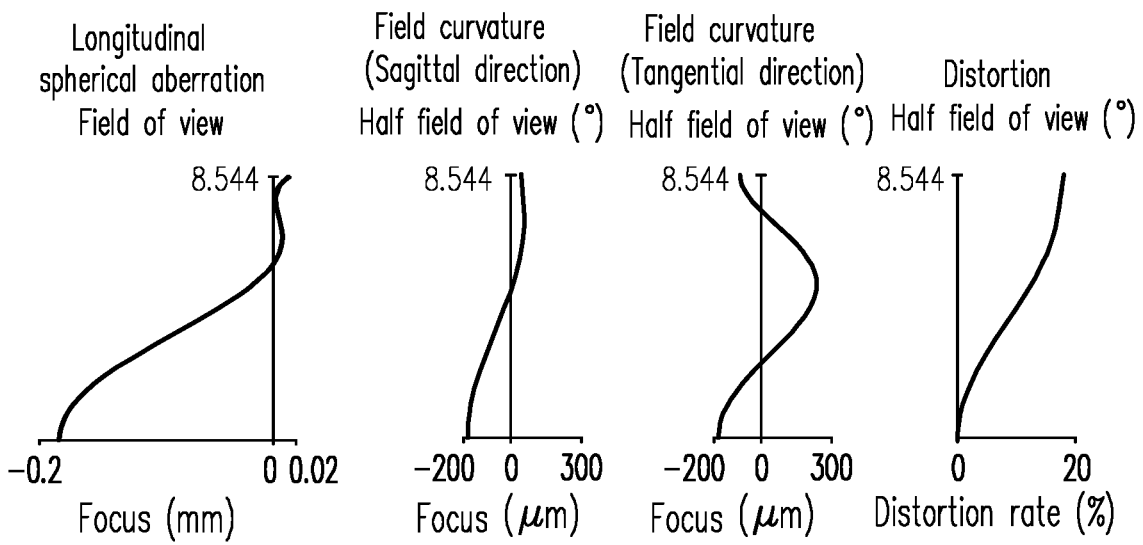
FIG. 32A to FIG. 32D are diagrams illustrating longitudinal spherical aberration and other aberrations of the optical lens assembly according to the seventh embodiment of the invention.

With reference to FIG. 32A to FIG. 32D, FIG. 32A is a diagram describing the longitudinal spherical aberration on the light emitting surface 100a of the seventh embodiment in the condition that the wavelength is 935 nm, 940 nm and 946 nm, FIG. 32B and FIG. 32C are diagrams respectively describing the astigmatism aberration regarding sagittal direction and astigmatism aberration regarding tangential direction on the light emitting surface 100a of the seventh embodiment in the condition that the wavelength is 935 nm, 940 nm and 946 nm. FIG. 32D is a diagram describing distortion aberration of the structured light generating unit 15 having a plurality of light sources on the light emitting surface 100a of the seventh embodiment in the condition that the wavelength is 935 nm, 940 nm and 946 nm. In FIG. 32A, the longitudinal spherical aberration of the seventh embodiment is measured in the condition that the pupil radius is 0.5940 mm. The curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within a range of −0.2 mm to 0.02 mm. Accordingly, it is evident that the embodiment can significantly improve the spherical aberration of the same wavelength. In addition, the distances between the three representative wavelengths are close to one another, which represents that the imaging positions of the rays with different wavelengths are concentrated, therefore, the chromatic aberration can be significantly improved.

In FIGS. 32B and 32C which illustrate two diagrams of astigmatism aberration, the focal length variation of the three representative wavelengths in the entire field of view falls within a range of −200 μm to 300 μm, which represents that the optical system in the seventh embodiment can effectively eliminate aberration. In FIG. 32D, the diagram of distortion aberration shows that the distortion aberration in the seventh embodiment can be maintained within a range of 0% to 20%, which shows that the distortion aberration in the seventh embodiment can meet the image quality requirement of the optical system. Based on the above, it is shown that the seventh embodiment can provide better image quality compared with existing optical lens assembly under the condition where the system length of the optical lens is shortened to about 4.995 mm.

Figure 35:
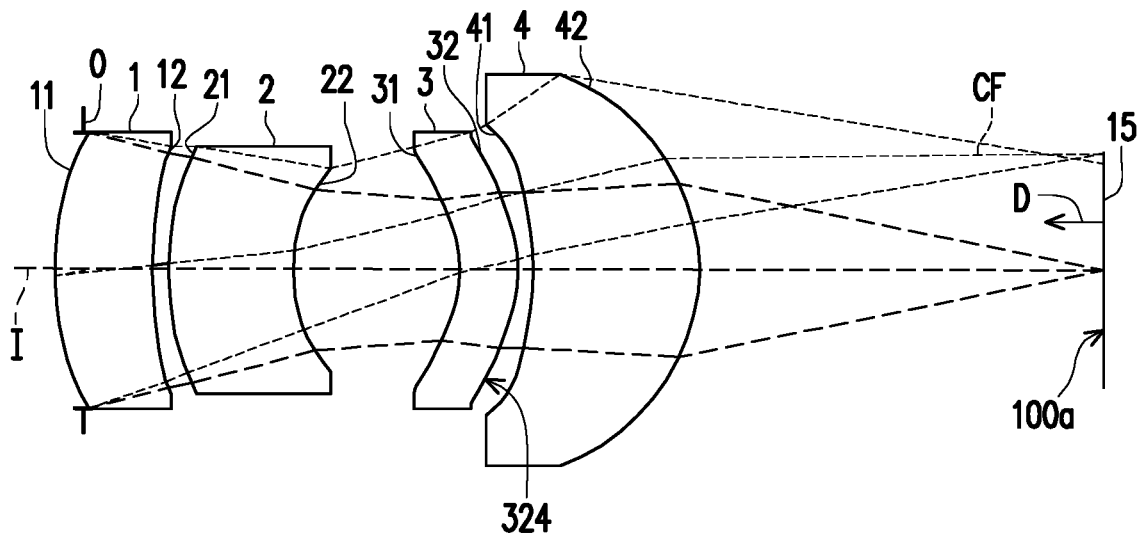
FIG. 35 is a schematic view illustrating an optical lens assembly according to an eighth embodiment of the invention.

FIG. 35 is a schematic view illustrating an optical lens assembly according to an eighth embodiment of the invention, FIGS. 36A to 36D are diagrams illustrating longitudinal spherical aberration and other aberrations of the optical lens assembly according to the eighth embodiment of the invention. Referring to FIG. 35, the eighth embodiment of the optical lens assembly 10 of the invention is similar to the seventh embodiment, and the difference lies in optical data, aspheric coefficients and the parameters of the lens elements 1, 2, 3 and 4, and the light input surface 32 of the third lens element 3 has a convex portion 324 in a vicinity of a peripheral of the lens element. It should be noted that, in order to show the view clearly, some numerals which are the same as those used for the concave portion and convex portion in the seventh embodiment are omitted in FIG. 35.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the eighth embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is −0.00048 mm; in the environment of 70° C., the focal shift of the optical lens assembly 10 is 0.0016 mm. The thermal stability effect of the eighth embodiment is better than the seventh embodiment.

In the eighth embodiment, the first lens element 1 is a glass lens. The temperature coefficient of refractive index of the first lens element 1 is $$\frac{dn}{dt}, \frac{dn}{dt} = 3.36 \times 10^{-6} /° \text{ C.}, \left|\frac{dn}{dt}\right| = 3.36 \times 10^{-6} /° \text{ C..}$$

The detailed optical data of the optical lens assembly 10 is as shown in FIG. 37, the system length (i.e., TTL) in the eighth embodiment is 4.510 mm, the effective focal length (EFL) is 2.853 mm, the half field of view (HFOV) is 9.077°, the f-number (Fno) is 2.462, and LCR is 0.5 mm.

FIG. 37 shows each aspheric coefficient pertaining to the light output surface 11 of the first lens element 1 through the light input surface 42 of the fourth lens element 4 in the equation (2) in the eighth embodiment.

Additionally, the relationship among the important parameters pertaining to the optical lens assembly 10 of the eighth embodiment is indicated in FIG. 64.

Figures 36A, 36B, 36C, 36D:
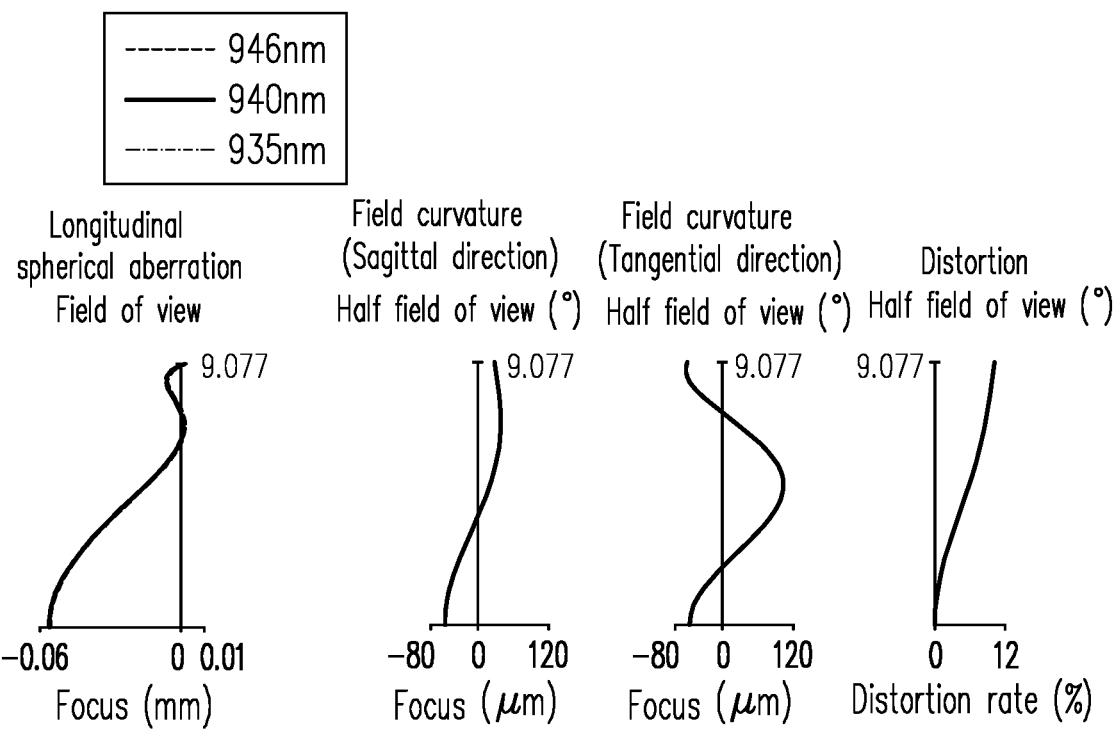
FIG. 36A to FIG. 36D are diagrams illustrating longitudinal spherical aberration and other aberrations of the optical lens assembly according to the eighth embodiment of the invention.

With reference to FIG. 36A to FIG. 36D, FIG. 36A is a diagram describing the longitudinal spherical aberration on the light emitting surface 100a of the eighth embodiment in the condition that the wavelength is 935 nm, 940 nm and 946 nm, FIG. 36B and FIG. 36C are diagrams respectively describing the astigmatism aberration regarding sagittal direction and astigmatism aberration regarding tangential direction of the structured light generating unit 15 having a plurality of light sources on the light emitting surface 100a of the eighth embodiment in the condition that the wavelength is 935 nm, 940 nm and 946 nm. FIG. 36D is a diagram describing distortion aberration of the structured light generating unit 15 having a plurality of light sources on the light emitting surface 100a of the eighth embodiment in the condition that the wavelength is 935 nm, 940 nm and 946 nm. In FIG. 36A, the longitudinal spherical aberration of the eighth embodiment is measured in the condition that the pupil radius is 0.5940 mm. The imaging point deviation of the off-axis ray at different heights is controlled within a range of −0.06 mm to 0.01 mm. In FIGS. 36B and 36C which illustrate two diagrams of astigmatism aberration, the focal length variation of the three representative wavelengths in the entire field of view falls within a range of −80 μm to 120 μm. In FIG. 36D, the diagram of distortion aberration shows that the distortion aberration in the eighth embodiment can be maintained within a range of 0% to 12%. Based on the above, it is shown that the eighth embodiment can provide better image quality compared with existing optical lens assembly under the condition where the system length of the optical lens is shortened to about 4.510 mm.

The above descriptions show that the advantage of the eighth embodiment relative to the seventh embodiment is that the longitudinal spherical aberration of the eighth embodiment is smaller than the longitudinal spherical aberration of the seventh embodiment, the astigmatism aberration regarding the sagittal and tangential directions of the eighth embodiment is smaller than the astigmatism aberration regarding the sagittal and tangential directions in the seventh embodiment. The distortion aberration of the eighth embodiment is smaller than the distortion aberration of the seventh embodiment. The system length of the eighth embodiment is smaller than the system length of seventh embodiment. The HFOV of the eighth embodiment is larger than the HFOV of the seventh embodiment. The f-number of the eighth embodiment is smaller than the f-number of the seventh embodiment. The lens optical axis and the thickness difference of the periphery portion in the eighth embodiment is smaller than the seventh embodiment. In view of the above, the eighth embodiment is easier to be manufactured and has higher yield rate.

Figure 39:
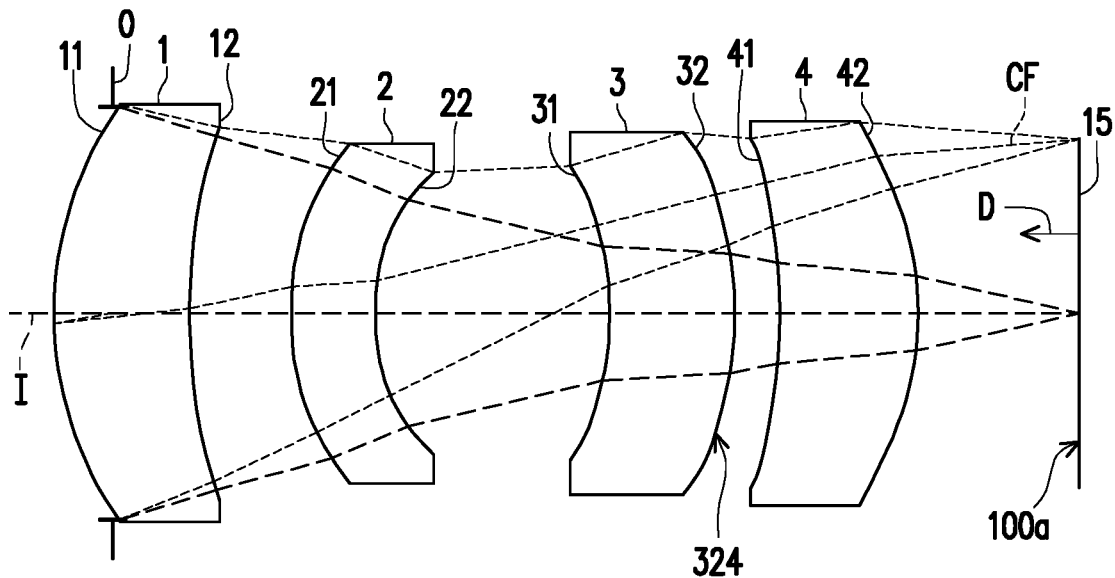
FIG. 39 is a schematic view illustrating an optical lens assembly according to a ninth embodiment of the invention.

FIG. 39 is a schematic view illustrating an optical lens assembly according to a ninth embodiment of the invention, FIGS. 39A to 39D are diagrams illustrating longitudinal spherical aberration and other aberrations of the optical lens assembly according to the ninth embodiment of the invention. Referring to FIG. 39, the ninth embodiment of the optical lens assembly 10 of the invention is similar to the seventh embodiment, and the difference lies in optical data, aspheric coefficients and the parameters of the lens elements 1, 2, 3 and 4, and the light input surface 32 of the third lens element 3 has a convex portion 324 in a vicinity of a peripheral of the lens element. It should be noted that, in order to show the view clearly, some numerals which are the same as those used for the concave portion and convex portion in the seventh embodiment are omitted in FIG. 39.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the ninth embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.0049 mm; in the environment of 70° C., the focal shift of the optical lens assembly 10 is −0.0076 mm.

In the ninth embodiment, the first lens element 1 is a glass lens. The temperature coefficient of refractive index of the first lens element 1 is $$\frac{dn}{dt}, \frac{dn}{dt} = 3.36 \times 10^{-6} /° \text{ C.}, \left|\frac{dn}{dt}\right| = 3.36 \times 10^{-6} /° \text{ C..}$$

The detailed optical data of the optical lens assembly 10 is as shown in FIG. 41, the system length (i.e., TTL) in the ninth embodiment is 2.930 mm, the effective focal length (EFL) is 2.625 mm, the half field of view (HFOV) is 9.963°, the f-number (Fno) is 2.211, and LCR is 0.5 mm.

FIG. 42 shows each aspheric coefficient pertaining to the light output surface 11 of the first lens element 1 through the light input surface 42 of the fourth lens element 4 in the equation (2) in the ninth embodiment.

Additionally, the relationship among the important parameters pertaining to the optical lens assembly 10 of the ninth embodiment is indicated in FIG. 64.

Figures 40A, 40B, 40C, 40D:
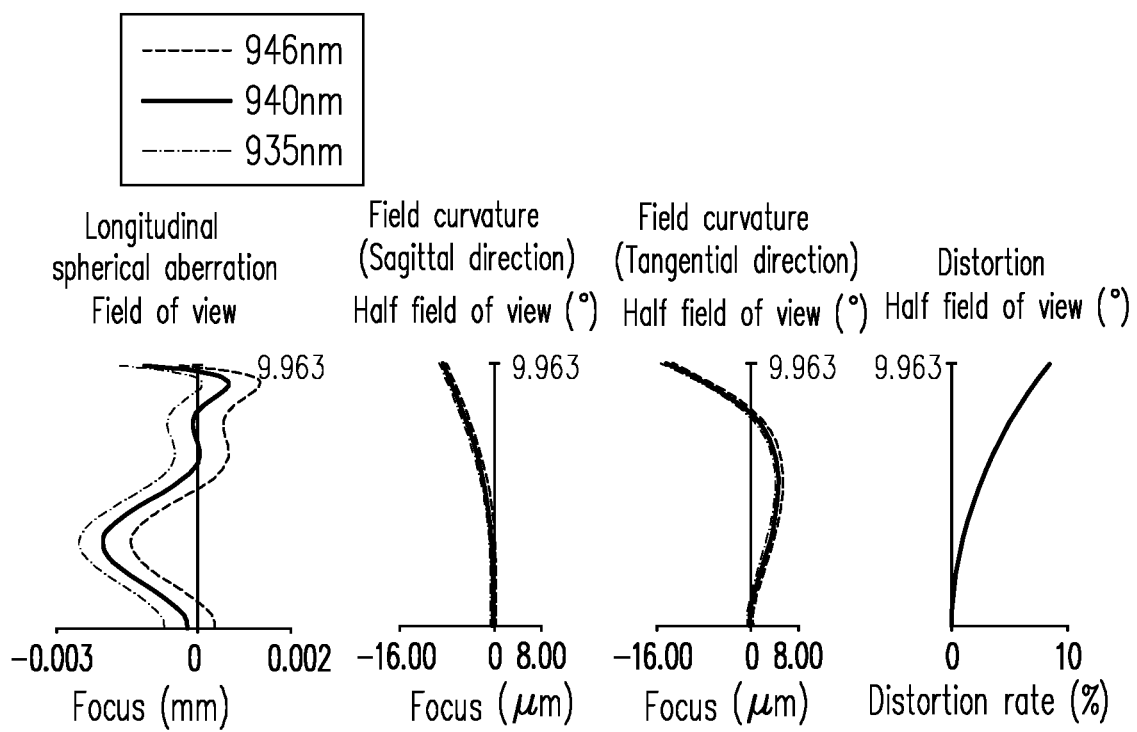
FIG. 40A to FIG. 40D are diagrams illustrating longitudinal spherical aberration and other aberrations of the optical lens assembly according to the ninth embodiment of the invention.

With reference to FIG. 40A to FIG. 40D, FIG. 40A is a diagram describing the longitudinal spherical aberration on the light emitting surface 100a of the ninth embodiment in the condition that the wavelength is 935 nm, 940 nm and 946 nm, FIG. 40B and FIG. 40C are diagrams respectively describing the astigmatism aberration regarding sagittal direction and astigmatism aberration regarding tangential direction of the structured light generating unit 15 having a plurality of light sources on the light emitting surface 100a of the ninth embodiment in the condition that the wavelength is 935 nm, 940 nm and 946 nm. FIG. 40D is a diagram describing distortion aberration of the structured light generating unit 15 having a plurality of light sources on the light emitting surface 100a of the ninth embodiment in the condition that the wavelength is 935 nm, 940 nm and 946 nm. In FIG. 40A, the longitudinal spherical aberration of the ninth embodiment is measured in the condition that the pupil radius is 0.5940 mm. The imaging point deviation of the off-axis ray at different heights is controlled within a range of −0.003 mm to 0.002 mm. In FIGS. 40B and 40C which illustrate two diagrams of astigmatism aberration, the focal length variation of the three representative wavelengths in the entire field of view falls within a range of −16 μm to 8 μm. In FIG. 40D, the diagram of distortion aberration shows that the distortion aberration in the ninth embodiment can be maintained within a range of 0% to 10%. Based on the above, it is shown that the ninth embodiment can provide better image quality compared with existing optical lens assembly under the condition where the system length of the optical lens is shortened to about 2.930 mm.

The above descriptions show that the advantage of the ninth embodiment relative to the seventh embodiment is that the longitudinal spherical aberration of the ninth embodiment is smaller than the longitudinal spherical aberration of the seventh embodiment, the astigmatism aberration regarding the sagittal and tangential directions of the ninth embodiment is smaller than the astigmatism aberration regarding the sagittal and tangential directions in the seventh embodiment. The distortion aberration of the ninth embodiment is smaller than the distortion aberration of the seventh embodiment. The system length of the ninth embodiment is smaller than the system length of seventh embodiment. The HFOV of the ninth embodiment is larger than the HFOV of the seventh embodiment. The f-number of the ninth embodiment is smaller than the f-number of the seventh embodiment. The lens optical axis and the thickness difference of the periphery portion in the ninth embodiment is smaller than the seventh embodiment, In view of the above, the ninth embodiment is easier to be manufactured and has higher yield rate.

Figure 43:
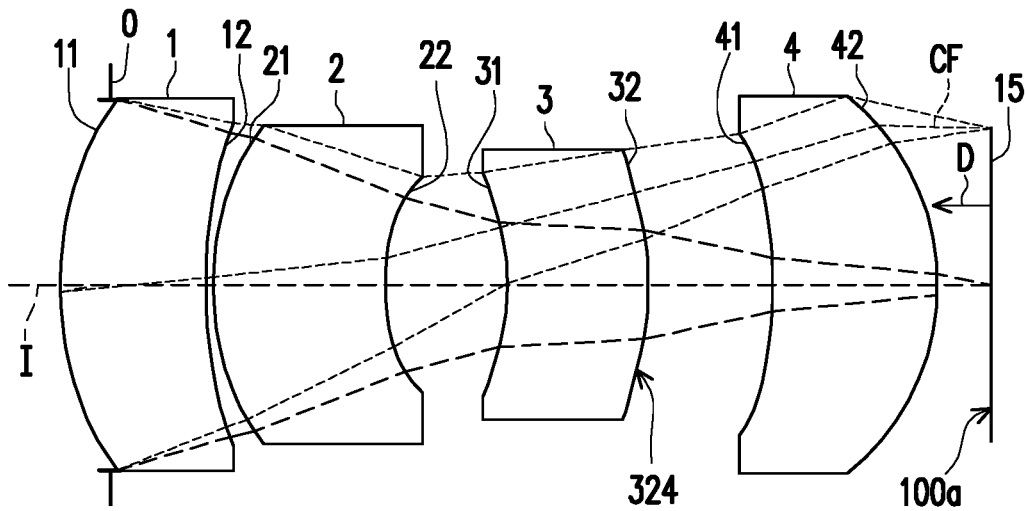
FIG. 43 is a schematic view illustrating an optical lens assembly according to a tenth embodiment of the invention.

FIG. 43 is a schematic view illustrating an optical lens assembly according to a tenth embodiment of the invention, FIGS. 44A to 44D are diagrams illustrating longitudinal spherical aberration and other aberrations of the optical lens assembly according to the tenth embodiment of the invention. Referring to FIG. 43, the tenth embodiment of the optical lens assembly 10 of the invention is similar to the seventh embodiment, and the difference lies in optical data, aspheric coefficients and the parameters of the lens elements 1, 2, 3 and 4, the third lens element 3 has negative refracting power, and the light input surface 32 of the third lens element 3 has a convex portion 324 in a vicinity of a peripheral of the lens element. It should be noted that, in order to show the view clearly, some numerals which are the same as those used for the concave portion and convex portion in the seventh embodiment are omitted in FIG. 43.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the tenth embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.0039 mm; in the environment of 70° C., the focal shift of the optical lens assembly 10 is −0.0057 mm.

In the tenth embodiment, the first lens element 1 is a glass lens. The temperature coefficient of refractive index of the first lens element 1 is $$\frac{dn}{dt}, \frac{dn}{dt} = 3.36 \times 10^{-6} / ° C., \left|\frac{dn}{dt}\right| = 3.36 \times 10^{-6} / ° C..$$

The detailed optical data of the optical lens assembly 10 is as shown in FIG. 45, the system length (i.e., TTL) in the tenth embodiment is 2.982 mm, the effective focal length (EFL) is 3.135 mm, the half field of view (HFOV) is 9.171°, the f-number (Fno) is 2.640, and LCR is 0.5 mm.

FIG. 46 shows each aspheric coefficient pertaining to the light output surface 11 of the first lens element 1 through the light input surface 42 of the fourth lens element 4 in the equation (2) in the tenth embodiment.

Additionally, the relationship among the important parameters pertaining to the optical lens assembly 10 of the tenth embodiment is indicated in FIG. 64.

Figures 44A, 44B, 44C, 44D:
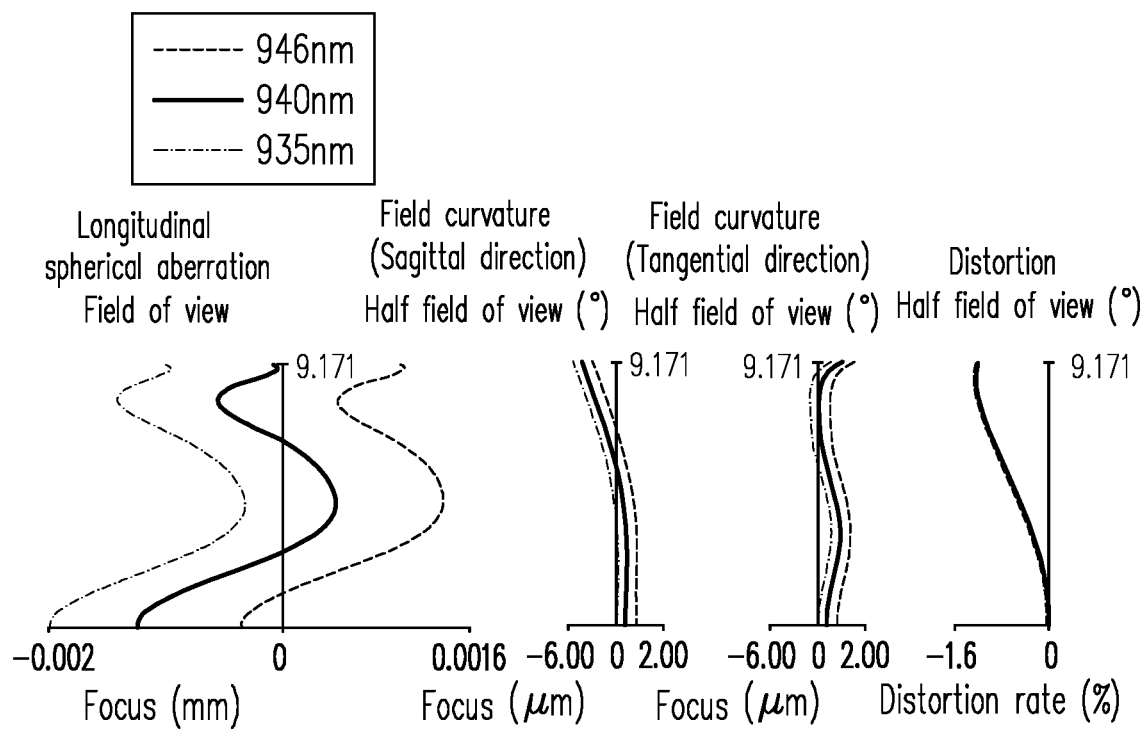
FIG. 44A to FIG. 44D are diagrams illustrating longitudinal spherical aberration and other aberrations of the optical lens assembly according to the tenth embodiment of the invention.

With reference to FIG. 44A to FIG. 44D, FIG. 44A is a diagram describing the longitudinal spherical aberration on the light emitting surface 100a of the tenth embodiment in the condition that the wavelength is 935 nm, 940 nm and 946 nm, FIG. 44B and FIG. 44C are diagrams respectively describing the astigmatism aberration regarding sagittal direction and astigmatism aberration regarding tangential direction of the structured light generating unit 15 having a plurality of light sources on the light emitting surface 100a of the tenth embodiment in the condition that the wavelength is 935 nm, 940 nm and 946 nm. FIG. 44D is a diagram describing distortion aberration of the structured light generating unit 15 having a plurality of light sources on the light emitting surface 100a of the tenth embodiment in the condition that the wavelength is 935 nm, 940 nm and 946 nm. In FIG. 44A, the longitudinal spherical aberration of the tenth embodiment is measured in the condition that the pupil radius is 0.5940 mm. The imaging point deviation of the off-axis ray at different heights is controlled within a range of −0.002 mm to 0.0016 mm. In FIGS. 44B and 44C which illustrate two diagrams of astigmatism aberration, the focal length variation of the three representative wavelengths in the entire field of view falls within a range of −6.00 μm to 2.00 μm. In FIG. 44D, the diagram of distortion aberration shows that the distortion aberration in the tenth embodiment can be maintained within a range of −1.6% to 10%. Based on the above, it is shown that the tenth embodiment can provide better image quality compared with existing optical lens assembly under the condition where the system length of the optical lens is shortened to about 2.982 mm.

The above descriptions show that the advantage of the tenth embodiment relative to the seventh embodiment is that the longitudinal spherical aberration of the tenth embodiment is smaller than the longitudinal spherical aberration of the seventh embodiment, the astigmatism aberration regarding the sagittal and tangential directions of the tenth embodiment is smaller than the astigmatism aberration regarding the sagittal and tangential directions in the seventh embodiment. The distortion aberration of the tenth embodiment is smaller than the distortion aberration of the seventh embodiment. The system length of the tenth embodiment is smaller than the system length of seventh embodiment. The HFOV of the tenth embodiment is larger than the HFOV of the seventh embodiment. The lens optical axis and the thickness difference of the periphery portion in the tenth embodiment is smaller than the seventh embodiment. In view of the above, the tenth embodiment is easier to be manufactured and has higher yield rate.

Figure 47:
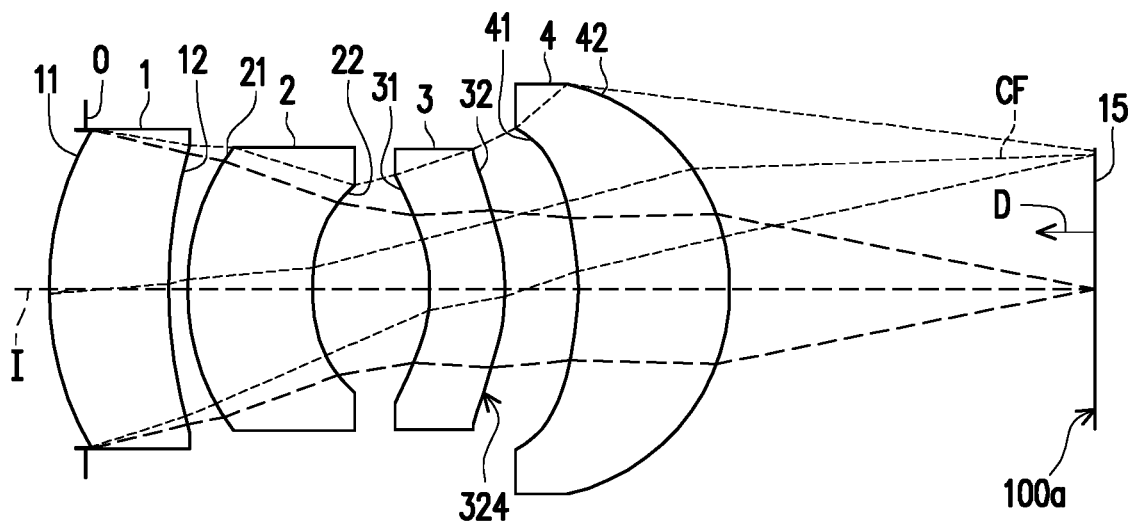
FIG. 47 is a schematic view illustrating an optical lens assembly according to an eleventh embodiment of the invention.

FIG. 47 is a schematic view illustrating an optical lens assembly according to an eleventh embodiment of the invention, FIGS. 48A to 48D are diagrams illustrating longitudinal spherical aberration and other aberrations of the optical lens assembly according to the eleventh embodiment of the invention. Referring to FIG. 47, the eleventh embodiment of the optical lens assembly 10 of the invention is similar to the seventh embodiment, and the difference lies in optical data, aspheric coefficients and the parameters of the lens elements 1, 2, 3 and 4, the third lens element 3 has negative refracting power, and the light input surface 32 of the third lens element 3 has a convex portion 324 in a vicinity of a peripheral of the lens element. It should be noted that, in order to show the view clearly, some numerals which are the same as those used for the concave portion and convex portion in the seventh embodiment are omitted in FIG. 47.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the eleventh embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is −0.0009 mm; in the environment of 70° C., the focal shift of the optical lens assembly 10 is −0.0036 mm. The thermal stability effect of the eleventh embodiment is better than the seventh embodiment.

In the eleventh embodiment, the first lens element 1 is a glass lens. The temperature coefficient of refractive index of the first lens element 1 is $$\frac{dn}{dt}, \frac{dn}{dt} = 3.36 \times 10^{-6} /° C., \left|\frac{dn}{dt}\right| = 3.36 \times 10^{-6} /° C..$$

The detailed optical data of the optical lens assembly 10 is as shown in FIG. 49, the system length (i.e., TTL) in the eleventh embodiment is 2.982 mm, the effective focal length (EFL) is 3.135 mm, the half field of view (HFOV) is 9.171°, the f-number (Fno) is 2.640, and LCR is 0.5 mm.

FIG. 50 shows each aspheric coefficient pertaining to the light output surface 11 of the first lens element 1 through the light input surface 42 of the fourth lens element 4 in the equation (2) in the eleventh embodiment.

Additionally, the relationship among the important parameters pertaining to the optical lens assembly 10 of the eleventh embodiment is indicated in FIG. 64.

Figures 48A, 48B, 48C, 48D:
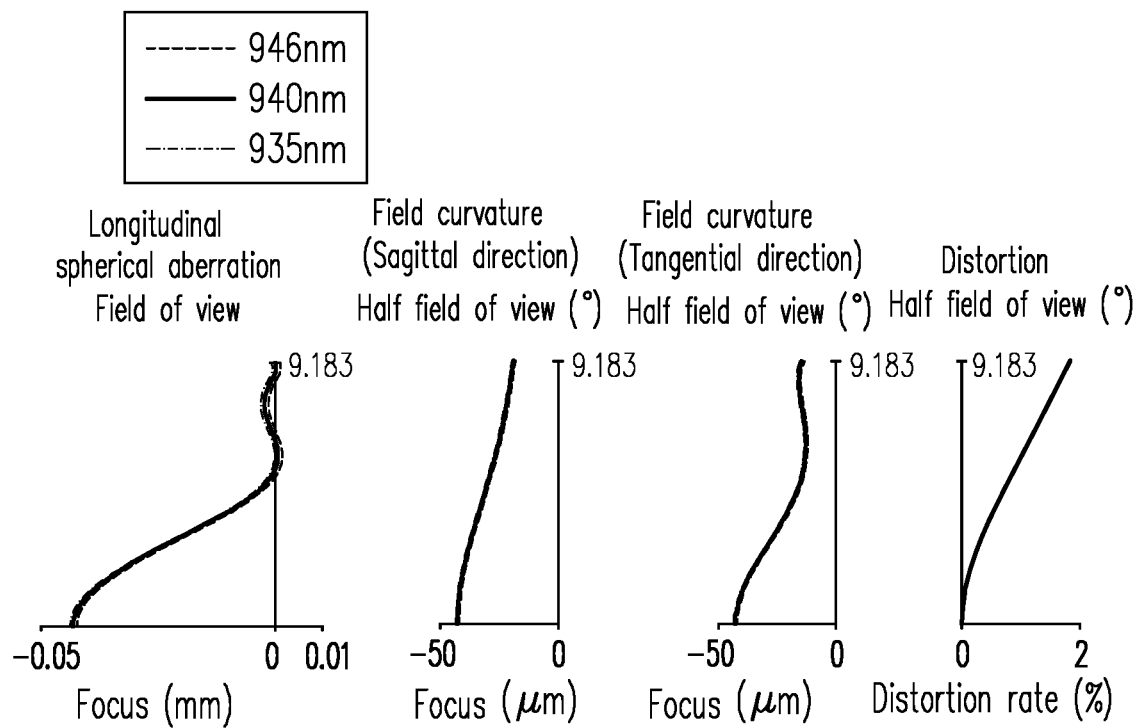
FIG. 48A to FIG. 48D are diagrams illustrating longitudinal spherical aberration and other aberrations of the optical lens assembly according to the eleventh embodiment of the invention.

With reference to FIG. 48A to FIG. 48D, FIG. 48A is a diagram describing the longitudinal spherical aberration on the light emitting surface 100a of the eleventh embodiment in the condition that the wavelength is 935 nm, 940 nm and 946 nm, FIG. 48B and FIG. 48C are diagrams respectively describing the astigmatism aberration regarding sagittal direction and astigmatism aberration regarding tangential direction of the structured light generating unit 15 having a plurality of light sources on the light emitting surface 100a of the eleventh embodiment in the condition that the wavelength is 935 nm, 940 nm and 946 nm. FIG. 48D is a diagram describing distortion aberration of the structured light generating unit 15 having a plurality of light sources on the light emitting surface 100a of the eleventh embodiment in the condition that the wavelength is 935 nm, 940 nm and 946 nm. In FIG. 48A, the longitudinal spherical aberration of the eleventh embodiment is measured in the condition that the pupil radius is 0.5940 mm. The imaging point deviation of the off-axis ray at different heights is controlled within a range of −0.05 mm to 0.01 mm. In FIGS. 48B and 48C which illustrate two diagrams of astigmatism aberration, the focal length variation of the three representative wavelengths in the entire field of view falls within a range of −50 μm to 0 μm. In FIG. 48D, the diagram of distortion aberration shows that the distortion aberration in the eleventh embodiment can be maintained within a range of 0% to 2%. Based on the above, it is shown that the eleventh embodiment can provide better image quality compared with existing optical lens assembly under the condition where the system length of the optical lens is shortened to about 2.982 mm.

The above descriptions show that the advantage of the eleventh embodiment relative to the seventh embodiment is that the longitudinal spherical aberration of the eleventh embodiment is smaller than the longitudinal spherical aberration of the seventh embodiment, the astigmatism aberration regarding the sagittal and tangential directions of the eleventh embodiment is smaller than the astigmatism aberration regarding the sagittal and tangential directions in the seventh embodiment. The distortion aberration of the eleventh embodiment is smaller than the distortion aberration of the seventh embodiment. The system length of the eleventh embodiment is smaller than the system length of seventh embodiment. The HFOV of the eleventh embodiment is larger than the HFOV of the seventh embodiment. The lens optical axis and the thickness difference of the periphery portion in the eleventh embodiment is smaller than the seventh embodiment. In view of the above, the eleventh embodiment is easier to be manufactured and has higher yield rate.

Figure 51:
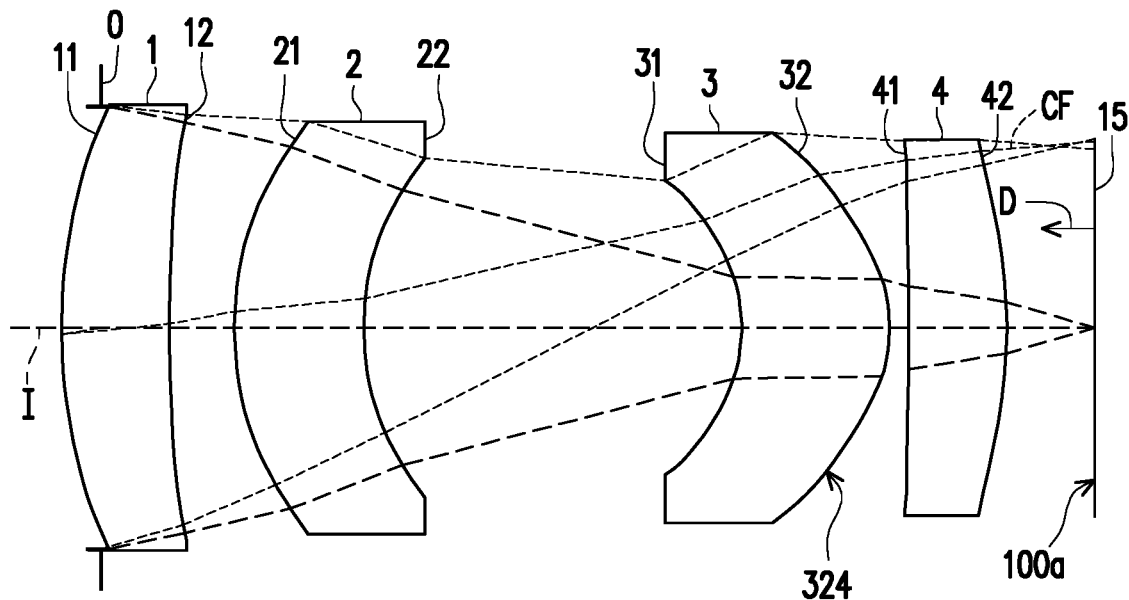
FIG. 51 is a schematic view illustrating an optical lens assembly according to a twelfth embodiment of the invention.

FIG. 51 is a schematic view illustrating an optical lens assembly according to a twelfth embodiment of the invention, FIGS. 52A to 52D are diagrams illustrating longitudinal spherical aberration and other aberrations of the optical lens assembly according to the twelfth embodiment of the invention. Referring to FIG. 51, the twelfth embodiment of the optical lens assembly 10 of the invention is similar to the seventh embodiment, and the difference lies in optical data, aspheric coefficients and the parameters of the lens elements 1, 2, 3 and 4, and the light input surface 32 of the third lens element 3 has a convex portion 324 in a vicinity of a peripheral of the lens element. It should be noted that, in order to show the view clearly, some numerals which are the same as those used for the concave portion and convex portion in the seventh embodiment are omitted in FIG. 51.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the twelfth embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.0033 mm; in the environment of 70° C., the focal shift of the optical lens assembly 10 is 0.0009 mm. The thermal stability effect of the twelfth embodiment is better than the seventh embodiment.

In the twelfth embodiment, the first lens element 1 is a glass lens. The temperature coefficient of refractive index of the first lens element 1 is $$\frac{dn}{dt}, \frac{dn}{dt} = 3.36 \times 10^{-6}/°\text{ C.}, \left|\frac{dn}{dt}\right| = 3.36 \times 10^{-6}/°\text{ C..}$$

The detailed optical data of the optical lens assembly 10 is as shown in FIG. 53, the system length (i.e., TTL) in the twelfth embodiment is 2.772 mm, the effective focal length (EFL) is 1.955 mm, the half field of view (HFOV) is 9.999°, the f-number (Fno) is 1.768, and LCR is 0.5 mm.

FIG. 54 shows each aspheric coefficient pertaining to the light output surface 11 of the first lens element 1 through the light input surface 42 of the fourth lens element 4 in the equation (2) in the twelfth embodiment.

Additionally, the relationship among the important parameters pertaining to the optical lens assembly 10 of the twelfth embodiment is indicated in FIG. 64.

Figures 52A, 52B, 52C, 52D:
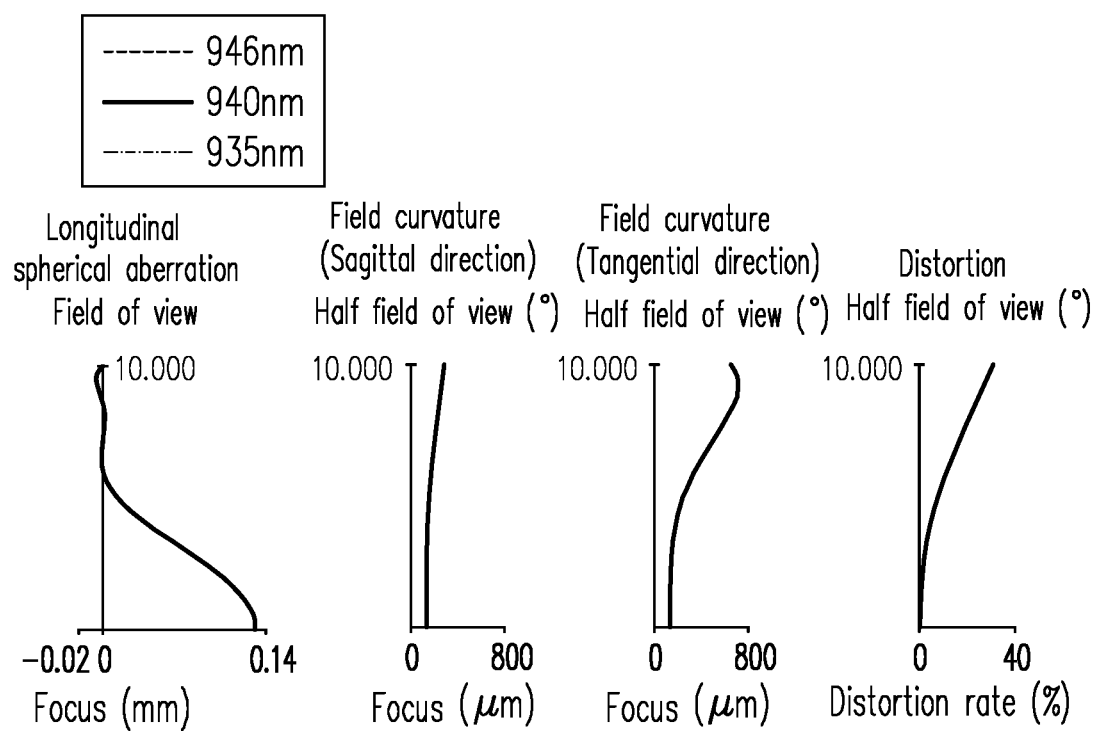
FIG. 52A to FIG. 52D are diagrams illustrating longitudinal spherical aberration and other aberrations of the optical lens assembly according to the twelfth embodiment of the invention.

With reference to FIG. 52A to FIG. 52D, FIG. 52A is a diagram describing the longitudinal spherical aberration on the light emitting surface 100a of the twelfth embodiment in the condition that the wavelength is 935 nm, 940 nm and 946 nm, FIG. 52B and FIG. 52C are diagrams respectively describing the astigmatism aberration regarding sagittal direction and astigmatism aberration regarding tangential direction of the structured light generating unit 15 having a plurality of light sources on the light emitting surface 100a of the twelfth embodiment in the condition that the wavelength is 935 nm, 940 nm and 946 nm. FIG. 52D is a diagram describing distortion aberration of the structured light generating unit 15 having a plurality of light sources on the light emitting surface 100a of the twelfth embodiment in the condition that the wavelength is 935 nm, 940 nm and 946 nm. In FIG. 52A, the longitudinal spherical aberration of the twelfth embodiment is measured in the condition that the pupil radius is 0.5940 mm. The imaging point deviation of the off-axis ray at different heights is controlled within a range of −0.02 mm to 0.14 mm. In FIGS. 52B and 52C which illustrate two diagrams of astigmatism aberration, the focal length variation of the three representative wavelengths in the entire field of view falls within a range of 0 μm to 800 μm. In FIG. 52D, the diagram of distortion aberration shows that the distortion aberration in the twelfth embodiment can be maintained within a range of 0% to 40%. Based on the above, it is shown that the twelfth embodiment can provide better image quality compared with existing optical lens assembly under the condition where the system length of the optical lens is shortened to about 2.772 mm.

The above descriptions show that the advantage of the twelfth embodiment relative to the seventh embodiment is that the longitudinal spherical aberration of the twelfth embodiment is smaller than the longitudinal spherical aberration of the seventh embodiment. The system length of the twelfth embodiment is smaller than the system length of seventh embodiment. The HFOV of the twelfth embodiment is larger than the HFOV of the seventh embodiment. The f-number of the twelfth embodiment is smaller than the f-number of the seventh embodiment. The lens optical axis and the thickness difference of the periphery portion in the twelfth embodiment is smaller than the seventh embodiment. In view of the above, the twelfth embodiment is easier to be manufactured and has higher yield rate.

Figure 55:
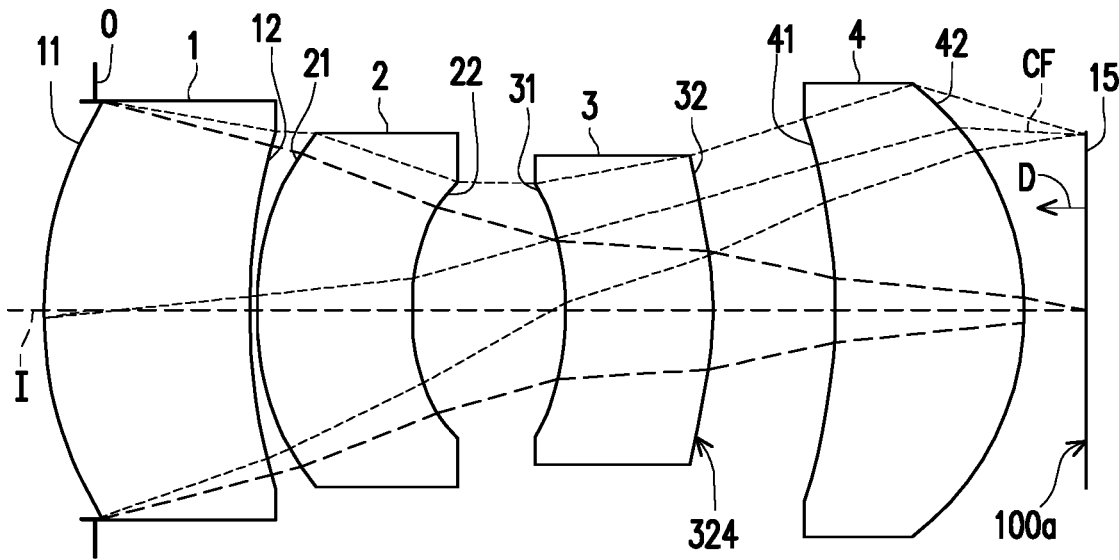
FIG. 55 is a schematic view illustrating an optical lens assembly according to a thirteenth embodiment of the invention.

FIG. 55 is a schematic view illustrating an optical lens assembly according to a thirteenth embodiment of the invention, FIGS. 56A to 56D are diagrams illustrating longitudinal spherical aberration and other aberrations of the optical lens assembly according to the thirteenth embodiment of the invention. Referring to FIG. 55, the thirteenth embodiment of the optical lens assembly 10 of the invention is similar to the seventh embodiment, and the difference lies in optical data, aspheric coefficients and the parameters of the lens elements 1, 2, 3 and 4, and the light input surface 32 of the third lens element 3 has a convex portion 324 in a vicinity of a peripheral of the lens element. It should be noted that, in order to show the view clearly, some numerals which are the same as those used for the concave portion and convex portion in the seventh embodiment are omitted in FIG. 55.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the thirteenth embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.0052 mm; in the environment of 70° C., the focal shift of the optical lens assembly 10 is −0.0035 mm.

In the thirteenth embodiment, the first lens element 1 is a glass lens. The temperature coefficient of refractive index of the first lens element 1 is $$\frac{dn}{dt}, \frac{dn}{dt} = 3.36 \times 10^{-6}/°\text{ C.}, \left|\frac{dn}{dt}\right| = 3.36 \times 10^{-6}/°\text{ C..}$$

The detailed optical data of the optical lens assembly 10 is as shown in FIG. 57, the system length (i.e., TTL) in the thirteenth embodiment is 2.971 mm, the effective focal length (EFL) is 2.955 mm, the half field of view (HFOV) is 9.912°, the f-number (Fno) is 2.541, and LCR is 0.5 mm.

FIG. 58 shows each aspheric coefficient pertaining to the light output surface 11 of the first lens element 1 through the light input surface 42 of the fourth lens element 4 in the equation (2) in the thirteenth embodiment.

Additionally, the relationship among the important parameters pertaining to the optical lens assembly 10 of the thirteenth embodiment is indicated in FIG. 64.

Figures 56A, 56B, 56C, 56D:
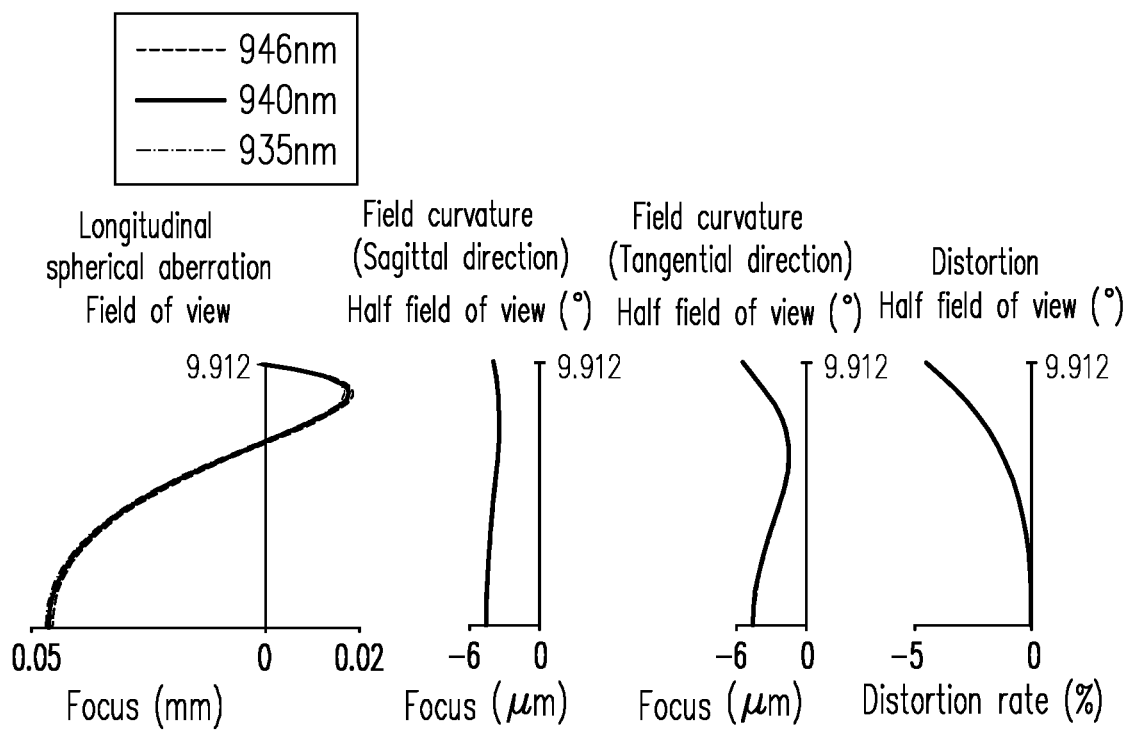
FIG. 56A to FIG. 56D are diagrams illustrating longitudinal spherical aberration and other aberrations of the optical lens assembly according to the thirteenth embodiment of the invention.

With reference to FIG. 56A to FIG. 56D, FIG. 56A is a diagram describing the longitudinal spherical aberration on the light emitting surface 100a of the thirteenth embodiment in the condition that the wavelength is 935 nm, 940 nm and 946 nm, FIG. 56B and FIG. 56C are diagrams respectively describing the astigmatism aberration regarding sagittal direction and astigmatism aberration regarding tangential direction of the structured light generating unit 15 having a plurality of light sources on the light emitting surface 100a of the thirteenth embodiment in the condition that the wavelength is 935 nm, 940 nm and 946 nm. FIG. 56D is a diagram describing distortion aberration of the structured light generating unit 15 having a plurality of light sources on the light emitting surface 100a of the thirteenth embodiment in the condition that the wavelength is 935 nm, 940 nm and 946 nm. In FIG. 56A, the longitudinal spherical aberration of the thirteenth embodiment is measured in the condition that the pupil radius is 0.5940 mm. The imaging point deviation of the off-axis ray at different heights is controlled within a range of −0.05 mm to 0.02 mm. In FIGS. 56B and 56C which illustrate two diagrams of astigmatism aberration, the focal length variation of the three representative wavelengths in the entire field of view falls within a range of −60 μm to 0 μm. In FIG. 56D, the diagram of distortion aberration shows that the distortion aberration in the thirteenth embodiment can be maintained within a range of −5% to 0%. Based on the above, it is shown that the thirteenth embodiment can provide better image quality compared with existing optical lens assembly under the condition where the system length of the optical lens is shortened to about 2.971 mm.

The above descriptions show that the advantage of the thirteenth embodiment relative to the seventh embodiment is that the longitudinal spherical aberration of the thirteenth embodiment is smaller than the longitudinal spherical aberration of the seventh embodiment. The astigmatism aberration regarding sagittal and tangential directions of the thirteenth embodiment is smaller than the astigmatism aberration regarding sagittal and tangential directions of the seventh embodiment. The distortion aberration of the thirteenth embodiment is smaller than the distortion aberration of the seventh embodiment. The system length of the thirteenth embodiment is smaller than the system length of seventh embodiment. The HFOV of the thirteenth embodiment is larger than the HFOV of the seventh embodiment. The f-number of the thirteenth embodiment is smaller than the f-number of the seventh embodiment. The lens optical axis and the thickness difference of the periphery portion in the thirteenth embodiment is smaller than the seventh embodiment. In view of the above, the thirteenth embodiment is easier to be manufactured and has higher yield rate.

Figure 59:
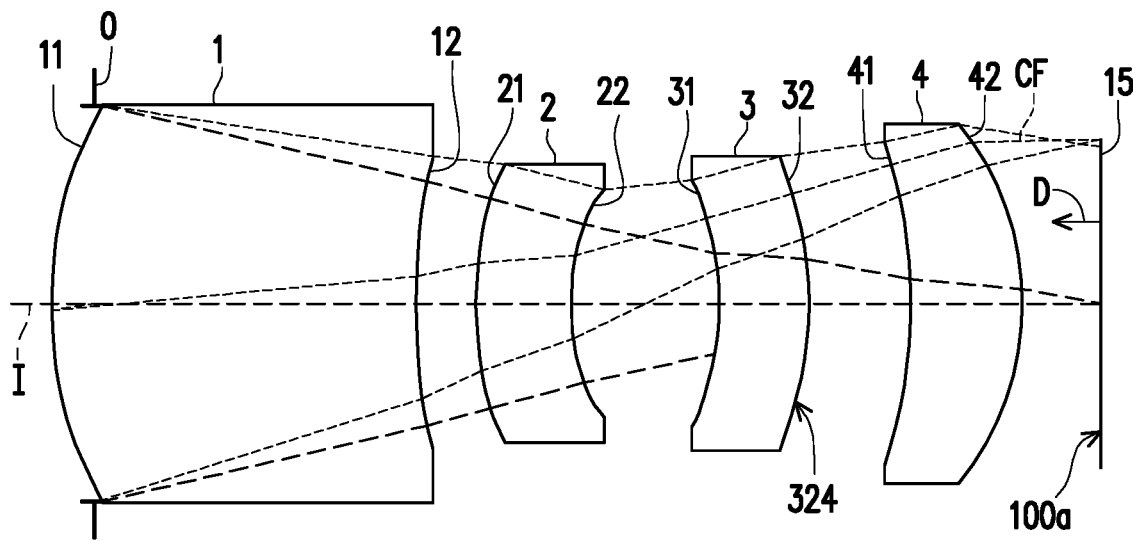
FIG. 59 is a schematic view illustrating an optical lens assembly according to a fourteenth embodiment of the invention.

FIG. 59 is a schematic view illustrating an optical lens assembly according to a fourteenth embodiment of the invention, FIGS. 60A to 60D are diagrams illustrating longitudinal spherical aberration and other aberrations of the optical lens assembly according to the fourteenth embodiment of the invention. Referring to FIG. 59, the fourteenth embodiment of the optical lens assembly 10 of the invention is similar to the seventh embodiment, and the difference lies in optical data, aspheric coefficients and the parameters of the lens elements 1, 2, 3 and 4, the third lens element 3 has negative refracting power, and the light input surface 32 of the third lens element 3 has a convex portion 324 in a vicinity of a peripheral of the lens element. It should be noted that, in order to show the view clearly, some numerals which are the same as those used for the concave portion and convex portion in the seventh embodiment are omitted in FIG. 59.

In the embodiment, an included angle between an emitting direction of the chief ray CF of the near infrared light emitted from the light emitting surface 100a of the structured light generating unit 15 having a plurality of light sources and a normal direction D is smaller than 5°.

The optical lens assembly 10 in the fourteenth embodiment has good thermal stability. Furthermore, at different ambient temperatures, the optical lens assembly 10 has extremely small focal shift. For instance, a room temperature 20° C. is set as a basis. In the environment of 20° C., the focal shift of the optical lens assembly 10 is 0.000 mm; in the environment of 0° C., the focal shift of the optical lens assembly 10 is 0.0092 mm; in the environment of 70° C., the focal shift of the optical lens assembly 10 is −0.006 mm.

In the fourteenth embodiment, the first lens element 1 is a glass lens. The temperature coefficient of refractive index of the first lens element 1 is $$\frac{dn}{dt}, \frac{dn}{dt} = 3.36 \times 10^{-6} /° C., \left|\frac{dn}{dt}\right| = 3.36 \times 10^{-6} /° C..$$

The detailed optical data of the optical lens assembly 10 is as shown in FIG. 61, the system length (i.e., TTL) in the fourteenth embodiment is 3.146 mm, the effective focal length (EFL) is 3.344 mm, the half field of view (HFOV) is 8.949°, the f-number (Fno) is 2.697, and LCR is 0.5 mm.

FIG. 62 shows each aspheric coefficient pertaining to the light output surface 11 of the first lens element 1 through the light input surface 42 of the fourth lens element 4 in the equation (2) in the fourteenth embodiment.

Additionally, the relationship among the important parameters pertaining to the optical lens assembly 10 of the fourteenth embodiment is indicated in FIG. 64.

Figures 60A, 60B, 60C, 60D:
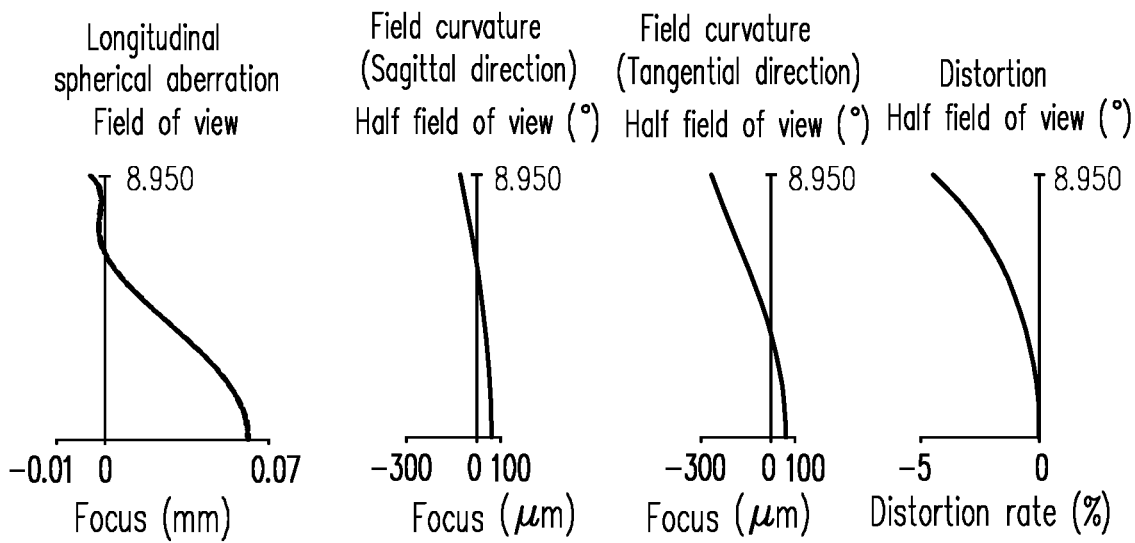
FIG. 60A to FIG. 60D are diagrams illustrating longitudinal spherical aberration and other aberrations of the optical lens assembly according to the fourteenth embodiment of the invention.

With reference to FIG. 60A to FIG. 60D, FIG. 60A is a diagram describing the longitudinal spherical aberration on the light emitting surface 100a of the fourteenth embodiment in the condition that the wavelength is 935 nm, 940 nm and 946 nm, FIG. 60B and FIG. 60C are diagrams respectively describing the astigmatism aberration regarding sagittal direction and astigmatism aberration regarding tangential direction of the structured light generating unit 15 having a plurality of light sources on the light emitting surface 100a of the fourteenth embodiment in the condition that the wavelength is 935 nm, 940 nm and 946 nm. FIG. 60D is a diagram describing distortion aberration of the structured light generating unit 15 having a plurality of light sources on the light emitting surface 100a of the fourteenth embodiment in the condition that the wavelength is 935 nm, 940 nm and 946 nm. In FIG. 60A, the longitudinal spherical aberration of the fourteenth embodiment is measured in the condition that the pupil radius is 0.5940 mm. The imaging point deviation of the off-axis ray at different heights is controlled within a range of −0.01 mm to 0.07 mm. In FIGS. 60B and 60C which illustrate two diagrams of astigmatism aberration, the focal length variation of the three representative wavelengths in the entire field of view falls within a range of −300 μm to 100 μm. In FIG. 60D, the diagram of distortion aberration shows that the distortion aberration in the fourteenth embodiment can be maintained within a range of −5% to 0%. Based on the above, it is shown that the fourteenth embodiment can provide better image quality compared with existing optical lens assembly under the condition where the system length of the optical lens is shortened to about 3.146 mm.

The above descriptions show that the advantage of the fourteenth embodiment relative to the seventh embodiment is that the longitudinal spherical aberration of the fourteenth embodiment is smaller than the longitudinal spherical aberration of the seventh embodiment. The astigmatism aberration regarding sagittal and tangential directions of the fourteenth embodiment is smaller than the astigmatism aberration regarding sagittal and tangential directions of the seventh embodiment. The distortion aberration of the fourteenth embodiment is smaller than the distortion aberration of the seventh embodiment. The system length of the fourteenth embodiment is smaller than the system length of seventh embodiment. The HFOV of the fourteenth embodiment is larger than the HFOV of the seventh embodiment. The lens optical axis and the thickness difference of the periphery portion in the fourteenth embodiment is smaller than the seventh embodiment. In view of the above, the fourteenth embodiment is easier to be manufactured and has higher yield rate.

With reference to FIG. 63 and FIG. 64, FIG. 63 and FIG. 64 provide tables of each optical parameter according to the fourteen embodiments. When the relationship between each optical parameter of the optical lens assembly 10 in the embodiment of the invention satisfies at least one of the following conditions, it is possible for the designer to design an optical lens assembly that has good optical properties and technically realizable.

I. In order to shorten the system length of the optical lens assembly and ensure optical quality, it is one of the means of the invention to shorten the air gap between lenses or properly shorten the thickness of the lens. In the meantime, in consideration of manufacturing difficulty, if the limitation of numerals as set forth in the conditions below is satisfied, a better configuration may be attained:

$(T1+G23)/T2 \leq 5.400$, a preferable range is $1.300 \leq (T1+G23)/T2 \leq 5.400$;

$(T1+T2+G23)/T3 \leq 6.700$, a preferable range is $1.800 \leq (T1+T2+G23)/T3 \leq 6.700$;

$(T1+T2)/G23 \leq 3.100$, a preferable range is $0.600 (T1+T2)/G23 \leq 3.100$;

$(T3+G12+G23)/(T1+T2) < 2.500$, a preferable range is $0.600 \leq (T3+G12+G23)/(T1+T2) \leq 2.500$;

$(T1+T2+G23)/(T1+T3) \leq 2.500$, a preferable range is $1.000 \leq (T1+T2+G23)/(T1+T3) \leq 2.500$;

$(G12+G23)/(T2+T3) \leq 1.600$, a preferable range is $0.400 \leq (G12+G23)/(T2+T3) \leq 1.600$;

$(T1+T3)/(G12+G23) \leq 2.200$, a preferable range is $0.500 \leq (T1+T3)/(G12+G23) \leq 2.200$;

$ALT/(T2+G12) \leq 4.300$, a preferable range is $1.200 \leq ALT/(T2+G12) \leq 4.300$;

$AAG/T2 \leq 5.200$, a preferable range is $1.400 \leq AAG/T2 \leq 5.200$;

$(T1+T2+T3)/AAG \leq 1.800$, a preferable range is $0.800 \leq (T1+T2+T3)/AAG \leq 1.800$;

$(T1+T2)/BFL \leq 5.900$, a preferable range is $0.400 \leq (T1+T2)/BFL \leq 5.900$;

II. The ratio of the parameter of the optical element to the length of the optical lens assembly is maintained to be within an appropriate range to avoid that the parameter of the optical element is too small for the optical element to be produced, or avoid that the parameter of the optical element is too large and consequently the length of the optical lens assembly is too long:

$EFL/T1 \leq 7.600$, a preferable range is $3.000 \leq EFL/T1 \leq 7.600$;

$TTL/(T2+T3+G23) \leq 3.300$, a preferable range is $1.500 \leq TTL/(T2+T3+G22) \leq 3.300$;

$EFL/(G12+G23) \leq 7.600$, a preferable range is $1.600 \leq EFL/(G12+G23) \leq 7.600$;

$TL/(T1+G12) \leq 5.700$, a preferable range is $2.100 \leq TL/(T1+G12) \leq 5.700$.

In addition, it is optional to select a random combination relationship of the parameter in the embodiment to increase limitation of the optical lens assembly for the ease of designing the optical lens assembly having the same structure in the invention. Due to the unpredictability in the design of an optical system, with the framework of the embodiments of the invention, under the circumstances where the above-described conditions are satisfied, the optical lens assembly according to the embodiments of the invention with shorter length, improved optical quality, or better yield rate can be preferably achieved so as to improve the shortcoming of prior art.

The above-limited relation is provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form a convex portion in the vicinity of the optical axis I on the light output surface of the first lens element. It should be noted that the above-described details can be optionally combined and applied to the other embodiments of the invention under the condition where they are not in conflict with one another.

In addition, it is optional to select a random combination relationship of the parameter in the embodiment to increase limitation of the optical lens assembly for the ease of designing the optical lens assembly having the same structure in the invention.

In view of the unpredictability in the design of an optical system, with the framework of the embodiments of the invention, under the circumstances where the above-described conditions are satisfied, the optical lens assembly according to the embodiments of the invention with shorter length, bigger aperture availability, improved optical quality or better yield rate can be preferably achieved so as to improve the shortcoming of prior art.

The numeral range containing the maximum and minimum values obtained through the combination of proportional relationship of the optical parameter disclosed in each embodiment of the invention may be used for implementation.

Based on the above, the optical lens assembly 10 in the embodiment of the invention can achieve the following effects and advantages:

1. A single set of optical lens assembly is designed to cooperate with the structured light generating unit having a plurality of light sources to generate a plurality of light beams having different angles, which can significantly reduce the cost of optical lens assembly of transmitter using 3D sensing technology.

2. The first lens element has positive refracting power, which facilitates rays to be diverged.

3. The light output surface of the first lens element is designed to have a convex portion in a vicinity of the optical axis or the light output surface of the first lens element is designed to have a convex portion in a vicinity of a periphery of the lens element, and the light input surface of the first lens element is designed to have a concave portion in a vicinity of the optical axis, both of which facilitate to correct the generated aberration.

4. The second lens element has negative refracting power, and the light input surface of the second lens element has a concave portion in a vicinity of the optical axis as well as that the light input surface of the second lens element has a concave portion in a vicinity of a periphery of the lens element, both of which facilitate to correct the main aberration generated by the previous lens element.

5. The light output surface of the third lens element has a concave portion in a vicinity of the optical axis, and the light input surface of the third lens element has a convex portion in a vicinity of the optical axis, both of which can achieve the effect of improving optical quality.

6. The embodiment of the invention selects the lens element of which the absolute value of the temperature coefficient of refractive index of the material is smaller than or equal to $8.5 \times 10^{-6}/°$ C., and the material is glass, which facilitates to achieve the effect of improving thermal stability.

7. Specifically, the selection of the material of the first lens element of which the absolute value of the temperature coefficient of refractive index is smaller or equal to $8.5 \times 10^{-6}/°$ C. can achieve the optimal thermal stability effect; the material of the first lens element is, for example, glass.

8. By adjusting the thickness of the lens element, the proportional relationship of the air gap between the lenses, the system length of the optical lens assembly can be effectively shortened to be smaller than 5 mm and the optical quality can be maintained.

9. When the condition HFOV≤20° is satisfied, the optical quality can be enhanced so that the output luminance can be more uniform and the difficulty in designing and processing of the optical lens assembly can be reduced.

10. With the design that the included angle between the emitting direction of the chief ray of the near infrared light emitted from the light emitting surface of the structured light generating unit having a plurality of light sources and the normal direction of the light emitting surface is smaller than 5°, the degree of scattering of light beam can be reduced and the 3D sensing effect can be enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical lens assembly, configured for a plurality of near infrared light emitted by a structured light generating unit having a plurality of light sources to pass through to generate a plurality of light beams with different angles, a direction facing the structured light generating unit having the plurality of light sources being a light input side, an opposite side thereof being a light output side, the optical lens assembly comprising a first lens element, a second lens element and a third lens element arranged along an optical axis in an order from the light output side to the light input side, and each of the first lens element, the second lens element and the third lens element comprising a light output surface facing the light output side and a light input surface facing the light input side, each of the light beams comprising a chief ray and a marginal ray, and the chief ray and the marginal ray being parallel to each other after passing through the optical lens assembly, wherein:
the first lens element is arranged to be a lens element having refracting power in a first order from the light output side to the light input side;
the second lens element is arranged to be a lens element having refracting power in a second order from the light output side to the light input side;
the third lens element is arranged to be a lens element having refracting power in a third order from the light output side to the light input side,
wherein the optical lens assembly satisfies: TTL ≤5 mm, wherein TTL is a distance between the light output surface of the first lens element to the structured light generating unit having the plurality of light sources along the optical axis.

2. The optical lens assembly according to claim 1, wherein the optical lens assembly satisfies:
HFOV ≤20°, wherein HFOV is a half field of view of the optical lens assembly, wherein an included angle between an emitting direction of a chief ray of a near infrared light emitted from a light emitting surface of the structured light generating unit having the plurality of light sources and a normal direction of the light emitting surface is smaller than 5°.

3. The optical lens assembly according to claim 1, wherein the first lens element has positive refracting power.

4. The optical lens assembly according to claim 1, wherein the optical lens assembly comprises at least a lens element having a material satisfying a condition of $|dn/dt| \leq 8.5 \times 10^{-6}/°$ C., and $|dn/dt|$ is an absolute value of a temperature coefficient of refractive index, and the temperature coefficient of refractive index is measured in a condition that a light wavelength is 940 nm at a temperature ranging from 20° C. to 40° C. , and the temperature coefficient of refractive index refers to change in refractive index caused by unit of temperature, that is, value change of refractive index when temperature is increased by 1° C.

5. The optical lens assembly according to claim 1, wherein a material of the first lens element satisfies a condition of $|dn/dt| \leq 8.5 \times 10^{-6}/°$ C., $|dn/dt|$ is an absolute value of a temperature coefficient of refractive index, and the temperature coefficient of refractive index is measured in a condition that a light wavelength is 940 nm at a temperature ranging from 20° C. to 40° C., and the temperature coefficient of refractive index refers to change in refractive index caused by unit of temperature, that is, value change of refractive index when temperature is increased by 1° C.

6. The optical lens assembly according to claim 1, wherein the optical lens assembly satisfies:
(T1+G23)/T2≤5.4, wherein T1 is a thickness of the first lens element along the optical axis, G23 is an air gap between the second lens element and the third lens element along the optical lens, and T2 is a thickness of the second lens element along the optical axis.

7. The optical lens assembly according to claim 1, wherein the optical lens assembly satisfies:
(T1+T2+G23)/T3≤6.7, wherein T1 is a thickness of the first lens element along the optical axis, T2 is a thickness of the second lens element along the optical axis, G23 is an air gap between the second lens element and the third lens element along the optical axis, and T3 is a thickness of the third lens element along the optical axis.

8. The optical lens assembly according to claim 1, wherein the optical lens assembly satisfies:
(T1+T2)/G23 ≤3.1, wherein T1 is a thickness of the first lens element along the optical axis, T2 is a thickness of the second lens element along the optical axis, and G23 is an air gap between the second lens element and the third lens element along the optical axis.

9. The optical lens assembly according to claim 1, wherein the optical lens assembly satisfies:
(T3+G12+G23)/(T1+T2)≤2.5, wherein T3 is a thickness of the third lens element along the optical axis, G12 is an air gap between the first lens element and the second lens element along the optical axis, G23 is an air gap between the second lens element and the third lens element along the optical axis, T1 is a thickness of the first lens element along the optical axis, and T2 is a thickness of the second lens element along the optical axis.

10. The optical lens assembly according to claim 1, wherein the optical lens assembly satisfies:

(T1+T2+G23)/(T1+T3)≤2.5, wherein T1 is a thickness of the first lens element along the optical axis, T2 is a thickness of the second lens element along the optical axis, G23 is an air gap between the second lens element and the third lens element along the optical axis, and T3 is a thickness of the third lens element along the optical axis.

11. The optical lens assembly according to claim 1, wherein the optical lens assembly satisfies:

(G12+G23)/(T2+T3)≤1.6, wherein G12 is an air gap between the first lens element and the second lens element along the optical axis, G23 is an air gap between the second lens element and the third lens element along the optical axis, T2 is a thickness of the second lens element along the optical axis, and T3 is a thickness of the third lens element along the optical axis.

12. The optical lens assembly according to claim 1, wherein the optical lens assembly satisfies:

(T1+T3)/(G12+G23)≤2.2, wherein T1 is a thickness of the first lens element along the optical axis, T3 is a thickness of the third lens element along the optical axis, G12 is an air gap between the first lens element and the second lens element along the optical axis, and G23 is an air gap between the second lens element and the third lens element along the optical axis.

13. The optical lens assembly according to claim 1, wherein the optical lens assembly satisfies:

ALT/(T2+G12)≤4.3, wherein ALT is a sum of thickness of all lens elements of a first lens element having refracting power counted from the light output side to a first lens element having refracting power counted from the light input side along the optical axis, T2 is a thickness of the second lens element along the optical axis, and G12 is an are gap between the first lens element and the second lens element along the optical axis.

14. The optical lens assembly according to claim 1, wherein the optical lens assembly satisfies:

AAG/T2≤5.2, wherein AAG is a sum of air gaps between a first lens element having refracting power counted from the light output side to a first lens element having refracting power counted from the light input side along the optical axis, and T2 is a thickness of the second lens element along the optical axis.

15. The optical lens assembly according to claim 1, wherein the optical lens assembly satisfies:

(T1+T2+T3)/AAG≤1.8, wherein T1 is a thickness of the first lens element along the optical axis, T2 is a thickness of the second lens element along the optical axis, T3 is a thickness of the third lens element along the optical axis, and AAG is a sum of air gaps between a first lens element having refracting power counted from the light output side and a first lens element having refracting power counted from the light input side along the optical axis.

16. The optical lens assembly according to claim 1, wherein the optical lens assembly satisfies:

(T1+T2)/BFL≤5.9, wherein T1 is a thickness of the first lens element along the optical axis, T2 is a thickness of the second lens element along the optical axis, and BFL is a distance between a light input surface of a first lens element having refracting power counted from the light input side and the structured light generating unit having the plurality of light sources along the optical axis.

17. The optical lens assembly according to claim 1, wherein the optical lens assembly satisfies:

EFL/T1≤7.6, wherein EFL is an effective focal length of the optical lens assembly, and T1 is a thickness of the first lens element along the optical axis.

18. The optical lens assembly according to claim 1, wherein the optical lens assembly satisfies:

TTL/(T2+T3+G23)≤3.3, wherein T2 is a thickness of the second lens element along the optical axis, T3 is a thickness of the third lens element along the optical axis, and G23 is an air gap between the second lens element and the third lens element along the optical axis.

19. The optical lens assembly according to claim 1, wherein the optical lens assembly satisfies:

EFL/(G12+G23)≤7.6, wherein EFL is an effective focal length of the optical lens assembly, G12 is an air gap between the first lens element and the second lens element along the optical axis, and G23 is an air gap between the second lens element and the third lens element along the optical axis.

20. The optical lens assembly according to claim 1, wherein the optical lens assembly satisfies:

TL/(T1+G12)≤5.7, wherein TL is a distance between the light output surface of a first lens element having refracting power counted from the light output side and the light input surface of a first lens element having refracting power counted from the light input side along the optical axis, T1 is a thickness of the first lens element along the optical axis, and G12 is an air gap between the first lens element and the second lens element along the optical axis.

* * * * *